(12) United States Patent
Neff et al.

(10) Patent No.: US 7,908,199 B2
(45) Date of Patent: Mar. 15, 2011

(54) SYSTEM AND METHOD OF RESPONDING TO ORDERS IN A SECURITIES TRADING SYSTEM

(76) Inventors: Roy Neff, King of Prussia, PA (US); Richard Himmelstein, Kure Beach, NC (US)

( * ) Notice: Subject to any disclaimer, the term of this patent is extended or adjusted under 35 U.S.C. 154(b) by 857 days.

(21) Appl. No.: 10/086,116

(22) Filed: Feb. 26, 2002

(65) Prior Publication Data

US 2003/0014351 A1 Jan. 16, 2003

Related U.S. Application Data

(60) Provisional application No. 60/271,541, filed on Feb. 26, 2001.

(51) Int. Cl.
*G06Q 40/00* (2006.01)
(52) U.S. Cl. .......................................................... 705/37
(58) Field of Classification Search ................ 705/80
See application file for complete search history.

(56) References Cited

U.S. PATENT DOCUMENTS

| | | |
|---|---|---|
| 3,573,747 A | 4/1971 | Adams et al. |
| 4,412,287 A | 10/1983 | Braddock, III |
| 4,674,044 A | 6/1987 | Kalmus et al. |
| 4,903,201 A | 2/1990 | Wagner |
| 5,077,665 A | 12/1991 | Silverman et al. |
| 5,126,936 A | 6/1992 | Champion et al. |
| 5,136,501 A | 8/1992 | Silverman et al. |
| 5,237,500 A | 8/1993 | Perg et al. |
| 5,297,031 A | 3/1994 | Gutterman et al. |

(Continued)

FOREIGN PATENT DOCUMENTS

EP 1282053 5/2003

(Continued)

OTHER PUBLICATIONS

Santoli, M., "The Striking Price: Some Option", Barron's. New York, N.Y.: Aug. 23, 1999. vol. 79, Iss. 34' p. MW13, Ipgs.*

(Continued)

*Primary Examiner* — Olabode Akintola
(74) *Attorney, Agent, or Firm* — Lech Law, LLC; Robert R. Lech

(57) ABSTRACT

A bartering system implements barters between a plurality of parties each having one or more classes of items available for barter. Preferably, barter orders are created by designating a selected quantity of a first class of items to be bartered, designating a date range for transferring title of the first class items to be bartered, designating a barter value of the first class of items to be bartered, and designating a second class of items to be acquired. Barter orders are posted via the Internet to a barter database and may be displayed via the Internet. Posted barter orders whose first class of items match the second class of items of a barterer's order are preferably displayed. Posted barter orders from the display are selected to effectuate a barter transaction which combines a barterer's barter order with the selected posted order(s). Toolkits are provided for enabling parties, particularly marketmakers, to respond to barter orders in an automated manner. Marketmakers can use the marketmaker toolkits to populate a database, or order book, with barter orders, which can be traded against by traders. Other toolkits are provided for enabling traders to establish barter orders grouped in baskets based on market fundamentals and risk characteristics. Still other toolkits are provided for enabling retail traders to establish contingent barter orders, or barter orders that are only processed upon the occurrence of a specified condition.

35 Claims, 83 Drawing Sheets

U.S. PATENT DOCUMENTS

| | | | |
|---|---|---|---|
| 5,500,793 | A | 3/1996 | Deming et al. |
| 5,592,376 | A | 1/1997 | Hodroff |
| 5,664,115 | A | 9/1997 | Fraser |
| 5,689,652 | A | 11/1997 | Lupien et al. |
| 5,727,165 | A | 3/1998 | Ordish et al. |
| 5,794,207 | A | 8/1998 | Walker et al. |
| 5,809,483 | A | 9/1998 | Broka et al. |
| 5,852,810 | A | 12/1998 | Sotiroff et al. |
| 5,857,174 | A | 1/1999 | Dugan |
| 5,873,071 | A | 2/1999 | Ferstenberg et al. |
| 5,924,082 | A | 7/1999 | Silverman et al. |
| 5,926,793 | A | 7/1999 | DeRafael |
| 5,926,801 | A | 7/1999 | Matsubara et al. |
| 5,950,178 | A | 9/1999 | Borgato |
| 5,963,923 | A | 10/1999 | Garber |
| 6,014,643 | A | 1/2000 | Minton |
| 6,029,146 | A | 2/2000 | Hawkins et al. |
| 6,035,287 | A | 3/2000 | Stallaert et al. |
| 6,058,379 | A | 5/2000 | Odom et al. |
| 6,085,176 | A | 7/2000 | Woolston |
| 6,112,181 | A | 8/2000 | Shear et al. |
| 6,112,189 | A | 8/2000 | Rickard et al. |
| 6,173,270 | B1 | 1/2001 | Cristofich et al. |
| 6,202,051 | B1 | 3/2001 | Woolston |
| 6,233,566 | B1 | 5/2001 | Levine et al. |
| 6,236,977 | B1 | 5/2001 | Verba et al. |
| 6,247,000 | B1 | 6/2001 | Hawkins et al. |
| 6,343,278 | B1 | 1/2002 | Jain et al. |
| 6,405,180 | B2 | 6/2002 | Tilfors et al. |
| 6,408,282 | B1* | 6/2002 | Buist ............................ 705/36 R |
| 6,415,320 | B1 | 7/2002 | Hess et al. |
| 6,418,419 | B1* | 7/2002 | Nieboer et al. ................. 705/37 |
| 6,493,681 | B1 | 12/2002 | Tertitski et al. |
| 6,505,174 | B1 | 1/2003 | Keiser et al. |
| 6,594,640 | B1 | 7/2003 | Postrel |
| 6,598,026 | B1* | 7/2003 | Ojha et al. ...................... 705/26 |
| 6,684,196 | B1 | 1/2004 | Mini et al. |
| 6,847,938 | B1 | 1/2005 | Moore |
| 6,993,511 | B2 | 1/2006 | Himmelstein |
| 7,039,610 | B2 | 5/2006 | Morano et al. |
| 7,080,050 | B1 | 7/2006 | Himmelstein |
| 7,124,106 | B1 | 10/2006 | Stallaert et al. |
| 7,133,847 | B2 | 11/2006 | Himmelstein |
| 7,158,956 | B1 | 1/2007 | Himmelstein |
| 7,177,833 | B1 | 2/2007 | Marynowski et al. |
| 7,305,362 | B2 | 12/2007 | Weber et al. |
| 2001/0034663 | A1 | 10/2001 | Teveler et al. |
| 2001/0049651 | A1 | 12/2001 | Selleck |
| 2002/0004759 | A1 | 1/2002 | Bradford et al. |
| 2002/0010672 | A1* | 1/2002 | Waelbroeck et al. ........... 705/37 |
| 2002/0013750 | A1 | 1/2002 | Roberts et al. |
| 2002/0032643 | A1 | 3/2002 | Himmelstein |
| 2002/0038278 | A1 | 3/2002 | Himmelstein |
| 2002/0069152 | A1 | 6/2002 | B.C et al. |
| 2002/0091611 | A1 | 7/2002 | Minton |
| 2003/0014351 | A1 | 1/2003 | Neff et al. |
| 2003/0050888 | A1 | 3/2003 | Satow et al. |
| 2003/0101063 | A1 | 5/2003 | Sexton et al. |
| 2005/0137964 | A1* | 6/2005 | Nordlicht et al. ............... 705/37 |
| 2005/0288955 | A1 | 12/2005 | Lewiss-Hachmeister |
| 2006/0190416 | A1 | 8/2006 | Himmelstein |
| 2006/0242054 | A1 | 10/2006 | Himmelstein |
| 2008/0071667 | A1 | 3/2008 | Himmelstein |
| 2008/0097930 | A1 | 4/2008 | Himmelstein |

FOREIGN PATENT DOCUMENTS

| | | |
|---|---|---|
| JP | 2003223483 | 8/2003 |
| WO | WO 98 21667 | 5/1998 |
| WO | WO 98/21667 A1 | 5/1998 |
| WO | WO-9821667 | 5/1998 |
| WO | WO 00/78300 | 12/2000 |
| WO | WO-0078300 | 12/2000 |
| WO | WO 01/08065 | 2/2001 |
| WO | WO-0108065 | 2/2001 |

OTHER PUBLICATIONS

Patel, A., "Investigating is the best preparation: Researching equities online: Alpesh Patel avail yourself of the host of user friendly web sites there to help traders understand companies they invest in"; Financial Times. London (UK): Jan. 29, 2000, p. 10.*

Santoli, M., "The Striking Price: Some Option", Barron's. New York, N.Y.: Aug. 23, 1999. vol. 79, Iss. 34' p. MW13, 1pgs.*

U.S. Appl. No. 09/569,135, filed May 11, 2000, "Secure System for Trading Fungible Commodities" (48 pages).

U.S. Appl. No. 09/570,562, filed May 12, 2000, "Method and System for Anonymously and Confidentially Matching Contraparties . . . of a Transaction" (38 pages).

"Mathematical Market Model . . . Subjectivity", Dec. 16, 1997, reprinted from www.colorado.edu/Economics/courses/econ2020/6550/readings/mathematical-model.html May 5, 2009 (5 pages).

"Principal Blind Bidding in Portfolio Trading", Traders Magazine. com, published Aug. 31, 1998, reprinted May 5, 2009 (2 pages).

Chapman, P., "CooperNeff's Bid for Blind' Business Quant Shop Using Technology for Growth," Traders Magazine.com, published Aug. 31, 2000, reprinted May 5, 2009 (3 pages).

Kavajecz, K., "Packaging Liquidity: Blind Auctions and Liquidity Provision", Feb. 5, 2002, http://finance.wharton.upenn.edu/~rlwctr/papers/0204.pdf, reprinted May 5, 2009 (43 pages).

PCT International Search Report for PCT/US02/06129, mailed Oct. 2, 2002 (7 pages).

John Downes and Jordan Eliott Goodman, Dictionary of Finance and Investment Terms, Barron's Financial Guides, Fifth Edition, 1998, pp. 656, 654 and 47.

A Basic Guide to Exporting, Foreign Currency http://www.unzco.com/basicguide/c12.html.

* cited by examiner

524 — FEE AMOUNT per share is anticipated to be _____, if direct barter (total antcipated fee _____);

526 — FEE AMOUNT per share is anticipated to be _____, if web barter (total antcipated fee _____);

528 — TIMING

| day only ▼ |
| --- |
| day only |
| good until canceled |
| fill or kill |
| immediate or cancel |
| only view current posts |

530 — <u>SPECIAL CONDITIONS</u> (OPTIONAL)

☐ Minimum quantity  | 600 ▲▼ |

☐ do not reduce

☐ all or none

☐ deferred settlement date before _____ date after _____

☐ Other security, if any, to be provided at settlement _____

DIVIDEND REINVESTMENT (FOR NEW STOCK)
532
- ☐ yes, new stock must have a dividend reinvestment program
- ☐ no, new stock must not have had a dividend reinvestment program
- ☐ accept new stock with or without a dividend reinvestment program

TYPE OF BARTER
534
- ☐ direct barter only (fee amount anticipated to be _____)
- ☐ if direct barter not available, then barter with web site (fee amount anticipated to be _____)

DESIRED ITEM          535          536

Security | AET ▼          Industry | Health Care ▼

- ☐ Himmelstein Option for stock
- ☐ Stock
- ☐ Cash
537
- ☐ Web barter dollars

MARKET DATA FOR AET

Current stock trading price as of 02/15/1999 at time  10:45 am  is $ 47.50 .

| FIG. 9AA | FIG. 9AB |
|---|---|

| | Class/Type | Item/Identification | Amount | Market Value | Bid/Strike Price | Expiration Settlement/Date |
|---|---|---|---|---|---|---|
| 1 | Stock | Symbol or Name | # Shares | $ | N/A | N/A |
| 2 | Currency | US or Foreign | X | US$ | N/A | N/A |
| 3 | Bonds | Issuer | X | $ | N/A | N/A |
| 4 | Options | Z | N | $ | +/-$ | MMDDYY |
| 5 | Government Bond | Treasury Notes, Bonds or Bills | X | $ | +/-$ | N/A |
| 6 | Futures | Symbol or Name | Measurement Quantity | $ | N/A | MMDDYY |
| 7 | Annuities | Issuer | X | $ | N/A | N/A |
| 8 | CD's | Issuer | X | $ | N/A | N/A |
| 9 | Web Barter Dollars | IOU | X | $ | +/-$ | MMDDYY |

Z = Any security
X = Foreign or domestic currency

FIG. 9AA

| Barter Value | Interest Rate/ Current Yeild | Due/Maturity Date | Other | Barter/Settlement Date Open/Close |
|---|---|---|---|---|
| $ or specific Relationship to Market value | N/A | N/A | Dividend? | MMDDYY |
| | | | | MMDDYY |
| US$ or specific Relationship to Market value | N/A | N/A | Par Discount Premium | MMDDYY |
| | | | | MMDDYY |
| $ or specific Relationship to Market value | Y% Interest rate | MMDDYY | N/A | MMDDYY |
| | | | | MMDDYY |
| $ or specific Relationship to Market value | N/A | N/A | N/A | MMDDYY |
| | | | | MMDDYY |
| $ or specific Relationship to Market value | Y% yield rate | MMDDYY | N/A | MMDDYY |
| | | | | MMDDYY |
| $ or specific Relationship to Market value | N/A | N/A | N/A | MMDDYY |
| | | | | MMDDYY |
| $ or specific Relationship to Market value | Y% Interest rate | MMDDYY | Fixed or Variable Interest Rate | MMDDYY |
| | | | | MMDDYY |
| $ or specific Relationship to Market value | Y% Interest rate | MMDDYY | Compound Interest? | MMDDYY |
| | | | | MMDDYY |
| $ or specific Relationship to Market value | Y% Interest rate | MMDDYY | Dividend? Par, Discount, Premium Fixed or Variable Interest Compound Interest? | MMDDYY |
| | | | | MMDDYY |

Y = Interest rate or current yield in percentage

N = Quantity of options

| FIG. 9BA | FIG. 9BB |
|---|---|

| | Class/Type | Item/Identification | Amount | Market Value | Bid/Strike Price | Expiration Settlement/Date |
|---|---|---|---|---|---|---|
| 1 | Stock | AOL | 100 Shares | $ 10,900.00 | N/A | N/A |
| 2 | Currency | Canadian $ | 5,000 CN$ | $ 3,453.04 | N/A | N/A |
| 3 | Bonds | Mirage | 25,000.00 | $24,750.00 | N/A | N/A |
| 4 | Options | IBM | 12 Options | $ 122,400.00 | $ 102.00 | 30-Nov-99 |
| 5 | T-Bills | US Government | $10,000.00 | $ 10,000.00 | $ 101.00 | N/A |
| 6 | Futures | Gold | 10 troy oz | $ 3,157.50 | N/A | 30-Nov-99 |
| 7 | Annuity | TransAmerica | $100,000.00 | $ 100,000.00 | N/A | N/A |
| 8 | CD's | SunWest Bank | $50,000.00 | $50,000.00 | N/A | N/A |
| 9 | Web Barter Dollars | IOU | $25,000.00 | $25,000.00 | A | B |

A = Could have Bid Strike Price if Web Barter $ are from Options or Government Bonds + CD depending on terms and conditions in barter transactions B = Could have Expiration Date if Web Barter $ are from Options or Futures depending on terms and conditions in barter transactions

FIG. 9BA

| Barter Value | Interest Rate/ Current Yeild | Due/Maturity Date | Other | Barter/Settlement Date Open/Close |
|---|---|---|---|---|
| $ 10,750.00 | N/A | N/A | Dividend? | 01-FEB-01/ 29-FEB-01 |
| $ 3,448.28 | N/A | N/A | N/A | 02-JAN-00/ 02-JAN-00 |
| $ 24,900.00 | 8.50% | 1-MAR-15 | Par, Discount, Premium | 24-DEC-03/ 28-DEC-04 |
| $ 12,840.00 | N/A | N/A | N/A | 4-OCT-99/ 4-NOV-99 |
| $ 9,800.00 | 4.93% | 15-Jun-00 | N/A | OPEN/ 15-DEC-99 |
| $ 3,000.00 | N/A | N/A | N/A | OPEN/ 31-OCT-99 |
| $ 105,000.00 | 10.50% | 10-Jun-06 | Fixed or Variable Interest | 02-JAN-02/ 12-JAN-02 |
| $ 49,000.00 | 4.14% | 10-May-00 | Compound Interest? | 12-DEC-99/ 12-DEC-99 |
| $ 24,500.00 | C | D | Dividend? Par, Discount, Premium Fixed or Variable Interest Compound Interest? | OPEN/ 15-JUN-01 |

C = Could have Yield or Interest Rate if Web Barter $ are from Bonds, Government Bonds, Annuities or CD's depending on terms and conditions in barter transactions D = Could have Maturity Date if Web Barter $ are from Bonds, Government Bonds, Annuities or CD's depending on terms and conditions in barter transactions

FIG. 9BB

Request Barter Order Trade Prices

| Symbol | Symbol Lookup | View Portfolio |

Quantity
(For each leg, specify shares or dollars, but not both.)

SELL SIDE: HD  2000 shares  $ ☐
☐ check if Short Sale

BUY SIDE: IBM  1000 shares  $ ☐

Get Quote | Clear | Cancel | Help

Response to User Trade Request

Definitions | Trade Help

SELL 2000 HD --vs.-- BUY 1000 IBM

```
           National Best Bid and Offer
       LT      Chg   Bid     Ask     Size
HD    54 1/8   + 1/2 54 1/8  54 3/16 10 x 10
IBM   100 1/8  +1 1/4 100    100 1/4 20 x 10
```

Unit NBBO    -$406.25   +$250  -$418.75  -$400.00   10 x 10
Your Unit Bid                           -$412.50
Total NBBO   -$8,125   +$250  -$8,375  -$8,000    Spread $375
Your Total Bid                          -$8,250           $125
Dollars Saved                                        $250

| Make Another Request | Save | Close |

| | 1000 | -418.75 | NBBO Bid | |
| | 2000 | -412.50 | Your Bid | |
| Sell-side Shares | | Unit Price | Order Type | You Save |
| 1000 | | -407.50 | System | $75.00 | Trade |
| 500 | | -403.75 | System | $18.75 | Trade |
| 500 | | -400.94 | System | $4.69 | Trade |
| 2000 | | -400.00 | System | | Trade |
| 1000 | | -400.00 | NBBO | | Trade |

FIG. 12

**Response to User Trade Request:
Definitions**

NBBO is National Best Bid and Offer. These prices and trade sizes occur on the NYSE, Nasdaq, and other exchanges and Electronic Communications Networks (ECNs). Although NBBO prices and sizes are set outside of the BarterSecurities system, ths user can trade on them from the BarterSecurites "Response to User Trade Request" screen.

Unit Prices are calculated per 100 shares of the requested sell side. If the user request is to Sell 2000 shs HON and buy 1000 shs IBM, the Unit Trade is to sell 100 shs HON and buy 50 shs IBM.

*FIG. 13A*

**Response to User Trade Request:
National Best Bid and Offer Screen**

Your order, or your Request for Trade Prices, is deemed to fall on the bid side of the Barter market. The NBBO bid price is on the same side of the market as your order. The NBBO offer price is on the contraside of the market as your order, and you can trade against it if no better offer exists.

The NBBO unit bid price corresponding to your order/request is calculated by trading the sell-side of your order on the NBBO bid price and trading the buy-side of your order on the NBBO ask price. Likewise, The NBBO unit offer price for your order is calculated by trading the sell-side of the Barter on the NBBO offer price and trading the buy-side of the Barter on the NBBO bid price. Positive unit prices mean that you PAY that price to execute the order. Negative unit prices mean that you RECEIVE the price to execute the order.

Total NBBO prices are the product of the unit prices and the sell-side quantity of your order. Again, positive prices mean that you PAY that price to execute the order. Negative prices mean that you RECEIVE that price to execute the order.

If you have specified a limit price for your Barter order, then your unit bid price and total bid price are shown in the National Best Bid and Offer box. If your unit bid price exceeds the NBBO unit bid, then your order is said to be hot. The BarterSecurities system attempts to locate the best offer only for hot bids. Tip: If your bid is not hot but you want BarterSecurites to show you the best offers, then use the Request Barter Order Trade Prices screen, which does not allow you to enter a limit price.

Dollars Saved is the amount that you would save by executing your order at your limit price relative to the NBBO price. If the NBBO size is not large enough to complete your order, then savings are computed relative to "next best" prices that marketmakers are showing. Click Trade Help to learn more about using the BarterSecurities system to save money relative to the NBBO market and/or to execute larger size than is available on the NBBO market.

*FIG. 13B*

Response to User Trade Request:
Trade Help

Suppose that you have made a request to sell 2000 shares HON vs. buying 1000 shares IBM and that the right half of the "Response to User Trade Request" screen shows the bids and offers below.

| Sell-side Shares | Unit Price | Order Type | You Save | |
|---|---|---|---|---|
| 1000 | -418.75 | NBBO Bid | | |
| 2000 | -412.50 | Your Bid | | |
| Sell-side Shares | Unit Price | Order Type | You Save | |
| 1000 | -407.50 | System | $75.00 | Trade |
| 500 | -403.75 | System | $18.75 | Trade |
| 500 | -400.94 | System | $ 4.69 | Trade |
| 2000 | -400.00 | System | | Trade |
| 1000 | -400.00 | NBBO | | Trade |

The top of the screen, above the column lables, shows the bid side for your order and the bottom of the screen (below column lables) shows offers. Your request is always expressed as a bid (see Definitions) and, as such, shows up on the top part of the screen along with the NBBO bid. Also, the screen may reflect bids that are internal to the BarterSecurities system (in addition to your order.) All bids and offers are expressed in terms of a "Unit Price", or per 100 shares of the sell-side of the Barter Order.

*FIG. 14A*

In the example above, your bid is better (i.e., you're willing to receive fewer dollars) than the NBBO bid. This means your bid is "hot" and may be executed at any time from within the BarterSecurities system. If your bid price is below the NBBO bid, you will have to proactively trade on an existing offer (at a less favorable price than your current unit bid), or wait for the NBBO bid to drop before your order has a chance of being executed.

In the lower half of the screen the NBBO unit offer price is shown along with offers that have been generated by the system. All of the system offers will either (1) save you money relative to the NBBO offer because the unit price of execution is more favorable or (2) allow you to trade a larger size (up to your request size) than the NBBO market.

If you click on the word "Trade" on an offer line, the system attempts to fill the requested trade size at the most favorable price to the trader up to the price level on the order line that was clicked.

For example, if you click "Trade" on the first offer line: "1000 / -407.50", the system will attempt to trade 1/2 of the requested barter (i.e., 1000 shares available on the sell-side out of the 2000 requested) at the unit price of -$407.50, meaning that you RECEIVE a total of $4075.00.

If, instead, you click on the third offer line: "500 / -400.94", the system will attempt to fill the first tranche of the requested trade size (1000 HON vs. 500 IBM) at the most favorable unit price to the trader of -$407.50, followed by another 500 HON vs. 250 IBM at -$403.75,followed by another 500 HON vs. 250 IBM at -$400.94. Overall, you would have saved $98.45 relative to trading on NBBO prices, while at the same time filling all of your order, rather than the half which was available at NBBO prices.

Note that if you had clicked on the fourth offer line, "2000 / -$400.00" you would have gotten the same result as in the previous example. This is because the system attempts to trade only enough size to fill the initial trade request (2000 shares on the sell-side), and only at the most favorable prices for the user.

*FIG. 14B*

Order Entry

Account [ xx-xxx-xxxx ▼ ]

| Symbol | Buy Side | | Sell Side | ☐ Check if Short Sale |
|---|---|---|---|---|
| | [ ] | Lookup | [ ] | |

Amount

Shares  [        ]                    [        ]
              or                            or
Dollars  $ [        ]          $ [        ]

Action

[ Execution Type    (Select One)  ▼ ]

Pay no more than $ [        ] before commissions.

Receive at least  $ [        ] before commissions.

OR, compute pay/receive by entering equivalent limit prices:

Limit  $ [        ]          $ [        ]

Execute Dual Market Order only if and when:
  ○ Buy side price touches  $ [        ]
  ○ Sell side price touches $ [        ]

Satisfy Pay/Receive Limit only if and when:
  ○ Buy side trades >= $ [        ]
  ○ Buy side trades <= $ [        ]
  ○ Sell side trades >= $ [        ]
  ○ Sell side trades <= $ [        ]

Timing and Options

[ Day Only  ▼ ]

☐ Fill or Kill              ☐ All or None
☐ Immediate or Cancel       ☐ Do not Reduce

[ Submit Now ]   [ Save ]   [ Cancel ]

→ Execution Types:
→ Market
← Pay/Receive Limit
← Advanced Market
← Advanced Pay/Receive Limit

*FIG. 15*

Automatic Bid/Offer Responses

Rules:
- great_hedge
- *default
- *show_manual_1
- *show_manual_2
- illiquid_one
- small_cap_both
- great_hedge
- small_debit

[New] [Delete]

Conditions:
[Variable....▼] [Operator....▼]

- Delta <= 10%
- SICmatch = 2
- VOLmin >= 2
- both_symlist = 1-4

[Add] [Edit] [Remove]

Price and Size:

Price Adjustment          Size Offered
NBBO + [0%]▶              ○ [    ] Shares
                          ○ [    ] Dollars
                          ☐ Add NBBO Size Tier 1: price: NBBO - 25%   size: NBBO
Tier 2: price: NBBO         size: NBBO + 500 shs
Tier 3: price: NBBO + 10%   size: $25,000

[Add] [Edit] [Remove]

[OK] [Cancel] [Help]

*FIG. 16*

Symbol Lists

Enter List Name:

1. Fred
2. John
3. Ralph
4. Jennifer

New | Edit | Delete

Enter Symbol:

IBM
SUNW
HWP
DELL
CPQ

Add | Remove

OK | Cancel

*FIG. 17*

Automatic Bid/Offer Responses:
Entering Rules

A Rule is a statement of how and when to respond to retail Barter Orders. Enter a new Rule name or click on an existing rule name to create or edit the rule's Conditions and Automatic Offers. To create a Condition combine a variable name, an operator, and a critical value. Click here to see variable definitions and allowable value ranges. For example, to define an order with relatively little net market exposure, construct the equation:

| Delta | <= | 10% |

Marketmakers can set up Automatic Offers that comprise any number of tiers, each of which is expressed in terms of the current NBBO prices an sizes.

Consider the following example;
1. Retail trader wants to Buy 1000 ABC, Sell 2000 XYZ.
2. NBBO markets are
    ABC    100 / 100.20    20 x 20
    XYZ    45 / 45.15    10 x 5
3. For Rule 1, the marketmaker constructs an Automatic Offer by setting the Tier 1 Value Increment to -25% and the Tier 1 Size Increment to +25000.

Bid to offer, the total cost to the retail trader would be $10,200 (1000 x 100.20 - 2000 x 45). The dollar size of the bid/ask spread is $500 (1000 x 0.20 + 2000 x 0.15). If the Barter Order satisfied the conditions of Rule 1, then the system would reduce the NBBO spread by 25%, or $125 and offer the trade at $10,075. On the NBBO sizes only half of the trade can be completed because only half of the XYZ is bid for. The system would show the marketmaker bidding for $25000 more of XYZ, or over 500 shares. Therefore, the system would show that the marketmaker is willing to complete 3/4 of the trade at the Tier 1 price. Furthermore, the marketmaker's Tier 2 price/size might allow the system to show that the final 25% of the trade could be completed at a higher price for the retail trader.

Certain rule names cannot be modified by the user. These rule names are preceded by an asterisk in the name list. The *default rule is always in existence but, of course, the marketmaker can set the conditions of the rule so that it is never active. The marketmaker can set up any number of rules named 'show_manual_n', where n is ordered by the system. These rules do not dictate autmtic offers, but rather tell the system when to allow the marketmaker to respond manually to a bid or a trade request. For example, the maketmaker may want to respond manually whenever an order amount exceeds $200,000, or when both sides of the trade fall within user-defined symbols lists.

*FIG. 18*

Automatic Bid/Offer Responses:
Definitions of Variables and Allowable Value Ranges examples

| Variable | Definition | Range (units) |
|---|---|---|
| Delta | abs($long - $short) / (max( $long, $short)) | 0-100% |
| SICmatch | Number of SIC code digits of buy and sell that match, starting from left. | 0,1,2,3,4 |
| MCAPmax | Market Cap of larger-cap stock | ($bil) |
| MCAPmin | Market Cap of smaller-cap stock | |
| VOLmax | Avg Daily $-volume traded, last 30 days, of more-active stock. | ($mil) |
| VOLmin | Avg Daily $-volume traded, last 30 days, of less-active stock. | |
| BA_Debit | Debit value of bid/ask spread of Barter Order on NYSE and Nasdaq inside prices. | (Dollars) |
| either_symlist | Group of user-defined symbol lists that contains at least one trade symbols. | 1, . . ., n e.g., 1,4,6-8 |
| both_symlist | Group of user-defined symbol lists that contains both trade symbols. | |

*FIG. 19*

Automatic Bid/Offer Responses:
Examples of Variable Usage

'Delta' measures the dollar amount of exposure of the Barter Order. If the retail trader's buy side debit is $100,000 and the sell side credit is $75,000, the debit is
    25% = |100000 - 75000| / max(100000, 75000).

'SICmatch' shows how industry-related two stocks are. Matched digits are counted from the left until a match fails, after which remaining digits do not count.

| SIC #1 | SIC #2 | SICmatch |
|--------|--------|----------|
| 4013   | 4031   | 2        |
| 2631   | 4031   | 0.       |

MCAPmax and MCAPmin measure market capitalization of the bigger and smaller stock, respectively. To ensure that both stocks' market cap exceeds $1 billion, enter "MCAPmin >= 1". To ensure that at least one stock's market cap exceeds $10 billion, enter "MCAPmax >= 10".

VOLmax and VOLmin measure the dollar volume of the more- and less-active stock, respectively. To ensure that both stocks trade at least $2 million per day, on average, enter "VOLmin >= 2". To identify trades in which neither stock trades more than $2 million per day, on average, enter "VOLmax <=2".

BA_Debit is the dollar width of a Barter Order on the NBBO market. If a retail trader wishes to buy 100 ABC on the NBBO market 50-50.25 and sell 300 XYZ on the NBBO market 20-20.10, then the dollar size of the spread is $55, or 100 x 0.25 + 300 x 0.10.

'either_symlist' and 'both_symlist' allow the marketmaker to identify whether stock symbols fall in marketmaker-created lists. Suppose the marketmaker sets up three lists:
    List 1: IBM, CPQ, DELL, SUNW, HWP
    List 2: GM, F, DCX
    List 3: ADCT, ADBE, AMGN, AMAT, AMCC.
To ensure that at least one of the Barter Order symbols falls in lists 1 or 3, enter "either_symlist = 1,3". To ensure that both Barter Order symbols fall in any of the lists, enter "both_symlist = 1-3".

*FIG. 20*

Define Order Contingencies

Name:
Techs_up_2

SPX_up_for_day
NDX_crosses_mavg
Techs_up_2
star_on_low

[ New ] [ Delete ]

Conditions:

[ Select Variable... ] [ Arithmetic Operator... ] [ Comparison Operator... ] [ Security Symbol... ]

[SUNW]Price >= 1.02*[SUNW]Cprice(D-1)

**[SUNW]Price >= 1.02*[SUNW]Cprice(D-1)**
[CSCO]Price >= 1.02*[CSCO]Cprice(D-1)
[#]Price >= 1.02*[#]Cprice(D-1)

[ Add ] [ Edit ] [ Remove ]

[ OK ] [ Cancel ] [ Help ]

*FIG. 21*

Defining Contingent Orders

An order contingency is a set of user-defined conditions that must be satisfied before a "primary" order (i.e., symbol, buy/sell, quantity, market/limit) is sent, and by giving this group of conditions a label, or name, that wil be used when the primary order is created.

To create and name a new order contingency enter the new name in the top field under "Name" and click New. The name will be entered in the lower field along with the names of existing order contingencies To delete an existing order contingency, including both its name and conditions, highlight the name in the lower field and click Delete. To enter the conditions that are associated with an order contingency, highlight the name in the lower field and begin typing conditions in the top field under "Conditions".

Conditions of an order contingency are used to describe market characteristics. The system sends an order only when all of the conditions are satisfied. (To send an order using "or" logic, create two or more primary orders in the Send Contingent Order window, and apply a different Contingency Name to each primary order.) A Condition may consist of variables, arithmetic operators, numerical constants, security symbols, and a comparison operator, such as "greater than or equal to". Variables can be pre-defined by the system and include large numbers of fundamental, technical, historical, and descriptive characteristics. These variables and their mnemonic abbreviations are accessed through a pop-up screen in response to clicking the Select Variable button. Examples of variables are "one-year-ago earnings per share","10-day moving average", "percent change in price over last 30 days", and "shares outstanding". Users can create new variables by combining system variables with arithmetic operators, as in [Book Value / Shares Outstanding]. Thus, user-defined expressions can be created and tested against user-defined benchmarks, as in the condition, [Book Value / Shares Outstanding <= Current Price]. Click here to learn variable syntax.

To create a new condition, type the condition in the top field under "Conditions" and click Add. To modify a condition, highlight the condition in the lower field and click Edit. To delete a condition, highlight it in the lower field and click Remove.

To save the changes that have been made, click OK. To ignore the changes that have been made since the last Save, click Cancel.

*FIG. 22*

Defining Contingent Orders:
Variable Syntax

In the examples below, *variable* refers to any system or user-defined variable, such as "Price" for the intraday last traded price of a security.

[SYM]*variable* is the variable for the security whose symbol is SYM. For example, [CSCO]Cprice is yesterday's closing price of Cisco.

[#] is a special symbol which denotes the security for which an order will be sent. For example, suppose that within a portfolio of ten stocks, each stock is to be sold using a market order when the stock has risen 2% from the previous close. By using the [#] symbol, only one contingency need be defined in the Define Order Contingencies screen, and the same condition can be applied to the ten different stocks in the "Send Contingent Orders" screen.

Note that when entering a limit price that is dependent on the market picture at the time the order is delivered, the [#] symbol may be omitted, since the symbol of the intended security is already given in the Send Contingent Order screen

*variable*(D-n) is the variable measured back n trading days. For example, CPrice(D-3) is a closing price three trading sessions ago. If "n" is not entered, it is assumed to be zero. For certain variables whose default is daily measurement, the letter D may be excluded. For example, CPrice(-5) is the closing price 5 trading days ago.

For certain fundamental variables, *variable*(Q-n) and *variable*(Y-n) are the variable measured back n quarters and n years, respectively. For example, EPS(Q-1) is "Earnings per Share" measured 1 quarter ago. EPS(Q) is the most recent quarterly earnings per share, whereas EPS(Y) is the earnings per share for the most recent fiscal year.

{hh:mm+n} is an order suspension qualifier which is entered at the end of a condition and which holds the contingent order until the time indicated on the day indicated by n. For example, {15:45+1} holds an order without sending it to the market until 3:45pm on the trading day after today. If n is not entered, it is assumed to be zero. When passage of time causes the suspension qualifier to be irrelevant, an order is sent to the market only if the remaining market contingencies are satisfied.

*FIG. 23*

Send Contingent Order

Contingency Name: [Techs_up_2]

Symbol: [MSFT]

Action: [BUY ▼]

Quantity: [1,000]

Execution Type:

○ Market

○ Fixed Limit: [     ]

● Dependent Limit: [Ask]

[ Send ]  [ Cancel ]  [ Help ]

*FIG. 24*

Sending Contingent Orders

A contingent order is one that will not be sent until one or more user-defined conditions are satisfied. Furthermore, the limit price of the order, rather than being a fixed price, may be dependent on the market picture at the time that the order is sent. For example, the "dependent" limt price might be the current ask price of the stock at the time the order is sent. Or, the dependent limit price might be the most recent closing price of a stock, plus the product of [the change in the SPX index for the day] and [the beta of the stock relative to the SPX index.] To learn about the syntax that can be used to enter contingency conditions and dependent limit prices, refer to the help screen on variable syntax.

In order to apply contingent orders, a set of user-defined conditions must be defined in the Define Order Contingency screen and given a name that is used in the first field of the Send Contingent Order screen.

*FIG. 25*

Define Baskets

Enter Basket Name:
Sell_HiTech

BigCap_Healthcare
Buy Value
Sell_HiTech
NDX_Beta_Unity

[New] [Rename] [Remove]

Enter Symbol Formula:
[∩ (intersection)] [U (union)]

(tech_symlist_1 U technical_filter_3)
∩ Portfolio_4

No. of Symbols in Basket: [15]

View Symbols, Quantities

| IVAX | $100,000 |
|---|---|
| ABX | $100,000 |
| ABS | $100,000 |
| BA | $100,000 |
| BMY | $100,000 |
| CSCO | $100,000 |
| DF | $100,000 |
| EC | $100,000 |
| IVAX | $100,000 |
| MCD | $100,000 |
| MO | $100,000 |
| MRK | $100,000 |
| MU | $100,000 |
| NOC | $100,000 |
| PCG | $100,000 |
| SCH | $100,000 |

[Add Symbol]
[Remove Symbol]
[Modify Quantity]

Select Quantity Methodology: ▶

○ Amount per Symbol: [____] [USD ▶]
○ Total Basket Amount: [____] [USD ▶]

Market Index or Factor: [____] ▶

○ Exposure per Symbol: [____] [USD ▶]
○ Total Basket Amount: [____] [USD ▶]

[Save] [Cancel] [Help]

*FIG. 26*

| Select Quantity Methodology: ▼ |
|---|
| Equal Currency Amounts |
| Equal Beta or Factor Exposure |
| Target Exposure . . . |
| Advanced . . . |

*FIG. 27*

Define Baskets Screen

A basket of securities ("basket") is defined to be at least two different securities, grouped in any combination of descriptions or quantities. The "Define Baskets" tool kit allows the user to identify and define baskets according to market-, portfolio-, or general risk characteristics, as well as quantity specifications.

The Define Baskets tool kit is partitioned into four sections: these are
      o Enter Basket Name,
      o Enter Symbol Formula,
      o Select Quantity Methodology, and
      o View Symbols, Quantities.

Enter Basket Name

To create and name a new basket, enter the new name in the top field and click New. The name will be entered in the lower field along with the names of existing baskets. To define or edit the characteristics of a basket, including symbols and quantities, highlight its name in the lower field and enter or edit the symbol formula. To rename a basket, highlight its name, modify the name in the upper field, and click Rename. To delete an existing basket, including both its name and characteristics, highlight the name in the lower field and click Remove.

Enter Symbol Formula

In order to use this section, you must understand the <u>Fundamental and Technical Filters</u> window and the <u>Symbol Lists</u> window.

Symbol formulas are created by taking unions and intersections of user-defined symbol lists and user-defined filters. The union and intersection operators apply to only two lists at a time. Using parentheses, such expressions can be combined to any depth. The union of two sets of symbols includes all of the symbols that are in either of the two sets. The intersection of two sets of symbols includes all of the symbols that are in both sets. Once the symbol formula is entered and the user clicks on another part of the window, the number of symbols in the resulting basket is shown below the formula window.

*FIG. 28A*

Select Quantity Methodology

Prior to sending a basket order, quantities (preferably in currency amounts rather than in shares) must be attached to each symbol in the basket. The pull-down Select Quantity Methodology button reveals four ways of attaching quantities to symbols. These are:
- o Equal Currency Amounts,
- o Equal Beta or Factor Exposure,
- o Target Exposure, and
- o Advanced . . . .

Amounts are assumed to be in U.S. dollars unless the user chooses a different currency by way of pull-down menus. If the amount of a security is not expressed in its home currency, the system converts the expressed amount into the home currency using current FX spot rates at the time a basket order is sent. In the subsequent discussion, the term "dollars" is used to denote the currency that is chosen by the user.

o Equal Currency Amounts

This methodology causes the same amount of dollars or other currency to be associated with each security in the basket. After selecting this option, the user must enter either the amount of each security or the overall amount of the basket.

o Equal Beta or Factor Exposure

This methodology causes the same amount of market exposure to be associated with each security in the basket. After selecting this option, the user must enter the market index or the factor which will be used to compare the exposures of each security. For example, if the user types in or uses the pull-down menu to select SPX, then the beta of each security in the basket to the S&P 500 index is measured. When the basket is sent, the dollars of a security are chosen so that [dollars*SPX beta] are equated for each security. That is, fewer dollars of high-beta securities than of low-beta securities are sent. Moreover, the user can select certain factors (e.g., value, growth, current yield, etc.) to govern market exposure. When the basket is sent, dollar amounts for each security are calculated to equate the exposure to the chosen risk factor for each security in the basket.

*FIG. 28B* o Target Exposure

Selecting this option causes a pop-up window to appear. The user is coached to choose a target exposure, and to identify a second asset (either another basket or a single security). When sending the basket, the dollar amount of the second asset is varied so that the original basket plus the second basket has the desired exposure. (If this is not mathematically possible, the user is alerted before the order is delivered.) For example, the user can combine a basket of high-risk technology stocks with the right amount of T-bills to produce a target amount of beta to the Nasdaq-100 index.

o Advanced

Selecting this option causes a pop-up window to appear. The user may input specific dollar amounts for each security, or may modify the result of previous methodologies (e.g., Equal Currency Amounts) for individual securities.

View Symbols, Quantities

Once the Symbol Formulas and Quantity Methodology have been chosen, the clicking the View Symbols, Quantities button displays the list of security symbols and corresponding quantities that are associated with the highlighted basket. To add symbols individually, type a symbol in the top left field and a quantity in the top right field under the View Symbols, Quantities button and click Add Symbol. (To add a symbol without a quantity, use the "Symbols Lists" or "Fundamental and Technical Filters" window.) To delete a symbol and its quantity from the list, highlight the symbol and click Remove Symbol. To modify a quantity for a symbol, highlight the symbol, then type the new quantity in the top right field under the View Symbols, Quantities button and click Modify Quantity.

*FIG. 28C*

**Defining Baskets:
Symbol Lists**

This window allows the user to set up any number of symbol lists, each of which includes a set of known security symbols. To name a symbol list, enter the name in the top field under "Enter List Name:" and click New. The name will be entered in the lower field along with the names of existing symbol lists. To remove an existing list, including its name and corresponding security symbols, highlight the name in the lower field and click Delete. Highlight the name in the lower field and click Edit to input the symbols that make up the list.

Symbols can be added to a list that is being edited in two ways. To enter symbols individually, type a symbol in the top filed on the right side of the window under "Enter Symbol:", and click Add. The symbol will be entered in the lower right field along with existing symbols for this list. Alternatively, an existing file of symbols can be appended to a list by clicking Copy Symbols from File . . . and following the pop-up directions. Use this to copy the symbols from an existing portfolio, for example. To delete a symbol from the list that is being edited, highlight the symbol and click Remove.

Click OK to save the changes that have been made, or Cancel to ignore changes.

*FIG. 30*

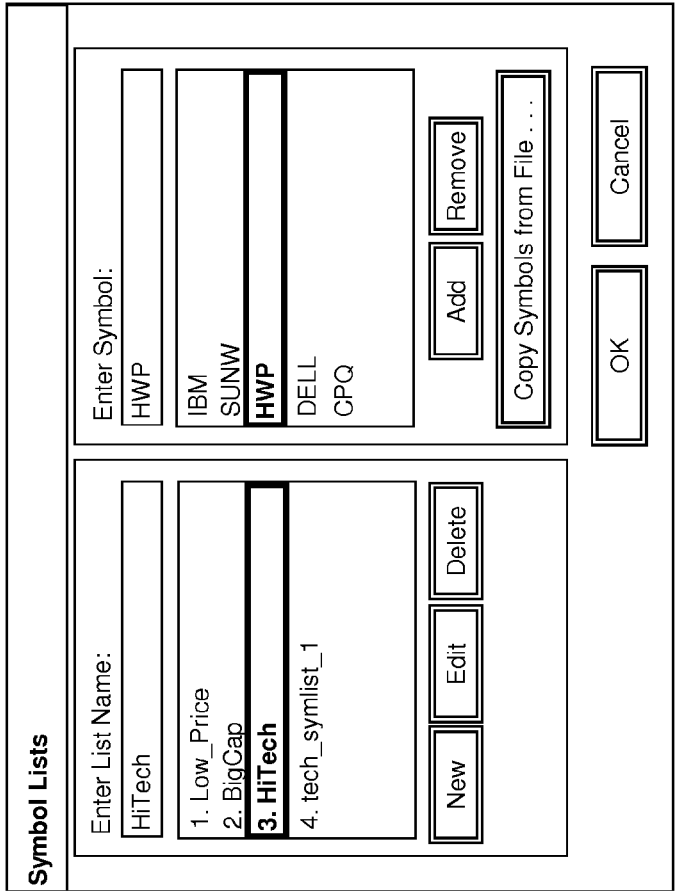

*FIG. 29*

Fundamental and Technical Filters

Filter Name:
- Momentum1
- Hi_EPS_growth_technical_filter_3
- Momentum1
- Portfolio_4

[New] [Delete]

Conditions:
[Select Variable...] [Arithmetic Operator...] [Comparison Operator...] [Constant...]

MAVG10 >= MAVG50

MAVG10 >= MAVG50
Price >= Low_52week * 1.20
Vol_Avg_Daily_Dollar > 2.0

[Add] [Edit] [Remove]

[View Symbols]

IVAX

| ABX | MRK |
| ABS | MCD |
| BMY | MLI |
| DF | NOC |
| DNY | PCG |
| EC | |
| IVAX | |
| LLY | |

[Add Symbol] [Remove Symbol]

[OK] [Cancel] [Help]

*FIG. 31*

Defining Baskets:
Fundamental and Technical Filters

Whereas the Symbol Lists window is used to set up lists of known symbols, the Fundamental and Technical Filters window is used to set up lists of symbols with desired market-, portfolio-, and risk characteristics. Each such list is called a "Filter". The window is partitioned into two sections: (1) Filter Name and (2) Conditions.

To create and name a new filter, enter the new name in the top field under Filter Name and click New. The name will be entered in the lower field along with the names of existing filters. To delete an existing filter, including both its name and conditions, highlight the name in the lower field and click Delete. Highlight the name in the lower field to define the conditions of the filter, as described below.

Conditions of a filter are used to describe its characteristics. The system searches to find all securities which satisfy all of the stated conditions. (To create a filter where any, not all, of the conditions are met, first create filters of one condition, and then apply the <u>union operator</u> to those filters in the Define baskets window.) A Condition may consist of variables, arithmetic operators, numerical constants, and a comparison operator, such as "greater than or equal to". Variables can be pre-defined by the system and include large numbers of fundamental, technical, historical, and descriptive characteristics. These variables and their mnemonic abbreviations are accessed through a pop-up screen in response to clicking the Select Variable button. Examples of variables are "one-year-ago earnings per share", "10-day moving average", "percent change in price over last 30 days", and "shares outstanding". Users can create new variables by combining system variables with arithmetic operators, as in [Book Value / Shares Outstanding]. Thus, user-defined expressions can be created and tested against user-defined benchmarks, as in the condition, [Book Value / Shares Outstanding <= Current Price].

To create a new condition, type the condition in the top field under "Conditions" and click Add. To modify a condition, highlight the condition in the lower field and click Edit. To delete a condition, highlight it in the lower field and click Remove.

Once at least one condition has been entered for a filter, clicking View Symbols will display the symbols that are associated with the filter. To add symbols individually, type a symbol in the top field under the View Symbols button and click Add Symbol. To delete a symbol from the list, highlight the symbol and click Remove Symbol.

To save the changes that have been made, click OK. To ignore the changes that have been made since the last Save, click Cancel.

*FIG. 32*

| BarterSecurities Control Center | | | | | | | |
|---|---|---|---|---|---|---|---|
| File  Options  Rules  Help | | | | | | | |
| Account 645789 ▼ | | | | | | Place Order | |
| Open Orders | Order History | Saved Orders | | Portfolio | | Messages | |
| Status | Order # | Type | Buy Sym | Buy Qty | Sell Sym | Sell Qty | |
| Open | 246241 | Lim | MSFT | 1000 | INTC | 2000 | |

Status:

BarterSecurities Control Center

The Control Center is the starting point to create and send orders, and to check on trades and positions. Although users may have multiple accounts, the information shown in the Control Center applies only to the Account designated in the upper left corner.

You may create a new order by clicking the Place Order button on the upper right of the screen. Doing so pops up the Order Entry screen from which you may (1) save the order for later use, (2) create a Market or Limit order, or (3) trade directly from the Limit Order Book (LOB) for your order.

The Open Orders tab shows orders that have been sent and are pending prior to execution. For example, if you submit a limit order that is away from the market and so cannot be traded, it will be shown in this tab. Orders are shown as Open, Filled, Out, Canceled, Part Fill, Part Fill--Canceled, or Part Fill--Out. Right-clicking on an order's line brings up a menu which allows you to change or cancel the order. Note that when you trade directly from the LOB, you receive an instantaneous confirmation; hence, your order will not show up in the Open Orders tab.

The Order History tab summarizes the barter trades that you have made. By default, trades for all symbols are shown. By filling in the appropriate fieds, you may choose to limit the viewed barter trades to only those involving one stated symbol, or only those involving two stated symbols in combination. You may also choose to view only those trades within a stated historical time period. By clicking on a column header, you may sort trades in the list according to the column's attribute. (E.g., "symbol" or "Date/Time".)

The Saved Orders tab shows all orders that you have saved for delivery in the future. If you saved an order from the Market Order Entry or Limit Order Entry screens, that fact is indicated in the Type column. Double-clicking on one of these orders pops up the respective Market or Limit screen for modification of the order and/or order delivery. If you saved the original order from the main Order Entry screen, then there is no corresponding indicator in the Saved Orders tab. Double-clicking on such an order pops up the main Order Entry screen from which you can initiate a limit or market order or choose to trade directly from the LOB. Right-clicking on any saved order pops up a menu that allows you to trade the order from the LOB, edit the order, or delete it.

The Portfolio tab lets you view your current inventory of long and short securities. Double-clicking on any security's row in this tab pops up the main Order Entry screen with the security symbol and quantity filled in to effect a closing trade. For example, if you are short 500 IBM, the Order Entry screen would show a buy of 500 IBM. After filling in a buy-side security and quantity, you may submit the order.

| Open Orders | Order History | Saved Orders | Portfolio | Messages |
| --- | --- | --- | --- | --- |

| Type | Buy Symbol | Action/ Quantity | Sell Symbol | Action/ Quantity | Debit / Credit | Special Cond.? | Date / Time |
| --- | --- | --- | --- | --- | --- | --- | --- |
| LOB | MSFT | BUY 1000 | INTC | SELL 2000 | | | 12/19/01 13:18 |
| MKT | CSCO | BUY 6000 | SEBL | SELL 4000 | | Yes | 12/19/01 13:19 |
| LIM | MSFT | BUY 1000 | CSCO | SELL 3000 | PAY $3,100 | No | 12/19/01 13:21 |
| LOB | VRTS | BUY 2000 | CSCO | SELL 4000 | | | 12/19/01 13:18 |

| |
| --- |
| Trade |
| Add |
| Edit |
| Delete |
| Cancel |

Right-click menu ⟶

*FIG. 36*

BarterSecurities Order Entry

Account: 645789 ▽

Buy Side
- Symbol: MSFT [Lookup]
- Shares: 1000 [$]

Sell Side
- Symbol: INTC [Lookup]
- Shares: 2000 [$]

[Market Order] [Limit Order]
[Save] [Clear] [Close]
[Trade From Order Book]
[Help]

Calculate Shares

Enter Dollar Amount: [      ]

[OK] [Cancel]

*FIG. 37*

BarterSecurities Order Entry

Bring up the Order Entry screen either by clicking the Place Order button on the BarterSecurities Control Center, or by double-clicking a saved order. To begin to place an order, first make sure the Account number in the upper left of the screen is correct. Then describe your order by filling in just four fields: buy-side symbol, sell-side symbol, buy-side shares and sell-side shares.

If you wish to express quantity in terms of dollars, click the "$" button next to a Shares field. The Calculate Shares screen pops up in which you can enter the desired number of dollars. Clicking OK transforms the dollars into shares of a security based on the Last Trade price of the security.

Unlike traditional one-sided orders, you don't have to specify limit or market status to trade a barter order unless you prefer to do so. You can trade directly from the Limit Order Book for your order.

Market Orders

To send a market order after you have filled in symbol and quantity information, click Market Order. You will be asked whether you would like to attach contingencies to your order. For example, you could send your market order only when the price of your buy-side security touches $50. To learn more click Market Order entry.

Limit Orders

To send a limit order after you have filled in symbol and quantity information, click Limit Order. You will be asked to attach a limit price to your order as well as other optional information  To learn more click Limit Order entry.

Trade from Order Book

To view the current offers for you order, or to trade directly against the existing offers for your order, click Trade from Order Book after you have filled in symbol and quantity information on the Order Entry screen. Using the Limit Order Book (LOB) lets you complete a trade without specifying a limit price for your trade and even without specifying Market or Limit status. You can trade on individual offers that are internal to the BarterSecurities system, or you can trade simultaneously with one-click (Quick Fill) on all of the available internal offers up to the quantities that you specified in your incoming order. To learn more about the fastest way to trade your order, click Limit Order Book.

Save Order

To save an order for use later click the Save button. The order is saved in the Saved Orders tab of the Control Center. When you double-click the order in the Control Center, your order will pop up in the Order Entry screen, from which you can designate a market or limit order, or Trade from Order Book. If you wish to save an order along with limit order information, you should click the Limit Order button on the Order Entry screen, enter the relevant information, and then click the Save button on the Limit Order Entry screen. The order will still be saved in the Saved Orders tab of the Control Center, but double-clicking the order will pop up the Limit Order Entry screen from which you can modify your information and/or send your order. Likewise for saved market orders.

*FIG. 38*

BarterSecurities Limit Order Book
Buy 1000 MSFT / Sell 2000 INTC

View    Help

National Best Bid and Offer (NBBO)

| Sym | LT | Chg | Bid | Ask | Size |
|---|---|---|---|---|---|
| MSFT | 54.98 | +1.30 | 54.98 | 55.00 | 500 x 500 |
| INTC | 27.01 | +0.80 | 27.00 | 27.02 | 200 x 1000 |

Fill Order

BUY 1000 MSFT @ 55.0075
SELL 2000 INTC @ 27.00

You save $38.50.

Quick Fill

Internal Offers

View Level II Quotes    View National Markets

| Type | Shares MSFT x INTC | MSFT Ask | Cost compared to Nat'l prices | |
|---|---|---|---|---|
| Lim | 500 x 1000 | 54.995 | SAVE $13.50 | Trade |
| MM | 250 x 500 | 55.01 | SAVE $13.75 | Trade up to |
| MM | 250 x 500 | 55.03 | SAVE $11.25 | Trade up to |

Limit Order    Market Order    Close

---

View Level II Quotes
View National Markets

*FIG. 39*

| Level II Quotes | | | | | | | |
|---|---|---|---|---|---|---|---|
| Buy 1000 MSFT / Sell 2000 INTC | | | | | | | |
| INTC | | | | MSFT | | | |
| 27.00 | 200 | 27.01 | 1200 | 54.98 | 100 | 55.00 | 200 |
| 26.99 | 100 | 27.01 | 200 | 54.98 | 400 | 55.00 | 300 |
| 26.99 | 300 | 27.02 | 1300 | 54.97 | 1100 | 55.01 | 100 |
| 26.99 | 100 | 27.02 | 400 | 54.97 | 900 | 55.01 | 400 |
| 26.98 | 500 | 27.02 | 800 | 54.96 | 300 | 55.01 | 300 |

FIG. 40

Internal and External Offers
Buy 1000 MSFT / Sell 2000 INTC

[Close]  [Change external trading preferences ...]

| Type | Shares MSFT x INTC | MSFT | Cost compared | |
|---|---|---|---|---|
| Lim | 500 x 1000 | 54.995 | SAVE $13.50 | Trade |
| NATL | 100 x 200 | 55.00 | | Trade up to |
| MM | 250 x 500 | 55.01 | SAVE $13.75 | Trade up to |
| NATL | 250 x 500 | 55.02 | | Trade up to |
| MM | 250 x 500 | 55.03 | SAVE $11.25 | Trade up to |
| NATL | 150 x 300 | 55.04 | | Trade up to |
| NATL | 100 x 200 | 55.05 | | Trade up to |
| NATL | 400 x 800 | 55.075 | | Trade up to |

FIG. 41

BarterSecurities Limit Order Book (LOB)

You can use the LOB to view national-market information for the the securities that comprise your barter order, or you may view and trade on the BarterSecurities system-generated ("Internal") offers for your order. When you trade on an Internal offer, you receive an Instant Confirmation.

For the stocks that you specified in the Order Entry screen you can view traditional single-stock National Best Bid and Offer (NBBO) prices and sizes, single-stock national Level II quotes, and national-market offers for your barter order.

You can trade on individual Internal offers, or you can trade simultaneously with one-click ("Quick Fill") on all of the available Internal offers up to the quantities that you specified in your incoming order. You can observe the value of the difference between National and Internal offers for your barter order ("You Save").

What do you want to link to?

National Market Information
Creating National Market Responses on the Limit Order Book
Trading on Individual Offers for a Barter Order
Trading using the Quick Fill button
Calculation of Savings from Internal Offers on the Limit Order Book
Instant Confirmation

*FIG. 42*

National Market Information

The BarterSecurities Limit Order Book (LOB) provides three types of national market information for the stocks that you specified in the Order Entry screen: (1) National Best Bid and Offer (NBBO) markets, (2) Level II Quotes, and (3) national offers for you barter (two-sided) order.

NBBO Markets

The top section of the LOB shows your incoming order and the NBBO markets for the two stocks that you specified in your order. The NBBO information shown is the last trade, daily pice change, bid, ask, bid size, and ask size for each security. Bid and ask sizes are shown in numbers of shares, rather than in hundreds of shares. Columns can be reordered by dragging and dropping.

Level II Quotes

Level II Quotes for the two stocks that you specified in your barter order can be viewed either by clicking the View Level II Quotes button in the Individual Offers section of the LOB, or by choosing View Level II Quotes from the View menu at the top of the LOB.

In the Level II Quotes screen live Level II bids and offers are shown for your sell-side security on the left and for your buy-size security on the right. Clicking the <Collapse> button places the bids of the security that you intend to sell next to the asks of the security that you intend to buy. In this form it is easier to see the capacity of the national markets to satisfy your incoming order.

National ("External") Barter Offers

National offers for your two-sided order can be viewed either by clicking the View National Markets button in the Individual Offers section of the LOB, or by choosing View National Markets from the View menu at the top of the LOB.

The National Markets screen shows the quantity of shares (in the ratio that you specified in your incoming order) that is available at respective bid prices (for your sell-side stock) and ask prices (for your buy-side stock). This information is compared to the offers that are internal to the BarterSecurities system to calculate the price and quantity advantages of trading on Internal markets.

*FIG. 43*

Trading on Individual Offers for a Barter Order

The bottom section of the Limit Order Book (LOB), entitled "Internal Offers", normally shows several offers for the two-sided order that you specified in the Order Entry screen. These offers are internal to the BarterSecurities system; i.e., they are not available in the national markets. The system displays all available internal offers up to a cumulative share quantity equal to the quantities that you specified in Order Entry screen. The offers are ranked from most favorable to least favorable offer price, and they retain the ratio of buy-quantity to sell-quantity that you specified. IMPORTANT: All offers are expressed as selling your sell-side security on the current NBBO bid price and buying your buy-side security at the variable Ask price shown.

The data displayed for each internal offer are (1) a barter quantity expessed in actual (not hundreds of) shares, (2) a sell-side security bid price (i.e., the current NBBO bid), (3) a buy-side security ask price (used to rank the offers) and (4) a dollar amount of savings relative to executing your order on the national markets. See how Savings is computed.

Next to the most attractive offer is a Trade button and next to each subsequent offer is a "Trade up to" button. Clicking on one of these buttons generates an instantaneous trade report at the quantities and prices currently displayed. If a trader clicks a "Trade up to" button, then the indicated offer and all more attractive offers are sent for execution. NOTE: Traders must exercise care if displayed offers are changing rapidly.

A Save amount less than zero means that it may be more expensive to execute your order internally (i.e., on the BarterSecurities system) than on a national market. However, the BarterSeucirites system has these advantages: (1) your order confirmation is immediate, (2) your specified security quantity ratio is preserved, and (3) the internal quantity depth offered may be greater than on the national market.

*FIG. 44*

Trading using the Quick Fill button

The middle section of the Limit Order Book (LOB), entitled "Fill Order", provides a convenient way to view the aggregation of the Individual Offers shown in the bottom section of the LOB. The Quick Fill offer is designed to fill your incoming order, provided that enough individual offers exist to do so. The Quick Fill quantity is the sum of the available individual offer quantities up to the size of your incoming order. The Quick Fill sell-side price is that security's current NBBO bid and the buy-side price is the quantity-weighted average of the individual offer buy-side ask prices.

The data displayed for the Quick Fill offer are (1) buy- and sell-side quantities expessed in actual (not hundreds of) shares, (2) the sell-side security bid price (i.e., its current NBBO bid), (3) a buy-side security ask price and (4) a dollar amount of savings relative to trading the Quick Fill quantities on the national markets. See how Savings is computed.

To trade against the Quick Fill offer, just click the Quick Fill button. Doing so generates an instantaneous trade report at the quantities and prices currently displayed. NOTE: Traders must exercise care if displayed offers are changing rapidly.

Quick Fill savings less than zero means that it may be more expensive to execute your order internally (i.e., on the BarterSecurities system) than on a national market. However, the BarterSeucirites system has these advantages: (1) your order confirmation is immediate, (2) your specified security quantity ratio is preserved, and (3) the internal quantity depth offered may be greater than on the national market.

*FIG. 45*

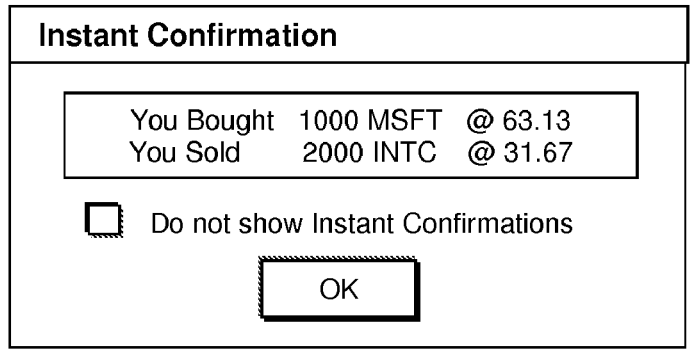

FIG. 46

> Instant Confirmation
>
> Whenever the Quick Fill button (middle of LOB) or a Trade or "Trade up to" button (lower part of LOB) is clicked, an immediate confirmation is generated. The Instant Confirmation shows the amount of the buy-side security purchased and the amount of the sell-side security sold, along with the respective prices.
>
> If an LOB offer is changing as it is clicked, the Instant Confirmation may not be for the amount of buy-side and sell-side securities that you intended to buy/sell. However, the following conditions are always satisfied: (1) you will always trade the buy-side and sell-side securities in the ratio indicated in the Order Entry screen, and (2) you will never trade more than the quantities indicated in the Order Entry screen.
>
> When the Instant Confirmation is received, you no longer have an order pending. If you have not traded all of the quantity that you desired to trade, you must send an additional order by clicking again on the Quick Fill or Trade (or "Trade up to") buttons. The maximum quantities shown in the offers will reflect the amount of the original order that has already been traded.

FIG. 47

**Creating National Market Responses
on the BarterSecurities Limit Order Book**

To illustrate how national offers for a barter order are calculated, suppose you have just submitted the order:

BUY 1000 MSFT / SELL 2000 INTC.

Also assume that the national order books for INTC on the bid side and MSFT on the ask side are as shown in Tables 1A and 1B.

**Table 1A
INTC: National Bids**

| Bid Price | Bid Size |
|---|---|
| 27.00 | 200 |
| 26.99 | 500 |
| 26.98 | 500 |
| 26.97 | 1000 |

**Table 1B
MSFT: National Asks**

| Ask Price | Ask Size |
|---|---|
| 55.00 | 500 |
| 55.01 | 1000 |

Offer prices for your order (executed in a 2-1 ratio) as derived from the national markets for the single stocks, are shown in Table 2 in order of best to worst offer.

**Table 2
National Offers for your Barter Order
Buy 1000 MSFT / Sell 2000 INTC**

| Row Number | Size (MSFT x INTC) | INTC Bid Price | MSFT Ask Price | Barter Offer Price (MSFT − 2 x INTC) |
|---|---|---|---|---|
| 1 | 100 x 200 | 27.00 | 55.00 | 1.00 |
| 2 | 250 x 500 | 26.99 | 55.00 | 1.02 |
| 3 | 150 x 300 | 26.98 | 55.00 | 1.04 |
| 4 | 100 x 200 | 26.98 | 55.01 | 1.05 |
| 5 | 400 x 800 | 26.97 | 55.01 | 1.07 |

Based on the best MSFT offer of 500 shares (Table 1B), the system looks for 1000 shares on the INTC side. It finds only 200 INTC at the best price (Table 1A), so that only 100 MSFT can be matched with it (Table 2, row 1), leaving 400 MSFT offered at 55.00. The 400 MSFT at 55.00, requires 800 INTC, but there is only 500 INTC at the next price of 26.99 (Table 1A). It can be matched against only 250 MSFT at 55.00 (Table 2, row 2), leaving 150 MSFT at 55.00 that is still usable, and so on until there is enough depth to fill your order, or until the national books are exhausted.

In Table 2, the Barter Offer Price is the cost of trading the indicated piece of your order at each row's prices and sizes, and is expressed per 100 shares of the buy side, in this case MSFT.

*FIG. 48*

**Calculation of Savings from Internal Offers
on the BarterSecurities Limit Order Book**

Trading on the BarterSecurities system saves you money relative to the national markets. An illustration of this is given below.

Suppose you have just submitted the order: BUY 1000 MSFT / SELL 2000 INTC.

Also suppose that the national market offers for your order are as is shown in Table 1. To see how these offers were calculated, click here. [Table 1--See Figure 50]

Often, there are additional offers that are internal to the BarterSecurities system that will improve national markets by providing either more favorable execution prices, by providing a greater quantity to trade, or both. Certain offers may originate with professional marketmakers. Other internal offers may arise due to outstanding limit orders, either alone or in combination. For example, a limit order to buy INTC and sell CSCO, and a second order to buy CSCO and sell MSFT, may create an "implied' offer for an incoming barter order to buy MSFT and sell INTC. To learn more, see Order Matching.

Suppose that one marketmaker is willing to respond to your barter order by simultaneously buying 1000 INTC at 27.00 and selling 500 MSFT at 55.00, and that a second marketmaker is willing simultaneously to buy 1000 INTC at 26.99 and sell 500 MSFT at 55.01. In the form of the previous table, the marketmaker offers are expressed in Table 2. [Table 2--See Figure 50]

The offer prices for your barter order, updated to include the marketmaker offers, are shown in Table 3. Note that the second marketmaker's internal response is split into two rows (#4 and #5) because only the first row of the two is necessary to fill your order of 2000 INTC, 1000 MSFT. [Table 3--See Figure 50]

The introduction of internal offers represents savings to you, the customer. To compute these savings, which are shown in Table 4, the system compares the internal offers to the offers that would have been available for those same shares in the national markets. In Table 4 [Table 4--See Figure 50] the first row shows that the first internal offer of 500 shares (Table 3, row 2) takes the place of three national offers of varying share amounts (Table 3, rows 1, 3, and 6). That is, an offer of 1.00 replaces three national offers of 1.00, 1.02, and 1.04. The weighted national offer is 1.022 (i.e., $1.00 x 100 + $1.02 x 250 + $1.04 x 150), so the savings is $11.00 (500 x $0.022). Similarly, the Internal offer of 1.03 (Table 3, rows 4 and 5) would have been traded at 1.05 and 1.07 in the national market (Table 3, rows 7 and 8), implying a savings of $18.00 ($0.02 x 100 + $0.04 x 400) on the BarterSecurities internal side. The total savings for your complete order is $29.00.

FIG. 49

Calculation of Savings from Internal Offers on the BarterSecurities Limit Order Book

Tables 1-4

Table 1
National Offers for your Barter Order
Buy 1000 MSFT / Sell 2000 INTC

| Row Number | Size (MSFT x INTC) | INTC Bid Price | MSFT Ask Price | Barter Offer Price (MSFT – 2 x INTC) |
|---|---|---|---|---|
| 1 | 100 x 200 | 27.00 | 55.00 | 1.00 |
| 2 | 250 x 500 | 26.99 | 55.00 | 1.02 |
| 3 | 150 x 300 | 26.98 | 55.00 | 1.04 |
| 4 | 100 x 200 | 26.98 | 55.01 | 1.05 |
| 5 | 400 x 800 | 26.97 | 55.01 | 1.07 |

Table 2
Marketmaker Offers

| Size (MSFT x INTC) | INTC Bid Price | MSFT Ask Price | Barter Offer Price (MSFT – 2 x INTC) |
|---|---|---|---|
| 500 x 1000 | 27.00 | 55.00 | 1.00 |
| 500 x 1000 | 26.99 | 55.01 | 1.03 |

Table 3
BarterSecurities Offers for your Barter Order
Buy 1000 MSFT / Sell 2000 INTC

| Row Number | Size (MSFT x INTC) | INTC Bid Price | MSFT Ask Price | Order Type | Barter Offer Price (MSFT – 2 x INTC) |
|---|---|---|---|---|---|
| 1 | 100 x 200 | 27.00 | 55.00 | National | 1.00 |
| 2 | 500 x 1000 | 27.00 | 55.00 | Internal | 1.00 |
| 3 | 250 x 500 | 26.99 | 55.00 | National | 1.02 |
| 4 | 150 x 300 | 26.99 | 55.01 | Internal | 1.03 |
| 5 | 350 x 700 | 26.99 | 55.01 | Internal | 1.03 |
| 6 | 150 x 300 | 26.98 | 55.00 | National | 1.04 |
| 7 | 100 x 200 | 26.98 | 55.01 | National | 1.05 |
| 8 | 400 x 800 | 26.97 | 55.01 | National | 1.07 |

Table 4
Savings from Internal Order

| | Internal Offers | | National Offers | | |
|---|---|---|---|---|---|
| Buy-side Shares | Table 3 Rows | Barter Offer Price | Table 3 Rows | Barter Offer Price | Savings |
| (1) | (2) | (3) | (4) | (5) | (1) x [(5) – (3)] |
| 500 | 2 | 1.00 | 1,3,6 | 1.022 | $11.00 |
| 500 | 4,5 | 1.03 | 7,8 | 1.066 | $18.00 |
| Total | | | | | $29.00 |

*FIG. 50*

BarterSecurities Market Order Entry

Buy 1000 MSFT / Sell 2000 INTC

● No price contingencies

○ Execute Dual Market Order when buy side price touches  $ [    ]

○ Execute Dual Market Order when buy side price touches  $ [    ]

[Submit]  [Save]  [Close]

*FIG. 52*

Limit and Market Orders

Limit Orders

Usually, limit prices for a barter order are expressed in terms of a Total Dollar Limit for the order as a whole, rather than in terms of per-share limit prices for individual securities.

Consider the barter order to Buy 1000 MSFT and Sell 2000 INTC. Suppose a trader wants to net from this order the same amount as if MSFT traded at $50 and INTC traded at $26. This is equivalent to receiving $2000; i.e., [2,000 x $26 – 1,000 x $50]. By setting the Total Dollar Limit to "Receive at least $2000", the trader allows the trade to execute at any combination of per-share prices that satisfy the limit, such as ($50/$26), ($52/$27), ($49/$25.50), etc.

The Total Dollar "current market" is shown in the upper right corner of the Limit Order Entry screen under the headers Last, Bid, and Ask. These values are based on the markets in the individual securities shown at the bottom of the screen. If you enter an order to BUY 1000 MSFT / SELL 2000 INTC, and if the current single-stock markets are:

```
              Last      Bid      Ask
     MSFT    54.98    54.97    55.00
     INTC    27.01    27.00    27.02
```

Then, as explained below, the Total Dollar spread of a barter order Buy 1000 MSFT / SELL 200 INTC would be:

```
              Last         Bid         Ask
           PAY $960    PAY $930    PAY $1000
```

The Total Dollar "Last" is based on the "Last" prices of the individual securities. That is, "PAY $960" = +1000 x 54.98 - 2000 x 27.01. The Total Dollar Bid is based on buying MSFT on its bid and selling INTC on its ask; i.e., "PAY $930" = +1000x 54.97 - 2000 x 27.02. Normally you would not be able to trade at these prices immediately, but marketmakers might be able to do so. The Total Dollar Ask is based on buying MSFT on its ask and selling INTC on its bid; i.e. "PAY $1, 000" = +1000 x 55.00 - 2000 x 27.00. Normally you would be able to trade at these prices immediately.

Thus, a Total Dollar Limit of "Pay no more than $850" is $150 more favorable to you than the value at which you can trade immediately, and it is $80 more favorable than the value at which marketmakers might be able to trade your order for themselves.

If you prefer to think about your Total Dollar Limit in terms of individual stock prices, you may use the Dollar Limit Calculator in the middle of the Limit Order Entry Screen. Enter two share prices and click the Insert Dollar Limit button to create your Total Dollar Limit.

Setting a Total Dollar Limit can produce the same dollar results for a barter order as setting per-share limits, but it is less restrictive. It is recommended because it produces a greater probability of getting a barter order executed. Per-share limits should be used only if you are sensitive to the trade price of one of the legs of the order. If you do wish to set a per-share limit price for one or both securities in your barter order click on Conditions>>>. An additional segment of the Limit Order Entry screen appears, which allows you to set per-share limit prices and to set timing and other options for your order.

Market Orders

The default market order is "No price contingencies", which means that your order will be delivered as soon as you submit and confirm it. Alternatively, you may place a per-share price contingency on the delivery of the order. Upon submitting the order the system will ask you to confirm your order currently, but the order will not be delivered to the market until the indicated price contingency is satisfied. If and when the order is delivered to the market, it will behave like two traditional market orders: one for the buy leg and one for the sell leg.

*FIG. 53*

Marketmaker Toolkit

The BarterSecurities system provides a toolkit which allows marketmakers to

-- measure the attractiveness of any incoming barter order,
-- specify how aggressively or passively to respond to it, either manually or automatically, using customized rules, and
-- isolate the profit and loss impact of each decision rule on a real-time basis.

Each rule that a marketmaker composes consists of a set of conditions and a set of price and size tiers which define the responses to a barter order if the conditions are satisfied.

For example, conditions might filter for particularly attractive barter orders with the buy- and sell- legs in roughly equal dollar amounts, having high liquidity, and coming from the same industry. A marketmaker can choose to show an automatic response to these types of orders at the corresponding NBBO price reduced by, say, 20% of the NBBO spread, for the current NBBO size. (Note that at the time that a response to an order is made, marketmakers know which security is being bought and which security is being sold.)

Marketmakers can customize trade tickers, or position and P&L reports to give them exactly the information they need on a real-time basis. Each report is associated with a data source, so that a P&L report may be constructed for only the securities in a defined symbol list, or only the trades that were invoked by a selected rule, etc.

*FIG. 55*

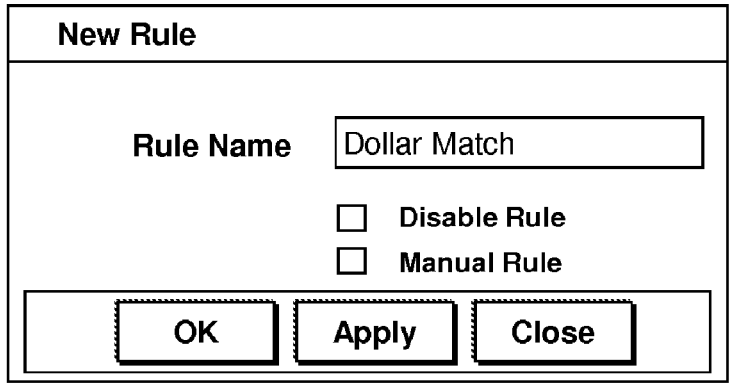

FIG. 56

Creating a Marketmaker Toolkit Rule

To create a rule, select New... from the Rule menu of the Marketmaker Toolkit. In the New Rule pop-up screen, enter the name of your rule, and choose whether to disable the rule or to make the rule manual.

Only Active rules are used to respond to barter orders. A rule can be activated or disabled at any time by right-clicking the rule name in the Toolkit and selecting the appropriate attribute. Disabled rules are dimmed in the Toolkit window.

All active rules produce automatic responses to barter orders if the rule's conditions are satisfied, unless you choose to respond manually. Responses to orders can be toggled from automatic to manual by right-clicking the rule name and selecting the appropriate attribute.

FIG. 57

Creating a Marketmaker Toolkit Condition

To create a set of conditions for a rule first click on the rule to select it. Then select New... from the Condition menu. In the Add Condition pop-up screen, choose a Variable and an Operator and enter a Value to define the condition.

Variables are keywords that define characteristics of the barter order such as (1) closeness of the buy-side and sell-side dollar amounts, (2) industry closeness of the two legs, (3) volumes, (4) market capitalizations, etc. Additionally, marketmakers can use variables to test for inclusion in default symbol lists, such as the S&P500, or in symbol lists that they define using the Symbol menu in the Toolkit.

Operators are usually equality and inequality signs, but change to <IN> and <NOT IN> when a variable is testing for inclusion in a symbol list.

An example of a condition is:

$$Delta < 10\%,$$

where Delta is a measure of the closeness of the buy-side and sell-side dollar amounts. A delta of 10% means that the dollar amounts of the two barter order legs differ by 10% of the greater amount.

Another example of a condition is:

buy_symbol IN "Big Tech", where "Big Tech" is the name of a symbol list that the user has defined.

*FIG. 59*

Definitions of Variables and Allowable Value Ranges or Units.
See Examples

Legend:
   Variable (range or units)
   Definition

Delta (0-100%)
abs($long - $short) / (max( $long, $short))

SICmatch (0,1,2,3,4)
Number of SIC code digits of buy and sell that match, starting from left.

MCAPmax ($bil)
Market Cap of larger-cap stock

MCAPmin ($bil)
Market Cap of smaller-cap stock

VOLmax ($mil)
Avg Daily $-volume traded, last 30 days, of more-active stock.

VOLmin ($mil)
Avg Daily $-volume traded, last 30 days, of less-active stock.

BA_Debit (Dollars)
Debit value of bid/ask spread of Barter Order on NYSE and Nasdaq inside prices.

The following variables are used to check for inclusion in a Symbol List.

buy_symbol (List Name)
Symbol of the incoming order's buy-side security.

sell_symbol (List Name)
Symbol of the incoming order's sell-side security.

both_symbols (List Name)
The set of two incoming security symbols.

one_symbol (List Name)
At least one of the incoming security symbols.

The following variables are used to query a marketmaker's (MM) portfolio status.

Inventory_Buy_Shs (Shares)
The number of shares of the incoming sell-side security (i.e., the MM is buying) currently in the MM portfolio.

Inventory_Sell_Shs (Shares)
The number of shares of the incoming buy-side security (i.e., the MM is selling) currently in the MM portfolio.

Inventory_Buy_Val (Dollars)
The dollar value of the incoming sell-side security (i.e., the MM is buying) currently in the MM portfolio.

Inventory_Sell_Val (Dollars)
The dollar value of the incoming buy-side security security (i.e., the MM is selling) currently in the MM portfolio.

*FIG. 60*

Examples of Variable usage.

Delta measures the dollar amount of exposure of the Barter Order. If the retail trader's buy side debit is $100,000 and the sell side credit is $75,000, the delta is 25% = |100000 - 75000| / max(100000, 75000).

SICmatch shows how industry-related two stocks are. Matched digits are counted from the left until a match fails, after which remaining digits do not count.

| SIC #1 | SIC #2 | SICmatch |
|---|---|---|
| 4013 | 4031 | 2 |
| 2631 | 4031 | 0. |

MCAPmax and MCAPmin measure market capitalization of the bigger and smaller stock, respectively. To ensure that both stocks' market cap exceeds $1 billion, enter "MCAPmin >= 1". To ensure that at least one stock's market cap exceeds $10 billion, enter "MCAPmax >= 10".

VOLmax and VOLmin measure the dollar volume of the more- and less-active stock, respectively. To ensure that both stocks trade at least $2 million per day, on average, enter "VOLmin >= 2". To identify trades in which neither stock trades more than $2 million per day, on average, enter "VOLmax <=2".

BA_Debit is the dollar width of a Barter Order on the NBBO market. If a retail trader wishes to buy 100 ABC on the NBBO market 50-50.25 and sell 300 XYZ on the NBBO market 20-20.10, then the dollar size of the spread is $55, or 100 x 0.25 + 300 x 0.10.

"Symbol" variables allow the marketmaker to identify whether stock symbols fall in marketmaker-created lists. Suppose the marketmaker sets the symbol list below:

List_1: IBM, CPQ, DELL, SUNW, HWP

To ensure that at least one of the Barter Order symbols falls in the list, enter
         one_symbol IN List_1.

To ensure that neither Barter Order symbol falls in the list, enter
        both_symbols NOT IN List_1.

Use "Inventory" variables to test a marketmaker's portfolio. To test whether a portfolio is short the security that the marketmaker is buying, enter inventory_buy_shs < 0.

*FIG. 61*

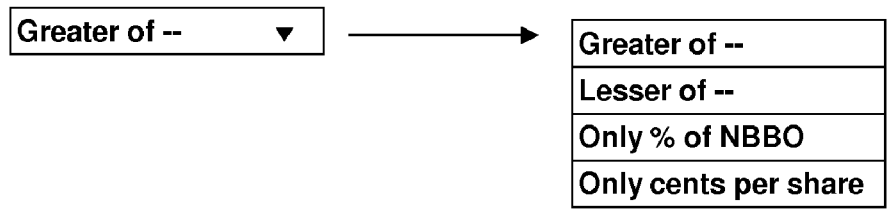
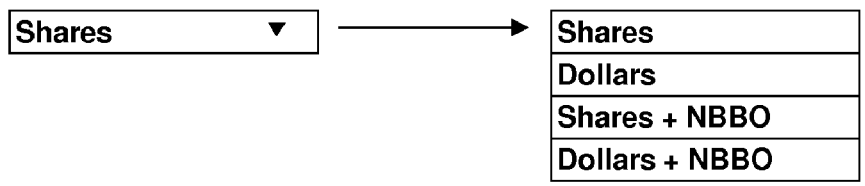
FIG. 62

Creating Marketmaker Toolkit Price/Size Tiers

Use Price/Size Tiers to create a set of responses to barter orders that satisfy the conditions of a certain rule.

To create the response tiers, first click on a rule to select it. Then select New... from the Tier menu. In the Add Price/Size Tier pop-up screen, choose an Offer Price and an Offer Size. (A marketmaker response to a barter order is referred to as an "offer", although both a single-stock bid and a single-stock offer are implied. At the time that the offer is made, a marketmaker knows which security is being bought and which is being sold.)

An offer price may be expressed as a percentage of the current National Best Bid and Offer (NBBO) spread, in incremental cents per share, or as the greater or lesser of those two quantities. For example, suppose an incoming barter order is: "Buy 1000 ABCD / Sell 2000 WXYZ" , and suppose the NBBO markets are:

|      | Bid   | Offer |
|------|-------|-------|
| ABCD | 52.02 | 52.05 |
| WXYZ | 24.01 | 24.03.|

The NBBO dollar spread for the barter order is $70.00; i.e., 1000 * 0.03 + 2000 * 0.02). Therefore, a barter offer price of 90% implies a spread of $63.00. A marketmaker who offers at 90% would be willing simultaneously to buy WXYZ on the bid and sell ABCD at 52.043. ($63 = 1000 * 0.023 + 2000 * 0.02.)

An offer size is expressed either in shares or dollars, either alone or in addition to the current NBBO depth. An offer size of $20,000 means that each leg of a barter order may be traded up to that amount.

Marketmakers can attach any number of price/size tiers to a given rule.

*FIG. 63*

Create Ticker

Ticker Name: Philippe

Data Source:
- ○ All Trades
- ○ Trades with one symbol:
- ● Trades from symbol list: Big Tech
- ○ Trades invoked by rule:
- ○ Trades invoked by rule:
  - tier:

Columns:
- ☐ Pair
- ☐ Symbol
- ☐ Share quantity
- ☐ Dollar Value
- ☐ Trade Price
- ☐ Rule invoked
- ☐ Price tier
- ☐ Time stamp

[ OK ]  [ Cancel ]

*FIG. 64*

Trade Ticker
Name: PHILIPPE
Data Source: Symbol List "Big Tech"

| Pair | Symbol | Shares | Dollars (000's) | Trade Price | Rule | Tier | Time |
|---|---|---|---|---|---|---|---|
|  | MSFT | +600 | 44 | 73.02 | BothNDX | 89% | 9:35:01 |
| XX | INTC | −1200 | 45 | 37.12 | BothNDX | 89% | 9:35:01 |
|  | CSCO | −1000 | 24 | 23.55 | MyStocks | 97% | 9:38:15 |
|  | INTC | +200 | 7 | 37.02 | DollarMatch | 90% | 9:42:51 |

Right-click menu ⟶

| Find Sibling |
| This Trade Snapshot P&L |
| All Trades Snapshot P&L |

*FIG. 65*

Using Trade Tickers

Trade Tickers produce in real-time a new line of information for each of the marketmaker's automatic and manual trades.

Marketmakers can create different tickers based on multiple Data Sources. For example, one ticker might show the trades for all stocks within a certain user-defined symbol list, while another ticker might show all trades prompted by a selected trading decision rule.

Marketmakers also can select the Columns that they want the ticker to show, such as shares traded and trade price, and the rule that invoked a trade. The column Pair indicates which trades in a Trade Ticker were executed as part of the same barter order. Certain trades in a Trade Ticker may appear without the corresponding legs of their barter orders since the data source of the ticker excludes one leg. For example, a data source of Nasdaq 100 stocks would exclude IBM from a ticker in the case of a MSFT vs. IBM barter order. In this case, right-clicking on the unmatched trade in the ticker allows a marketmaker to access the trade's "sibling".

Marketmakers can modify, delete, or move Trade Ticker columns by using the Monitor menu, by clicking and dragging column items within the toolkit window, or by right-clicking on the columns in the Trade Ticker screen. Marketmakers can retrieve snapshot P&L information on one or more trades by right-clicking on a trade ticker row.

*FIG. 66*

Create Position / P&L Report

Report Name: [ ]

Report Breakout:
- ○ By stock symbol
- ○ By rule invoked
- ○ By rule and tier invoked
- ○ Show totals only

Data Source:
- ○ All Trades
- ○ Trades with one symbol: [ ]
- ○ Trades from symbol list: [ ]
- ○ Trades invoked by rule: [ ]
- ○ Trades invoked by rule: [ ]
- tier: [ ]

Time Period:
- ○ Today, real-time
- ○ Hours, today: [hhmm] to [hhmm]
- ○ Prior dates: [mmddy] to [mmddy]
- ○ Inception to date

Columns:
- ☐ Share Inventory
- ☐ Dollar Inventory
- ☐ No. of Trades
- ☐ Total P&L
- ☐ Realized P&L
- ☐ Unrealized P&L
- ☐ Rule invoked
- ☐ Price tier invoked

[ OK ]  [ Cancel ]

*FIG. 67*

Marketmaker Position and P&L
Name: JENNIFER
Breakout: By Rule / Tier Invoked
Source: Symbol List "Technical Buy"
Period: Today / Real-time
Dollars in 000's

| Rule | Tier Price | Dollar Inventory | Total P&L | Realized P&L | Unrealized P&L |
|---|---|---|---|---|---|
| ALL | ALL | 300 | 18 | 10 | 8 |
| Dollar Match | ALL | (1,200) | 13 | 8 | 5 |
|  | 90% | 1,000 | 8 | 3 | 5 |
|  | 98% | (1,000) | 4 | 3 | 1 |
|  | 105% | 800 | 1 | 2 | (1) |
| My Stocks | ALL | (900) | 8 | 1 | 7 |
|  | 95% | 1,200 | 6 | 1 | 5 |
|  | 100% | (2,100) | 2 | 0 | 2 |
| Both NDX | ALL | 2,400 | (3) | 1 | (4) |
|  | 95% | 400 | (2) | (1) | (1) |
|  | 99% | 700 | (3) | 1 | (4) |
|  | 104% | 1,300 | 2 | 1 | 1 |

FIG. 68

Marketmaker Position and P&L
Name: ROBERT
Breakout: By Symbol
Source: Symbol List "Big Tech"
Period: Today / Real-time
Dollars in 000's

| Symbol | Share Inventory | Total P&L | Realized P&L | Unrealized P&L |
|---|---|---|---|---|
| ALL | | 18 | 10 | 8 |
| CSCO | +2,200 | 3 | 2 | 1 |
| INTC | (1,000) | 4 | 5 | (1) |
| JDSU | +3,000 | (2) | 1 | (3) |
| MSFT | +800 | 6 | 3 | 3 |
| SEBL | (1,200) | 4 | (2) | 6 |
| SUNW | (2,100) | 3 | 1 | 2 |

Right-click menu  See Individual Trades for this Row

Using Position and Profit & Loss Reports

A Position and P&L Report (PPL) shows the cumulative share and/or dollar inventory along with profit & loss calculations, for all of the marketmaker's automatic and manual trades. Multiple PPLs may be created and viewed simultaneously. The information in these reports may be grouped ("Report Breakout") as the user desires, and the trades which comprise these reports may be a chosen subset ("Data Source") of all trades.

For example, the user may have P&L grouped and summarized by security symbol, or according to the trading decision rule or rule/tier combination which invoked each trade. The data source can be a subset of stock symbols (designated by a Symbol List name), or it can be all trades invoked by a Marketmaker Toolkit rule or rule/tier combination. Therefore, marketmakers can monitor on a real-time basis the profit and loss contribution of each decision rule and price/size tier that they create. This gives them incredible insight into the productivity of their rules and allows them to improve profitability over time.

Share and dollar inventories of securities, and realized, unrealized, and total P&L's can be generated either on a real-time basis or for historical periods. Report Columns can be chosen, modified, and moved as they are for Trade Tickers.

Any row in a Position and P&L Report can be right-clicked to generate a new report of individual trades that comprise the row.

*FIG. 70*

Responding with Manual Offers

The BarterSecurites Marketmaker Toolkit lets you define rules that automatically generate one or more offers on the Limit Offer Book for an incoming barter order when predefined conditions are met. However, you may specify in the rule that when the stated conditions are met, you are to be alerted so that you can make a manual response to the order rather than having offers generated automatically.

When the BarterSecurities Request for Manual Offer screen appears, you can review the incoming order and then (1) deliver an offer according to the price and size defaults that you set, (2) deliver an offer after modifying the price and/or size defaults, (3) close the screen manually without delivering an offer, or (4) let the screen close automatically, after a stipulated number of seconds, without delivering an offer. Note that as long as the countdown clock is running, the sender of the incoming order will be aware that a manual offer is pending and may be delivered.

The BarterSecurities Request for Manual Offer screen is partitioned into four sections from top to bottom: (1) Incoming Order, (2) Offer Size, (3) Offer Price, and (4) Action.

Incoming Order

On the left is the incoming order expressed as it was entered; that is, the marketmaker may take the other side of the trade. In the following discussion, the term "buy-side" ("sell-side") refers to the security that the sender is buying (selling) and that the marketmaker may sell (buy). The dollar values of both the buy-side and sell-side securities are shown, along with the Delta of the trade. The smaller the delta, the closer together are the buy-side and sell-side dollar values. A delta of zero implies that the dollar values match. A delta of one implies that the barter order is almost one-sided.

*FIG. 73A*

The marketmaker may click the View Level II button to view real-time Level II quotes for the buy- and sell-side securities. The marketmaker may click the Modify Defaults button to change how the default Offer Size and Offer Prices are determined when the Request for Manual Offer screen pops up.

Offer Size

An offer size for the incoming barter order is calculated based on either (1) the price/size tiers stipulated in the Marketmaker Toolkit, or (2) the defaults that you specify in the Edit Manual Offer Defaults screen. The quantities in the offer size are always in the same ratio as the quantities in the incoming order. If you wish, you may change the initial size by (1) clicking the size increment/decrement buttons, (2) by typing in a new size in the buy-side or sell-side fields (the opposite size is changed to retain the incoming share ratio), or (3) clicking the Full Size button, which causes the offer size to become the same as the incoming order size.

Offer Price

An offer price for the incoming barter order is calculated based on either (1) the price/size tiers stipulated in the Marketmaker Toolkit, or (2) the defaults that you specify in the Edit Manual Offer Defaults screen. If you wish, you may change the initial offer price by (1) clicking the price increment/decrement buttons, or (2) by typing in a new value in the available field.

Action

At any time, you may (1) click the green Offer button to send your offer as stated, (2) click the red Cancel button to close the screen without sending an offer, or (3) click the Stop button to stop the rundown clock. If you make none of these actions, the screen will close automatically when the clock has run down to zero.

*FIG. 73B*

New Symbol List

Add
Fill in the Symbol field and click Add to add one symbol to the new symbol list.

Remove
Select a symbol from the Symbol List column and click Remove to remove the symbol from the new symbol list.

Clear
Click to remove all symbols from symbol list.

Import
Click to copy a symbol list from another application.

Union
To add the symbols from an existing symbol list to the symbols in the Symbol List column, select one or more names from the List Names column and click Union. Duplicate symbol names will be removed from the new list.

Intersection
To create a new list from symbols that are common to the symbols in the Symbol List column and the symbols in one or more existing lists, select the names from the List Names column and click Intersection.

*FIG. 76*

View Symbol Lists

New
Click New to create a new symbol list. A pop up screen requests the name of the new symbol list.

Rename
Select a symbol list name and click Rename to rename a symbol list while keeping its symbols intact. To base a new symbol list on the symbols in an existing list, use the New... function.

Delete
Select a symbol list name and click Delete to remove the list name, along with its symbols.

Add
Fill in the Symbol field and click Add to add one symbol to the selected symbol list.

Remove
Select a symbol from the Symbol List column and click Remove to remove the symbol from the selected symbol list.

*FIG. 75*

SYSTEM AND METHOD OF RESPONDING TO ORDERS IN A SECURITIES TRADING SYSTEM

RELATED APPLICATIONS

This application claims priority to U.S. Provisional Patent Application No. 60/271,541 filed Feb. 26, 2001, U.S. patent application Ser. No. 09/454,035 filed Dec. 3, 1999, U.S. Provisional Patent Application No. 60/161,318, filed Oct. 25, 1999, U.S. Provisional Patent Application No. 60/153,142, filed Sep. 9, 1999, and U.S. Provisional Patent Application No. 60/147,243, filed Aug. 5, 1999, each being herein incorporated by reference.

FIELD OF THE INVENTION

The present invention relates to systems and methods for facilitating the trading of items or securities and more particularly to systems and methods for facilitating the electronic bartering of items or securities.

BACKGROUND

Automated computer systems matching buy and sell orders for trading stocks, futures and other properties are well known in the art. An example of such a system is shown in U.S. Pat. No. 3,573,747 to Adams, et al., which discloses a system for matching buy and sell orders for fungible properties between traders. After the initial match, one embodiment of this system allows traders to negotiate other terms of the transaction while all traders are continuously apprised of the negotiation status. A system disclosed in U.S. Pat. No. 4,412,287 to Braddock relates to trading stock and discloses a central computer that matches buy and sell orders from a plurality of user terminals. U.S. Pat. No. 5,689,652 to Lupien, et al. shows a computer network with a plurality of trader terminals that matches buy and sell orders incorporating a satisfaction density profile. The density profile provides a measure for maximizing the mutual satisfaction of all traders.

Computer systems to match bids and offers are also well known in the art. A system disclosed in U.S. Pat. No. 4,903,201 to Wagner matches bids and offers for future commodity contracts and detects illegal trade practices. U.S. Pat. No. 5,727,165 to Ordish, et al., discloses a network system and further provides confirmation timing and notification messaging to traders. In U.S. Pat. No. 5,924,082 to Silverman, et al., a negotiated matching system is shown which matches bids and offers based on a criteria that includes "ranking" data. The ranking data is comprised of credit and risk information to facilitate the best matches with respect to risk management. Another aspect of this system permits traders to negotiate directly with each other prior to or after an initial match is made by the system. The system of U.S. Pat. No. 5,926,801 to Matsubara et al. also matches bids and offers, and in one embodiment, credit criteria is considered in the match.

A computer system disclosed in U.S. Pat. No. 5,873,071 to Ferstenberg, et al. includes an intermediary computer program and an electronic agent computer program which can operate over the Internet. The intermediary computer program mediates offers and counter-offers for financial commodities. Goals, expressed as either a set of computer rules or as an objective with constraints, are set by the participants and the electronic agent computer program generates counter-offers according to the goals in response to offers from the intermediary computer program. In one embodiment of the system, a calculated "fairness measure" is used to determine satisfaction of the participants goals.

None of these patents address a bartering, exchanging or selling system whereby an individual trader constructs a barter order by establishing trading parameters that include an item to be bartered and a desired item to be received. Accordingly, none of these systems characterize potential barter exchanges in a quantifiable manner for an individual trader. The known electronic systems also fail to provide a means for assisting traders in the selection of trading items from that trader's portfolio of financial instruments.

SUMMARY OF THE INVENTION

The present invention relates to a computer-based system for bartering, exchanging or selling, (hereinafter referred to as bartering), items or securities including but not limited to, stock, cash (foreign or domestic currencies), web barter dollars (defined below), Himmelstein Options (defined below), CD's, bonds, notes, Option Put, Option Call, Commodities/Futures, Annuities, Muni Bond(s), Government Bonds, Funds, Strips (Zero Coupon Treasuries), Ginnie Mae(s), Fannie Mae(s), Freddie Mac(s), UIT (Unit Investment Trust), T-bills and any future created or defined security, commodity or commodity money wherein a barter order indicating the item to barter and the desired barter item are matched by the website. Barter transactions are made which combine a barterer's barter order with a matching order or combination of orders which the barterer selects or the barterer has automatically selected by the website. Barter transactions can incorporate agreements. One agreement, termed a Himmelstein Option, permits barterers to agree to a future range of dates: a date after the barter transaction may occur and a date before the barter transaction must occur or the rights of ownership may expire. These dates may be the same. The before date may be indefinite. Himmelstein's Options (i.e. the portion of the barter transaction that is to be acquired) may be sold for cash or bartered (i.e. assign their rights or transfer their rights for a different security). In other words, the Himmelstein Option agreement, once acquired may be assigned without the written consent of the issuer/creator. This means that acquirer may transfer his rights to acquire the security or other item, which is the subject of a Himmelstein Option to someone else. Himmelstein options also include other conditions or parameters in the agreement as well.

The electronic bartering system of the present invention includes tools for facilitating the function of the system users. Provided with the present invention are toolkits for market makers to set automated and manual trading rules, toolkits for market makers to generate customized stock trade ticker lists and profit and loss statements, and toolkits for users to establish basket and contingency barter orders.

BRIEF DESCRIPTION OF THE DRAWINGS

FIGS. 5A-5F are portions of screen displays illustrating the creation of a sample barter order in accordance with the teachings of the present invention.

FIGS. 9A and 9B are tables illustrating general and specific parameters for classes of barter items that are preferably utilized in a barter system made using a Himmelstein Option in accordance with the teachings of the present invention. Specifically, the "barter/settlement date, open/close" column in the tables is a condition or parameter included in the Himmelstein Option.

FIG. 11 is a copy of a graphical user interface for a computer screen by which a user can request current trade prices for a barter order;

FIG. 12 is a copy of a graphical user interface for a computer screen by which barter order trade prices, responsive to a barter order trade price request, can be reported to a user;

FIG. 13 is a copy of a user help request screen for use by a user in interpreting the GUI of FIG. 12;

FIG. 14 is a copy of another user help request screen for use by a user in interpreting the GUI of FIG. 12;

FIG. 15 is a copy of a graphical user interface for a computer screen by which a user can request an execution of a barter order;

FIG. 16 is a copy of a graphical user interface for a computer screen by which a marketmaker can establish automatic rules for responding to barter order requests and orders;

FIG. 17 is a copy of a graphical user interface for a computer screen by which a marketmaker can select pre-established symbols to be used in setting up automated rules;

FIG. 18 is a copy of a user help request screen for use by a marketmaker in interpreting the GUIs of FIGS. 16 and 17;

FIG. 19 is a copy of another user help request screen for use by a marketmaker in interpreting the GUIs of FIGS. 16 and 17;

FIG. 20 is a copy of another user help request screen for use by a marketmaker in interpreting the GUIs of FIGS. 16 and 17;

FIG. 21 is a copy of a graphical user interface for a computer screen by which a user can define a contingent barter order;

FIG. 22 is a copy of a user help request screen for use by a user in interpreting the GUI of FIG. 21;

FIG. 23 is a copy of another user help request screen for use by a user in interpreting the GUI of FIG. 21;

FIG. 24 is a copy of a graphical user interface for a computer screen by which a user can define a contingent barter order;

FIG. 25 is a copy of a user help request screen for use by a user in interpreting the GUI of FIG. 24;

FIG. 26 is a copy of a graphical user interface for a computer screen by which a user may define a basket of orders for a barter offer;

FIG. 27 is a copy of a user help request screen showing a 'drop down' menu for use with the screen of FIG. 26 by which a user can select a method for quantifying the basket barter order;

FIG. 28 is a copy of a user help request screen for use by a user in interpreting the GUI of FIG. 26;

FIG. 29 is a copy of a user help request screen showing a 'drop down' menu for use with the screen of FIG. 26 by which a user can select symbols to use in defining the basket barter order;

FIG. 30 is a copy of a user help request screen for use by a user in interpreting the GUI of FIG. 29;

FIG. 31 is a copy of a graphical user interface for a computer screen by which a user can define the filters used in establishing a basket barter order in the GUI of FIG. 26;

FIG. 32 is a copy of a user help request screen for use by a user in interpreting the GUI of FIG. 31;

FIG. 34 is a copy of a user help request screen for use by a user in interpreting the GUI of FIG. 33;

FIG. 35 is a copy of a graphical user interface for a computer screen, accessible through the selection of the "Order History" tab of the graphical user interface of FIG. 33, by which a user can review order histories;

FIG. 36 is a copy of a graphical user interface for a computer screen, accessible through the selection of the "Saved Orders" tab of the graphical user interface of FIG. 33, by which a user can review saved orders;

FIG. 37 is a copy of a graphical user interface for a computer screen, accessible through the graphical user interface of FIG. 33, by which a user can enter orders;

FIG. 38 is a copy of a user help request screen for use by a user in interpreting the GUI of FIG. 37;

FIG. 39 is a copy of a graphical user interface for a computer screen, accessible through the "Trade From Order Book" button of the graphical user interface of FIG. 37, by which a user can trade orders;

FIG. 40 is a copy of a graphical user interface for a computer screen, accessible through a button in the user interface FIG. 39, by which a user can obtain level II stock quotes;

FIG. 41 is a copy of a graphical user interface for a computer screen, accessible through a button in the graphical user interface FIG. 39, by which a user can obtain internal and external order information;

FIG. 42 is a copy of a user help request screen for use by a user in interpreting the GUI of FIG. 39;

FIG. 43 is a copy of a user help request screen for use by a user in interpreting the GUIs of FIGS. 40 and 41;

FIG. 44 is a copy of a user help request screen for use by a user in interpreting the GUI of FIG. 39;

FIG. 45 is a copy of a user help request screen for use by a user in interpreting the GUI of FIG. 39;

FIG. 46 is a copy of a graphical user interface for a computer screen, responsive to the operation of the "Quick Fill" button in the graphical user interface of FIG. 39, by which a user can obtain order execution confirmation information;

FIG. 47 is a copy of a user help request screen for use by a user in interpreting the GUI of FIG. 46;

FIG. 48 is a copy of a user help request screen for use by a user in interpreting the GUI of FIG. 39;

FIGS. 49 and 50 are copies of user help request screens for use by a user in interpreting the GUI of FIG. 39 and in particular for calculating savings from using the present system;

FIG. 52 is a copy of a graphical user interface for a computer screen, accessible through the graphical user interface FIG. 37, by which a user can enter market orders;

FIG. 53 is a copy of a user help request screen for use by a user in interpreting the GUIs of FIGS. 51 and 52;

FIG. 55 is a copy of a user help request screen for use by a user in interpreting the GUI of FIG. 54;

FIG. 56 is a copy of a graphical user interface for a computer screen, accessible through the graphical user interface of FIG. 55, by which a user can establish a trading rule;

FIG. 57 is a copy of a user help request screen for use by a user in interpreting the GUI of FIG. 56;

FIGS. 59, 60 and 61 are copies of user help request screens for use by a user in interpreting the GUI of FIG. 58;

FIG. 62 is a copy of a graphical user interface for a computer screen, accessible through the graphical user interface of FIG. 54, by which a user can establish a pricing tier;

FIG. 63 is a copy of a user help request screen for use by a user in interpreting the GUI of FIG. 62;

FIG. 64 is a copy of a graphical user interface for a computer screen, accessible through graphical user interface FIG. 54, by which a user can create a customized trade ticker;

FIG. 65 is a copy of a computer screen illustrating an exemplary trade ticker established using the graphical user interface of FIG. 64;

FIG. 66 is a copy of a user help request screen for use by a user in interpreting the GUI of FIG. 64 to create the ticker of FIG. 65;

FIG. 67 is a copy of a graphical user interface for a computer screen, accessible through graphical user interface FIG. 54, by which a user can create a customized position/profit and loss report;

FIGS. 68 and 69 are copies of computer screens illustrating exemplary position/profit and loss reports established using the graphical user interface of FIG. 67;

FIG. 70 is a copy of a user help request screen for use by a user in interpreting the GUI of FIG. 67;

FIG. 73 is a copy of a user help request screen for use by a user in interpreting the GUIs of FIGS. 71 and 72;

FIGS. 75 and 76 are copies of user help request screens for use by a user in interpreting the GUI of FIG. 74.

DETAILED DESCRIPTION OF THE INVENTION

Figure 1:
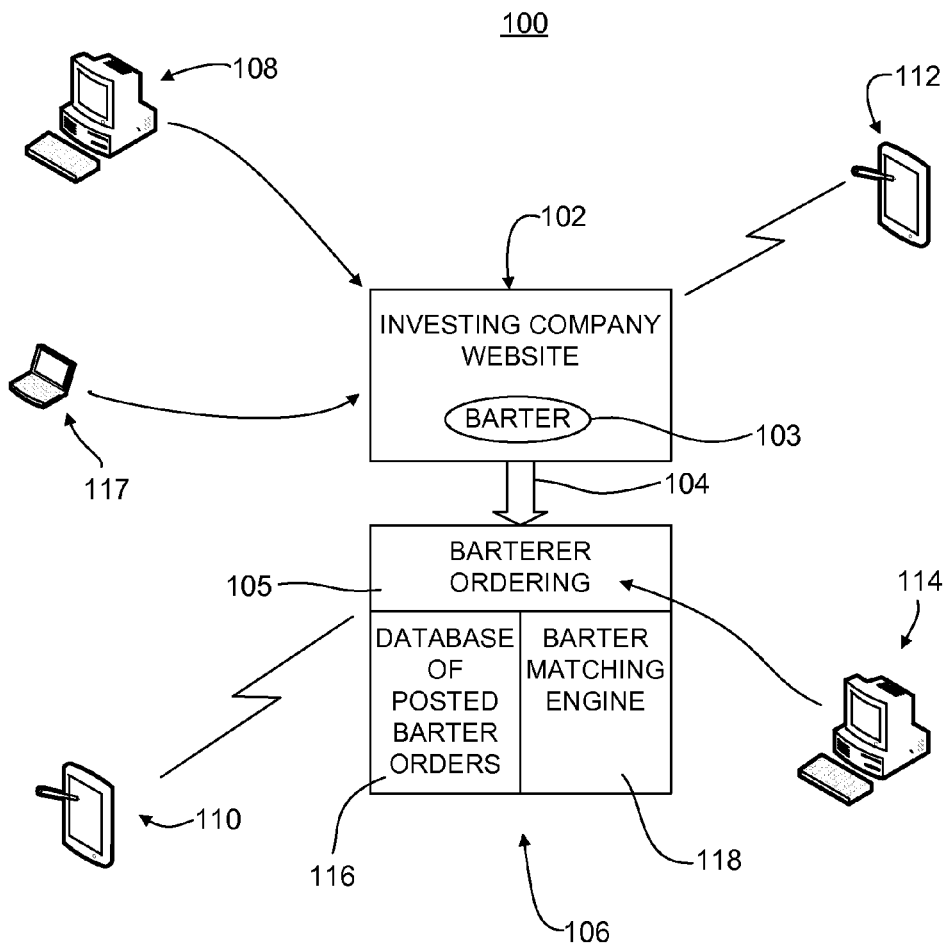
FIG. 1 is a diagram of a bartering system in accordance with the teachings of the present invention.

The present invention will be described with reference to the drawing figures where like numerals represent like elements throughout.

The Himmelstein Option is a new type of financial interest being created by the present invention. Utilizing Himmelstein Option(s) allows the present invention to create a new type of market ("virtual market"), whereby barters may own and/or barter Himmelstein Options for Himmelstein Options, indefinitely, without having to possibly incur ordinary or capital gains taxes. Furthermore, as long as the individual who owns a Himmelstein Option or is in the possession of a Himmelstein Option does not go to settlement and "take title", the actual owner of the security defers a taxable event.

The system creates web barter dollars to further its ability to facilitate a virtual market. Web barter dollars are the system's currency with a unit (commodity dollar) which is preferably set to equal the U.S. dollar or some other standard such as foreign currency, gold etc. The system, for example, uses web barter dollars to track an "I owe you" ("IOU") to individuals giving up a security but not simultaneously receiving a security back. Preferably, the system uses web barter dollars to supplement or balance a barter in lieu of other currencies such as the U.S. dollar. Using web barter dollars or cash simplifies the matching of barter orders where items of unequal value are traded.

When converting IOUs or web barter dollars to a different security, the system may charge a different fee based on the age of the IOUs. For instance, if the IOU is to be held longer, the system may charge a lower percentage or lower fee to convert to U.S. dollars. Further, the system may charge a different fee or a different percentage based on the relationship with a particular individual requesting the conversion. The system and barterers may barter web barter dollars for cash at different values. For example, the system may charge a fee to convert from web barter dollars to cash, but as an incentive provide extra web barter dollars for cash. Should there ever be a need to have the system redefine or modify its definition for IOUs or web barter dollars, the system reserves the right (in the Agreement(s)) and can do so. For example, the system may change IOU's or web barter dollars to system funds, which are portable and permit a barterer to transfer shares of system funds to specific institutions without having to redeem shares and possibly incur a taxable event. Accordingly, those skilled in the art should recognize that the system can be configured to perform any, and all stock market, banking and financial institution functions.

Referring to FIG. 1, one embodiment of a barter system 100 is illustrated which utilizes a computer-based website that may effectuate the trading of barter items. Barter items are defined including, but not limited to, stock, cash (foreign or domestic currencies), web barter dollars, Himmelstein Options, CD's, bonds, notes, Option Put, Option Call, Commodities/Futures, Annuities, Muni Bond(s), Government Bonds, Funds, Strips (Zero Coupon Treasuries), Ginnie Mae(s), Fannie Mae(s), Freddie Mac(s), UIT (Unit Investment Trust), T-bills and any future created or defined security, commodity or commodity money. Bartering different categories of items is supported by the system 100. For example, stocks can be bartered for bonds. The system 100 provides for its own "web-barter dollars" which may be accumulated or traded by barters using the system 100 and are particularly useful in facilitating barters where items of unequal value are traded.

The system 100 may be a web-based application or a non-web-based application. The system may operate over a private network or a public network, such as the Internet, to facilitate a connection with a barterer's computer.

The system 100 preferably includes a barter website 106 which is accessed via an investing company website 102, or directly via the Internet using a computer such as a personal computer 114 or a wireless hand-held computer with Internet connectivity 110. Optionally, the system 100 may be incorporated as part of an existing investing company's website.

In the case of access via an investing company website 102, the barterer uses a computer such as a personal computer 108, a portable computer 116 or a wireless hand-held computer with Internet capability 112 to select a "Barter" icon 103 that incorporates a link 104 to the barter website 106. Once the icon is selected, the trader's investing company account information is transferred via a link 104 to the barter website 106. In this manner, the barter website 106 is produced with all of the relevant particulars of each item owned by the individual trader. For example, in the case of bonds, the website 106 preferably includes the entity that issued bonds, amount of bonds, market value, interest date and due date data. In the case of stocks, the barter website 106 preferably includes data indicating company, number of shares, market value and whether dividends are reinvested. Using the link 104, the barter website 106 is transparent to a barterer accessing it via the investing company website 102.

The system 100 can be further interfaced with traditional brokers so traditional brokers and clients without the resources to go directly "online" can barter in the same manner.

While the barter system 100 supports bartering different categories of items such as stocks, Himmelstein Options for stocks, notes, Himmelstein Options for notes, bonds, and Himmelstein Options for bonds, an online investing company hosting the "Barter" icon 103 can limit barters to certain categories of items. For example, an investment company website that provides online stock trading may chose to limit the barter website 106 to only stock and/or Himmelstein Options for stock and/or Himmelstein Option barters. This allows someone (a barterer) to acquire a Himmelstein Option which is, in this case, the right to own stock at a future date which allows the other barterer the ability to delay or defer the taxable event. This is accomplished by setting an appropriate filter so that only stock and/or Himmelstein Option is identified in the barter orders. Preferably, such a filter also allows use of web-barter dollars and/or cash which enables a wider range of barter orders to be matched and barter transactions to be completed.

Regardless of the items bartered, the barter website 106 comprises three main components: a barter ordering module 105, a posted barter order database module 117 and a barter matching engine 118. Optionally, the system 100 may include a separate database (not shown) of each individual's portfolio for all securities. In general, the barter ordering module 105 permits a trader, herein referred to as the barterer, to create a barter order that includes the item to be traded, the item desired and additional parameters related to the barter order.

The table set forth in FIG. 9A reflects typical parameters associated with various classes of items or securities to be identified in a barter order. In each barter order, the appropriate parameters are identified for both the item to be traded and the item to be acquired so that the barter order comprises two sets of item parameters. The two sets of parameters may be quite different where the two items, which are the subject of the barter order, are of a different class or type.

Each portfolio item, regardless of type or classes, may optionally be transformed into a Himmelstein Option agreement by defining a future date or range of dates for settlement using the last column in the table FIG. 9A. The Himmelstein Option is posted for immediate barter, but is subject to the specific settlement date or range identified.

A Himmelstein Option permits a security to go "under agreement" with a specific future closing date, (similar to a purchase of real estate). Presently, the IRS does not treat this as a taxable event at the time of the agreement. An individual who owns a Himmelstein Option may barter it again (with the same or different terms as the original agreement) without having settlement and obtaining ownership of the underlying security. Obviously, "different terms" are limited to a subset of terms of the original Himmelstein Option agreement that was issued.

The "standard" Himmelstein Option requires that the individual acquiring the Himmelstein Option must put up the full amount of the desired security at that time, (i.e. and nothing at settlement). If the desired security is also a Himmelstein Option, providing the rights to acquire or transferring the rights meets this requirement. It should be noted that each Himmelstein option may have different future dates for settlement. The IRS may attempt to claim that this constitutes a derivative. However, if an individual is bartering away a security and barters for a security, on future dates utilizing Himmelstein Options, they are receiving a derivative and giving away a derivative. Consequently, in most cases, these derivatives in essence, "cancel out." The system 100 may further require that the barterers agree on the value for the Himmelstein Option should the IRS consider it a derivative. Preferably, the system sets the "barter value" as the default agreed upon value.

The person who issues a Himmelstein Option or barters an acquired Himmelstein Option chooses the future date or range of dates for settlement and value which must be accepted by the acquirer. If there was a future range of dates given for settlement, it is the choice of the person acquiring the Himmelstein Option to go to settlement within the specified range. The "standard" Himmelstein Option automatically goes to settlement on the final day should the person acquiring the Himmelstein Option not choose a date. The system 100 may charge an additional fee for the actual settlement.

When an individual creates a barter order for any security, the system 100 produces an Agreement of Barter, Exchange or Sale (i.e. terms and conditions). Barterers, in essence, fill in the "blanks" of the Agreement of Barter, Exchange or Sale. The system 100 may also require electronic signatures to accompany the Agreement or may create a parallel Agreement for each barterer for simplicity and anonymity purposes. The Agreement is also with the system 100, providing various conditions or rights that the system 100, intermediary or designated agent(s) has with the barterer.

At settlement of transactions comprising Himmelstein Options, title to the security or financial interest, which is the subject of the Himmelstein Option, is transferred. For stock, for example, settlement may require the actual transference of Stock Certificates. Preferably the traded stocks are not in paper certificate form so that a book entry of the stock transfer may be made to transfer title.

Once bartered, a Himmelstein Option cannot be canceled by its creator. Himmelstein Options may continually be bartered without being required to have settlement. Examples of a Himmelstein Option with appropriate parameters for each of nine different classes/types of items are set forth in the table of FIG. 9B. Similar to FIG. 9A, in FIG. 9B each row shows one of the items of a barter order, i.e. an item to be bartered or an item to be acquired. A Himmelstein Option may be identified as a "to be bartered item" and actual stock may be identified as a "to be acquired item" in a given complete barter order. A Himmelstein Option may be acquired via the barter system as soon as it is posted, but the actual ownership of the financial interest, which is the subject of the option, is not transferred to the acquiring party until the acquiring party exercises the Himmelstein Option during the settlement period.

When the barterer creates a barter order, the system 100 creates an order number referencing the barter order. The system 100 may randomly create or code barter order numbers so only the system 100 is aware of the age of a barter order and the identity of the barterer. The posted barter order database module 116 accumulates posted barter orders and includes the software to add, delete and maintain the data in the database. The barter matching engine 118 selectively matches a barterer's barter order with posted barter orders in the database 116. Posted barter orders "matching" a barterer's order are displayed such that the barterer can select a candidate or candidates from the displayed listing of matching posted orders. The matching process functionally operates as a filter to display posted orders matching a selected criteria. Preferably, the filter is set to match the barterer's selected item to be acquired with posted orders having the same item to be bartered. The quantity of the selected item may also be used for filtering to require a direct quantity match or a match within a quantity range. The barterer's selected item to be bartered is also a preferred criteria for the matching filter, so that postings are displayed of barter orders which seek to acquire the item selected to be bartered by the barterer. A preferred filter includes both the barterer's selected item to be bartered and selected item to be acquired. Optionally, the filter may allow both specific items of a class as well as Himmelstein Options for the specific items. Thus, where a barterer's desired item is IBM stock, posted barter orders seeking to barter away IBM stock or Himmelstein Options for IBM stock are displayed as matches.

The barter matching engine 118 is configurable to either match one "best" posted order or multiple posted orders with a barterer's order. The barter engine 118 can also be configured to use the barter website (or an entity chosen by the website) as an intermediary as explained in greater detail below.

Figure 2:
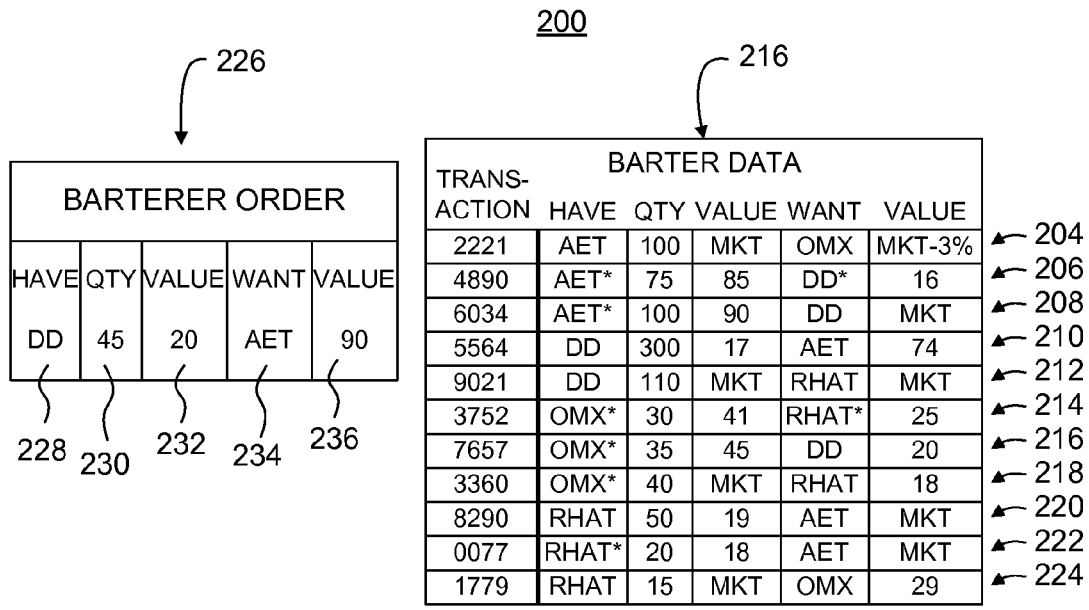
FIG. 2 is a schematic diagram of the structure of an example barter database and barter order in accordance with the teachings of the present invention.

FIG. 2 illustrates a typical stock and/or Himmelstein Option for stock and/or Himmelstein Option barter transaction involving sample posted barter orders 204-224 stored in a database 216 of module 116 and a sample barterer's barter order 226. In this example, the barter order includes the stock to be bartered indicated by stock symbol 228, the quantity 230 of the stock to be bartered, the value 232 at which the barterer is willing to barter, the desired stock 234 indicated by stock symbol, the value 236 the barterer is willing to barter for the desired stock, and an "*" indicating the ownership of the Himmelstein Option for the stock instead of ownership of the stock itself. Preferably, the settlement date(s) are displayed for all Himmelstein Options. The stock values of a barter order need not be a fixed value. For example, values identified for several of the posted barter orders 204, 208, 212, 218-224 are based on the current market price of at least one of the respective stocks. Barter order 226 indicates that the barterer has 45 shares 230 of Dupont stock (stock symbol DD) 228 which the barterer is willing to trade at a value of $20 per share 232 for Aetna stock (stock symbol AET) 234 at a value of $90 per share 236. If the matching criteria is set to match only the barterer's acquire item selection (including Himmelstein Options for the item), orders 204, 206, 208 are displayed. If the matching criteria is set to match only the barterer's barter item selection (including Himmelstein Options for the item), orders 206, 208, 216 are displayed. If the matching criteria is set to match either the barterer's barter or acquire item selection (including Himmelstein Options for the item), orders 204, 206, 208, 216 are displayed. If the matching criteria is set to match both the barterer's barter and acquire item selections (including Himmelstein Options for the item), orders 206 and 208 are displayed. An order combining orders 204 and 216 may also be displayed in that situation.

Other criteria such as market value and the other parameters identified in FIGS. 9A and 9B for each barter item may be displayed and used for matching. For example, where barter value is required to be matched, if the market value of Dupont stock is $20 per share, the barter engine 118 matches the order 226 with only one of the posted barter orders from database 216 namely, with posted barter order 208 from the database 216 since this posted order 208 barters Aetna stock for Dupont stock at the same value prices.

Where an additional matching parameter is set that all of an item of a barter order must be bartered, the Himmelstein Option for all 100 Aetna shares of posted barter order 208 must be bartered. In the example, the barter matching engine 118 would then fail to match barter order 226 with any posted order unless the barter website 106 acts as an intermediary as described below. Conversely, in an embodiment where the barter orders include a minimum share barter parameter, the barter engine 118 matches barterer order 226 if the minimum share parameter of the posted barter order 208 is less than 11 shares.

Figure 3:
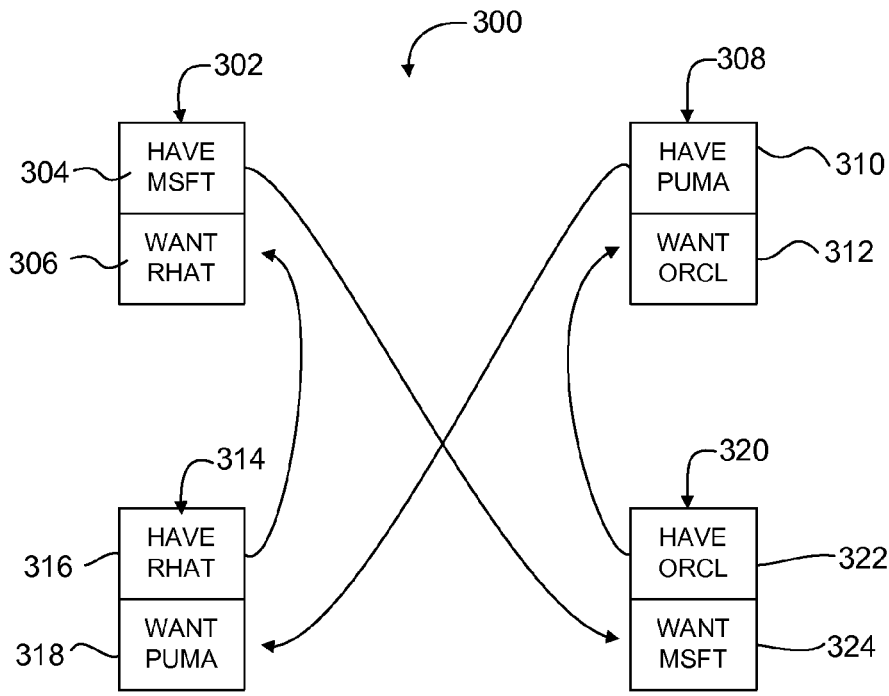
FIG. 3 is a schematic diagram of a multi-order barter transaction in accordance with the teachings of the present invention.

FIG. 3 illustrates a multi-order barter selection 300 having first 302, second 308, third 314 and fourth 320 barter orders according to the present invention. Multi-order barter selection may be used either when no single barter order matches are found irrespective of whether single barter orders matches are found in order to find all potential available barters among the posted barter orders. In this example, the barter engine 118 cannot fulfill the first barter order 302 with a single one of the other barter orders 308, 314 or 320. The first barter order 302 barters Microsoft stock (stock symbol MSFT) 304 for RedHat stock (stock symbol RHAT) 306. None of the other posted database orders barter RHAT for MSFT, but barter order 302 can be fulfilled if intermediate barters are matched. The barter matching engine 118 matches intermediate barters using several methods. In one embodiment, barter matching engine 118 searches for a posted barter order having a desired stock/Himmelstein Option that matches the barterer's stock/Himmelstein Option to be traded. Since posted barter order 320 lists MSFT as the desired stock 324 and the first barter order 302 stock to be bartered is MSFT 304, the barter matching engine 118 search for the first half of the first barter 302 has been satisfied. However, the barter matching engine must find a match for the desired stock 306 for the first barter order 302 and must also find a match for the first half 322 of the third barter order, 320. Accordingly, the barter matching engine must find a transaction that satisfies the desired stock Oracle (stock symbol ORCL) 322 of the third barter order 320.

The barter matching engine 118 searches for an order that trades ORCL for RHAT in order to make a two posted order barter transaction. However, in the example, there is no posted order that trades these two stocks, so the barter matching engine 118 locates barter order 308 that trades Puma Technologies (stock symbol PUMA) 310 for ORCL 312. The barter matching engine 118 then searches for another posted barter order that trades RHAT for PUMA to find a transaction candidate. Barter order 314 meets this criteria in that RHAT 316 is traded for PUMA 318. Accordingly, barterer order 302 can be satisfied through posted barter orders 320, 308 and 314. In a preferred embodiment so as to make the multi-order transactions transparent to the barterer, barter matching engine 118 displays multi-order barters as a single "phantom" posted barter order. The matching engine 118 creates a transaction and displays this phantom barter order in the list of matching barter candidates. The barterer simply selects the phantom barter order to finalize the multi-order barter transaction. In these examples, it is assumed that the values and other parameters set by the barterers permit all barter orders to occur.

In another method for locating multi-order barters, barter matching engine 118 begins by searching for the barterer's desired stock 306 first. Barter engine locates barter order 314 that trades RHAT 316 for PUMA 318. Continuing in this manner, the engine locates the same posted barter orders as above, but in the reverse order. In general, the engine 118 attempts to link multiple barter orders. One of ordinary skill in the art of software programming appreciates that a recursive algorithm is well suited for generation of such a linked list.

The operation of barter ordering module 105 allows the barterer to enter the barter order. In one embodiment of the present invention, the barterer selects minimum barter order parameters such as the specific stock, quantity and value price of the stock to be bartered in addition to the desired stock and value price for the stock desired. Once these minimum parameters are selected, other parameters are set to default settings determined by barter ordering module 105. In another embodiment, order parameters have interdependencies. For example, a barterer selects a quantity of shares of a stock to be traded as 100 shares and sets the per share value price to $15. The total value of the stock, $1,500, is computed by the barter ordering module as the product of the quantity of shares, 100, and the per share value price, $15. In the case where the barterer subsequently changes the total value of the stock from $1,500 to $2,000, the per share value price of the stock changes automatically to $20 since the value per share must be $20 to achieve the $2,000 total value with the 100 shares.

Barter orders may be created for stock and Himmelstein Option for stock barters as illustrated in flowcharts FIGS. 4A-4E and the screen displays of FIGS. 5A-5F where the barterer is prompted through each step of the barter order creation process. For bartering other securities or financial interests, including Himmelstein Options, the bartering steps and screen displays are modified to preferably accommodate all of the parameters for the classes of items identified in FIGS. 9A-9B.

The system 100 in its most generalized configuration permits barters of different securities, financial interests (including Himmelstein Options), or classes of items, i.e. Himmelstein Option for stocks for bonds, foreign currency for Himmelstein Option for T-bills, commodities for stocks, options for T-bills etc. The most generalized configuration of the system 100 permits a barter to select any item in the barterer's portfolio of securities or financial interest as the subject of a Himmelstein Option which is immediately available for bartering where the title to the security or financial interest is not actually transferred until the Himmelstein Option is exercised in the range of settlement dates specified by the barterer creating the Himmelstein Option. Where a barterer's portfolio includes such Himmelstein Options, that barterer may create a Himmelstein Option of the Himmelstein Option in which case the range of settlement dates would be within the settlement date range of the original Himmelstein Option.

In the example of FIGS. 4 and 5, barter website 106 is accessed via an online stock trading company that limits bartering to stocks, Himmelstein Options for stock, cash, web barter dollars and combinations thereof. The flowchart of FIG. 4A begins after the trader selects "Barter" icon 103. Accordingly, barter ordering module 105 has received from the online stock trading website a barterer's list of currently owned stocks, Himmelstein Options for stock, web barter dollars and cash in the barterer's portfolio as well as the quantity and other specifics of these securities via link 104. At step 402 FIG. 4A, the website displays all of the barterer's stock, Himmelstein Options for stock, web barter dollars and cash available for barter. In step 404, The barterer selects from the displayed items in step 402. In the embodiment of FIG. 5A, a symbol 502 representing a selection of the barterers portfolio of stocks, Himmelstein Options for stock, web barter dollars and cash is displayed. The barterer selects, the downward triangle 501, to display all available stocks, Himmelstein Options for stock, web barter dollars and cash as shown in 503, an * indicating the ownership of a Himmelstein Option for the stock and date or range of dates for settlement instead of ownership of the stock itself. Preferably, blanks are provided to indicate an indefinite opening or closing for the Himmelstein Option settlement period. For example, the DuPont Option, DD* is depicted having an indefinite closing date.

The system preferably further indicates if the barterer's security is currently included in a posted barter order requiring the barterer to cancel said posted barter order prior to selecting the security for a new barter order. Optionally, an alphabetical list of companies and/or stock symbols is displayed for alphabetical searching and/or the portfolio quantity 504 of the stock is also displayed. The barterer may enter the selected item 502 by typing it in. Preferably when the barterer begins typing the name or symbol of the company, the barter ordering module locates the first listed item that matches the entered characters. Alternatively, the portfolio is displayed for selection via an array of pull down menus 507, each displaying one class of the items of the barterer's portfolio.

Figure 4A:
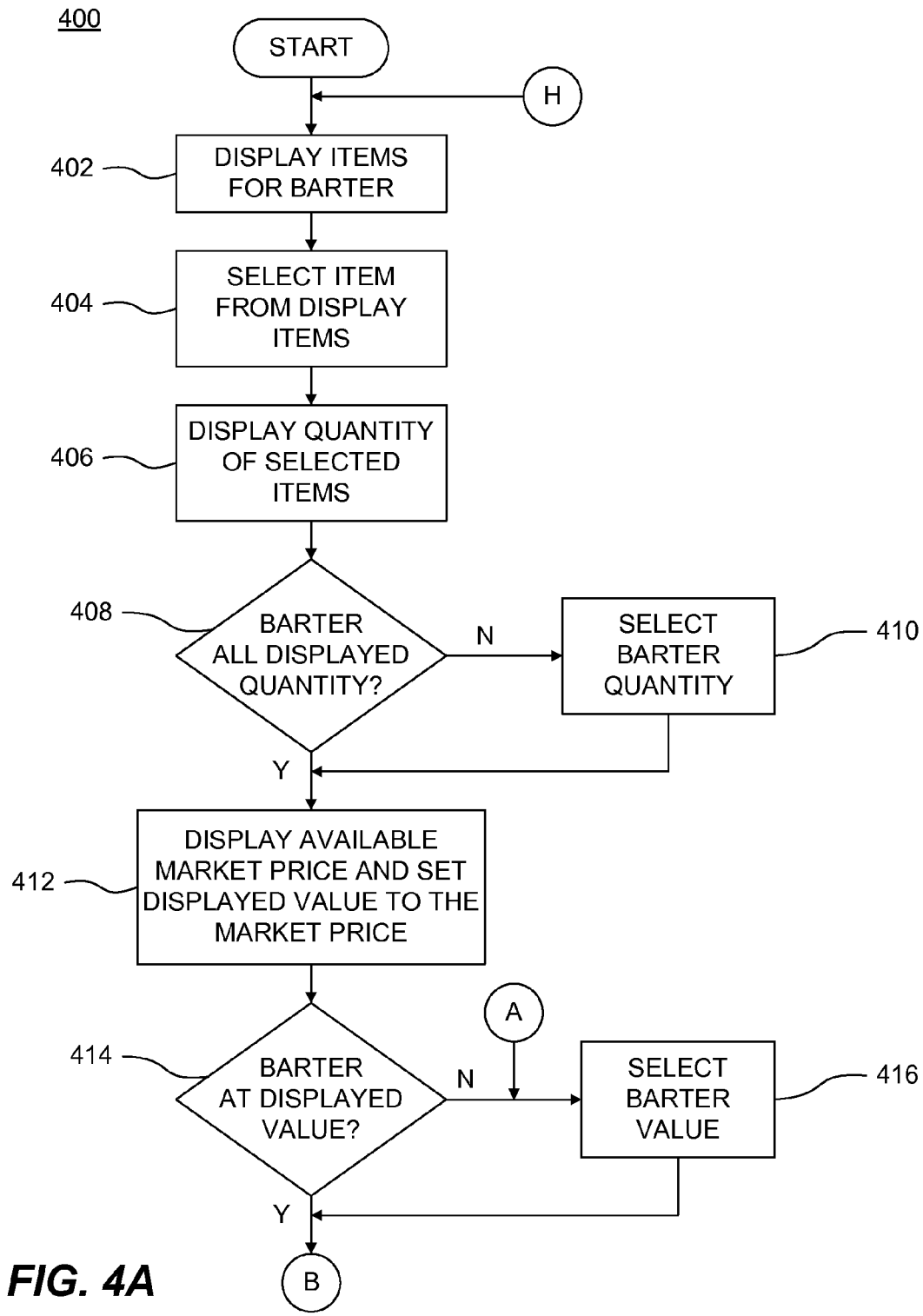
FIGS. 4A-4E are flowcharts of a typical barter ordering session and barter transaction in accordance with the teachings of the present invention.
Figure 5A:
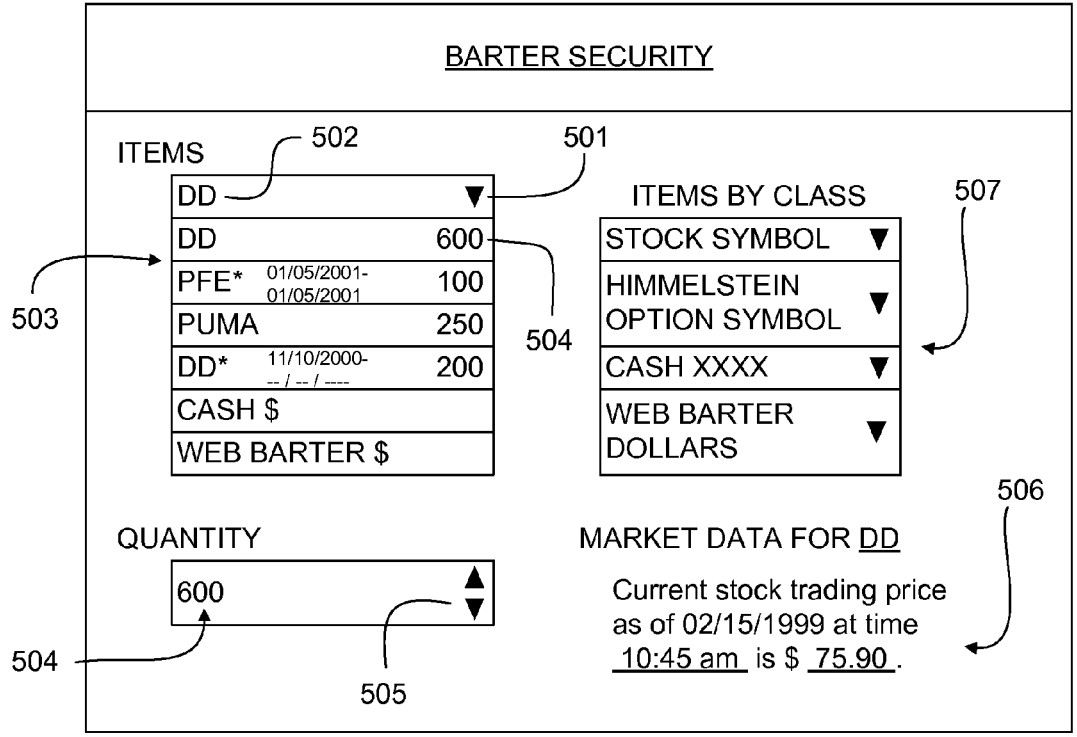

Once the barterer locates and selects the item to be traded, the total quantity of the selected item in the barterer's portfolio (as may be provided by the online stock trading website) is automatically displayed in step 406 of FIG. 4A as the quantity to be bartered. At step 408, the barterer can modify the quantity to be bartered 410. As shown in FIG. 5A, the quantity 504 can be modified via selection of the directional arrows 505 or the barterer can enter a new quantity value. In either case, in this embodiment the barter order module 105 does not allow a quantity value that exceeds the quantity owned by the barterer. Alternatively, the system 100 may be configured to permit the barterer to select a range of quantities to be bartered. For example, the barterer may specify a range such as 50-100 shares for barter.

Figure 5B:
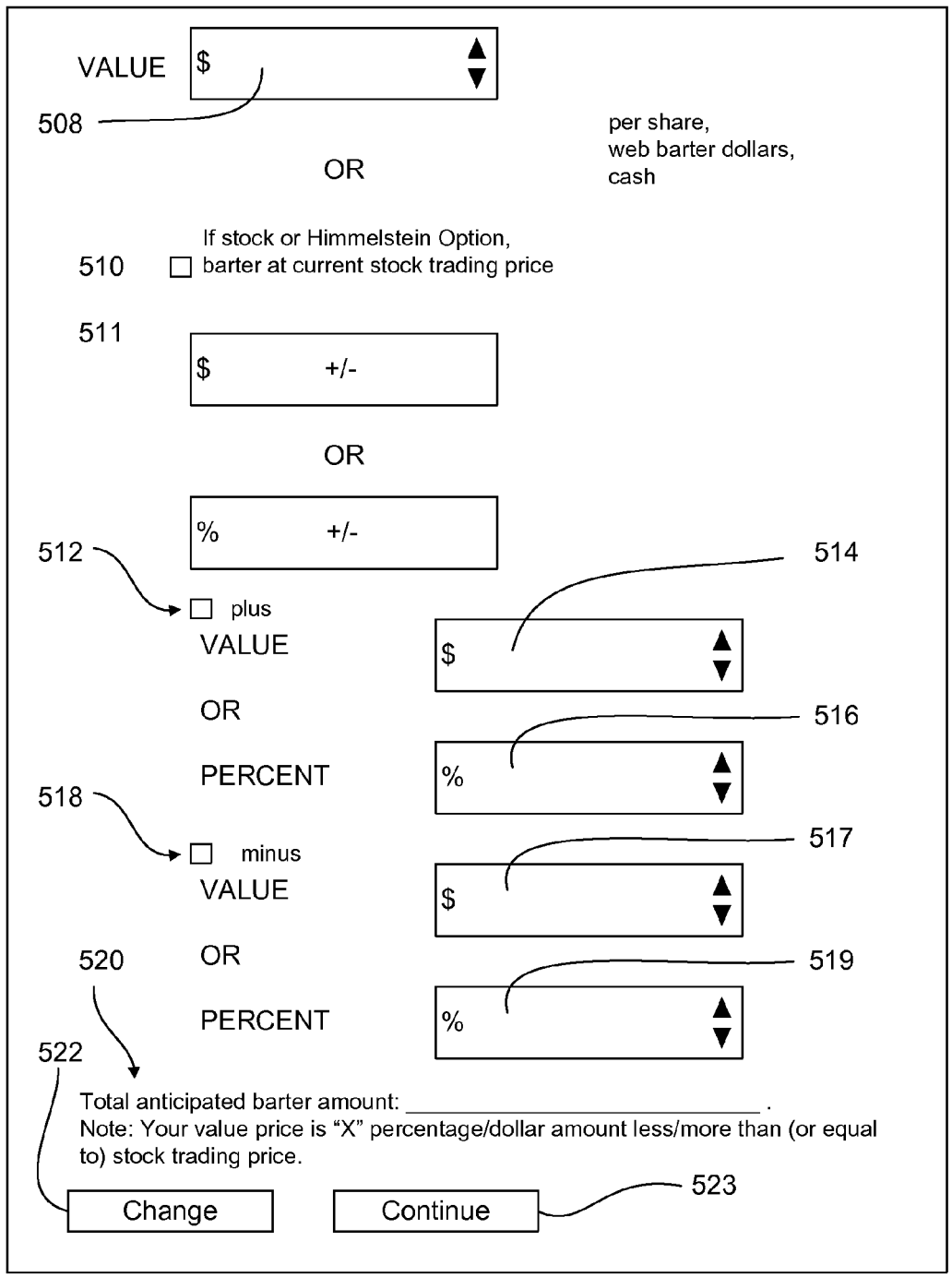

Preferably, the barter ordering module 105 has access to trading prices at step 412 of FIG. 4A, so that the trading price of the selected stock is displayed along with the time and date of the trading price as illustrated in display section 506 of FIG. 5A. A fixed per share value of the stock or Himmelstein Option 508 of FIG. 5B is initially set to the trading price. If barterers are trading away cash or web barter dollars, the system 100 in that instance may rearrange the screens and prompt the security being bartered for prior to prompting the cash or web barter dollars being traded away. As one skilled in the art will realize, the fields which are not applicable to cash or web barter dollars are modified to properly reflect what is being bartered. At step 414 of FIG. 4A, the barterer can elect to trade at the displayed trading price or select a new barter value 416. As FIG. 5B illustrates, the barterer can change the default fixed per share value 508 or select the value of the stock to be bartered based on the fluctuating stock trading price by selecting block 510.

By selecting the fluctuating value price, the value fluctuates until a barter transaction is finalized by a subsequent barterer who selects the barter order. For example, if IBM stock was trading at $115 per share and the barterer selects "barter at current stock trading price", the barter price would be $115 per share if the transaction occurred instantaneously. However, if the barter transaction occurred two weeks later and the stock-trading price dropped to $110, then $110 would be the barter value price. Likewise, if the stock-trading price went up, then the barter price would be that higher price.

Optionally, the barter value can be based upon the current stock trading price plus or minus a certain value or percentage in step 416 in FIG. 4A and at step 511 in FIG. 5B or the barter value can range around a fluctuating trading price specified as either a value amount or a percentage of the fluctuating trading price. To do this the barterer selects a range around the fluctuating stock value as illustrated in FIG. 5B at 512, 518. The range can be a value amount 514, 517 or a percentage of the fluctuating trading price 516, 519. By selecting boxes 512 or 518, the barterer selects whether the range is added to or subtracted from the fluctuating value. For example, if the range was set to plus 1 percent at step 416 (by selecting box 512 and entering 1% in box 516) and the market price for IBM stock to be bartered, at the time of the barter transaction was $115 per share, a posted barter order with a value price between $115 and $116.15 would match the barterer's order. A barterer may issue a Himmelstein Option to barter away IBM stock as low as minus 9 percent of the $115 IBM market price by checking box 518 and entering 9% at box 519 so that a posted barter order with a value price between $104.65 and $115 would match the barterer's order.

Figure 4B:
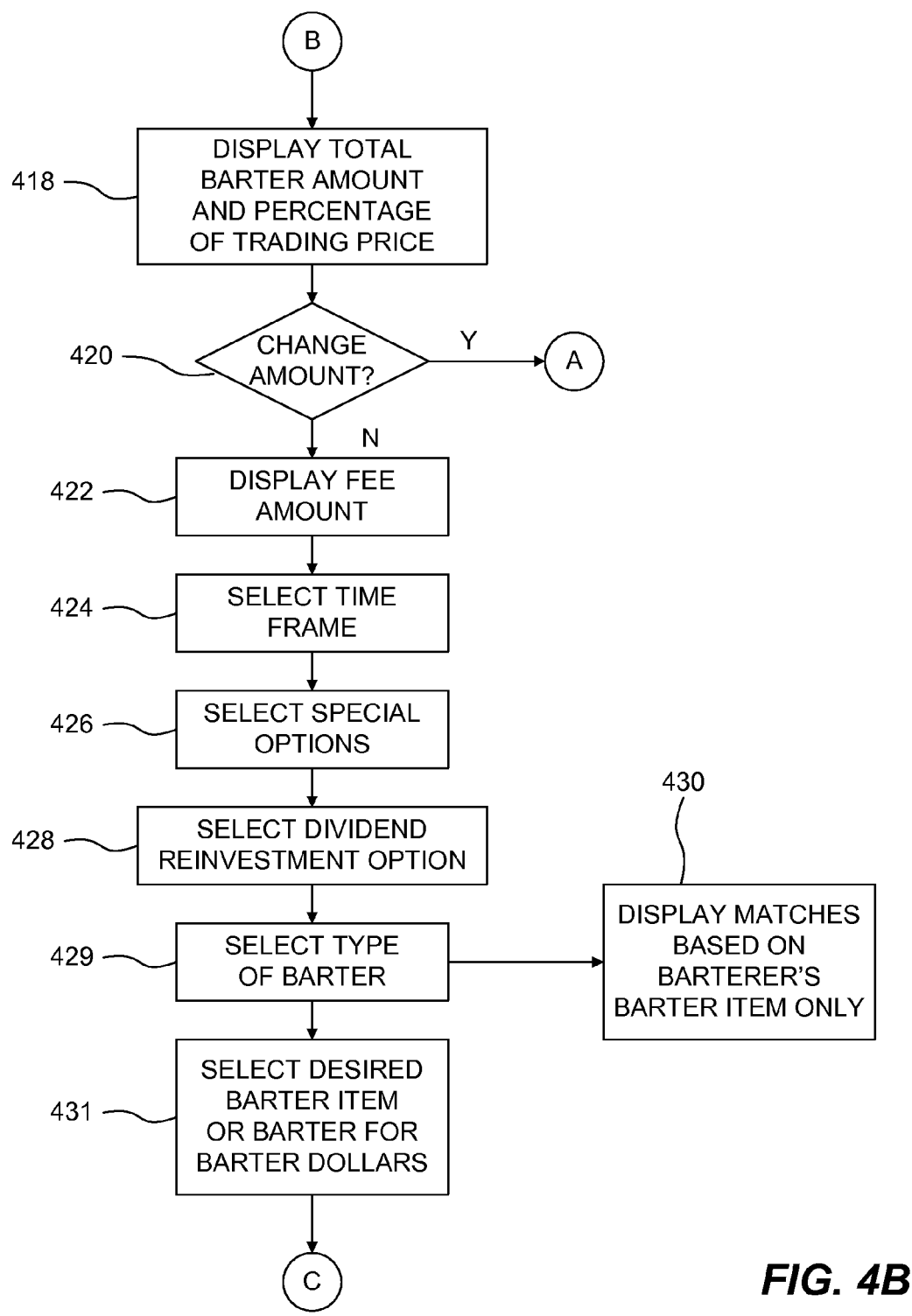

Once the value of the item to be bartered is selected in step 416 of FIG. 4A, the barter ordering module displays at step 418 of FIG. 4B the total barter amount and the percentage or dollar amount of the value price in relation to the available market price per share in FIG. 5B, at 520. Should a range of value price be selected, the display 520 is modified to reflect such. In the example of FIG. 5B, the barterer can change the barter value 520 by clicking on a "change" icon 522 and going through the appropriate steps or accept the value 520 by clicking on a "continue" icon 523. This is also shown at step 420 of FIG. 4B.

At step 422 of FIG. 4B, barter order fee amounts are displayed. Fee amounts, as illustrated in sample screen display lines 524 and 526 of FIG. 5C, are determined based on whether the barter order is to be posted to the barter order database 524 or the barter should occur with the barter website directly 526.

At step 424 of FIG. 4B, the barterer selects the time in which the barter order is valid. As illustrated in the embodiment of FIG. 5C, timing options 528 are displayed once the barter selects the down arrow. The five options are:
1) day only;
2) good until canceled;
3) fill or kill;
4) immediate or cancel; or
5) only view the current posts.

The "day only" options means that the barter order can be posted to the posted barter database only until the end of the day. Thereafter, the barter order is expunged from the posted barter order database. The "good until canceled" option means that the barter order remains posted to the posted barter order database until it is canceled by the barterer. If the "fill or kill" timing option is selected, the entire quantity must be filled or the barter order is canceled. With "fill or kill" timing, the barter order is not be added to the posted barter order database, but the database is searched for a match. Similarly, a barter order is not added to the posted barter order database if the "immediate or cancel" timing is selected. In this case, a posted barter order for only part of the barterer's quantity matches the barterer's order. The last timing option, "only view the current posts", never adds the barter order to the posted barter order database. Instead, the barter matching engine 118 displays the current matches found in the posted barter order database.

At step 426 of FIG. 4B, the barterer may select special conditional parameters. The available special conditions are "minimum quantity," "do not reduce," "all or none," and "deferred settlement." The display portion 530 of FIG. 5C illustrates one means of selecting special conditions. In this embodiment, the barterer may select one of the conditions by selecting a corresponding box. If the minimum quantity condition is selected, the barterer then either adjusts the display quantity via the arrows or enters a minimum quantity value. The default minimum quantity may be set to equal the barter quantity 504. Selecting "do not reduce" means the per share value will not be reduced even if the transaction date is the stock's dividend date. If the barterer selects the "all or none" option, all barter matches must barter the entire quantity of the stock to be traded away.

Selecting the "deferred settlement" condition creates a Himmelstein Option of the item being bartered. The barterer is then required to identify open and close settlement dates, which may be the same. If the barterer is already bartering a Himmelstein Option, the barter ordering module 105 automatically selects "deferred settlement" and displays the date used by the original creator/issuer. The barterer may modify the dates as long as the modified dates are within the range of dates used by creator/issuer. Optionally, at step 531, FIG. 5C the barterer may enter a subsequent amount of the security or a different security to be provided at settlement. As hereinbefore described, the system will prompt barterer to include minimum criteria to clearly identify the security and the value.

At step 428 of FIG. 4B, if the desired security is stock, the barterer selects between three choices for the desired stock with respect to a dividend reinvestment option. Accordingly, the barterer chooses between: 1) the stock must have a dividend reinvestment program; 2) the stock must not have a dividend reinvestment program; or 3) accept new stock with or without a dividend reinvestment program. In the embodiment illustrated in FIG. 5D, the barterer selects the desired option by selecting the corresponding box in section 532.

At step 429 of FIG. 4B, the barterer chooses the type of barter they wish to transact, (i.e. a direct barter only or permit the website to act as the barterer or use an intermediary if a direct barter is not available). The barterer can request a direct barter with an order from the posted barter database at a first fee rate, or in the alternative for a second fee rate, the barterer can request the website to be the barterer. The first and second fee rates may be the same or change independent of each other. At times to promote automated website bartering, depending on the securities to be bartered, the second fee rate may be set at a relatively low rate, or it may be set to a premium rate for the automated service. According to the embodiment illustrated in FIG. 5D, the barterer selects the type of transaction in section 534.

Following the selection of barter type, step 429, posted barter orders may optionally be displayed 430 based on matches of posted order "to be acquired" items with the barterer's "to be bartered item." In the case of a direct barter, a trade can be displayed immediately if a match is found in the database, or the barterer can complete and post the order to the database and await a match from a subsequent barterer. In the case of a barter with the website, the transaction is displayed immediately provided the website can buy or obtain the stock, Himmelstein Option, web barter dollars or cash desired by the barterer. Here, the website uses a predetermined formula including taking into account the relationship with the barterer to calculate the fee for this type of transaction.

The barterer selects the desired stock, Himmelstein Option, web barter dollars or cash price to acquire for the barter order at step 431 of FIG. 4B. If the barterer's desired security is a stock, Himmelstein Option, web barter dollars or cash, the barterer checks the appropriate box in display 537 as illustrated in FIG. 5D. Optionally, if the barterer's desired security is stock, the system 100 displays all stock and Himmelstein Options for the desired stock in the database, allowing the barterer to accept a Himmelstein Option in lieu of actual stock. In a manner similar to that of selecting a stock to be traded from the barterer's portfolio, stock symbols 535 are displayed upon selection of a down arrow. Optionally, the barterer can select from a list of industries 536 wherein the stock symbols 535 are filtered to list only those related to the selected industry. Alternatively, a merged alphabetical list of companies and/or stocks is shown for alphabetical searching. Additionally, the system 100 can be configured to show various companies (in a predefined sort) including the symbol and predefined financial information.

If the barterer chooses a stock or Himmelstein Option, by selecting it, the system 100 displays the symbol 535 pertaining to the chosen company. Next, in step 432 of FIG. 4C the barter ordering module informs the barterer of the available stock trading price of the desired stock/Himmelstein Option, along with the current date and time. One method of displaying the price is illustrated in FIG. 5D at section 538.

Figure 4C:
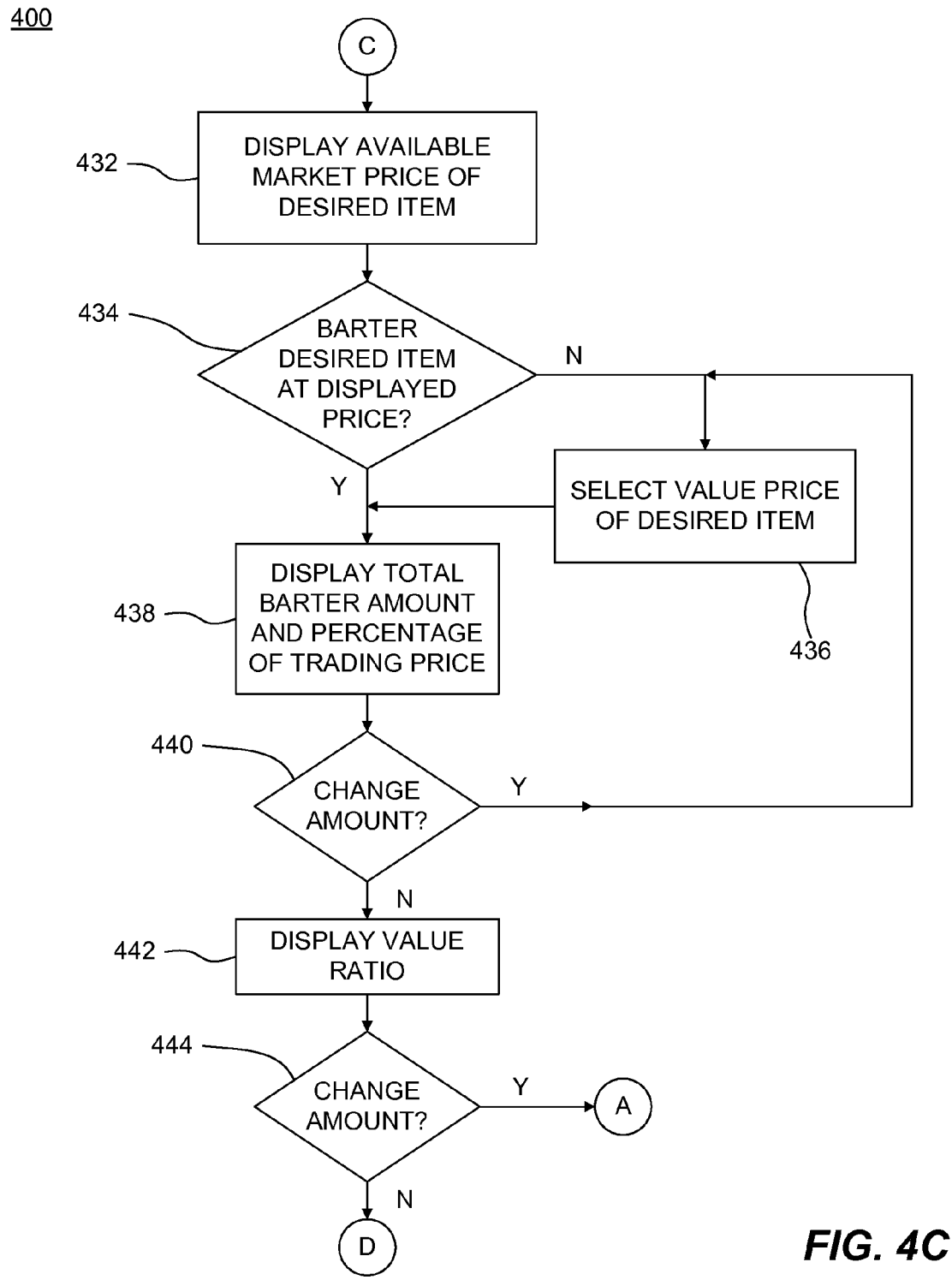
Figure 5E:
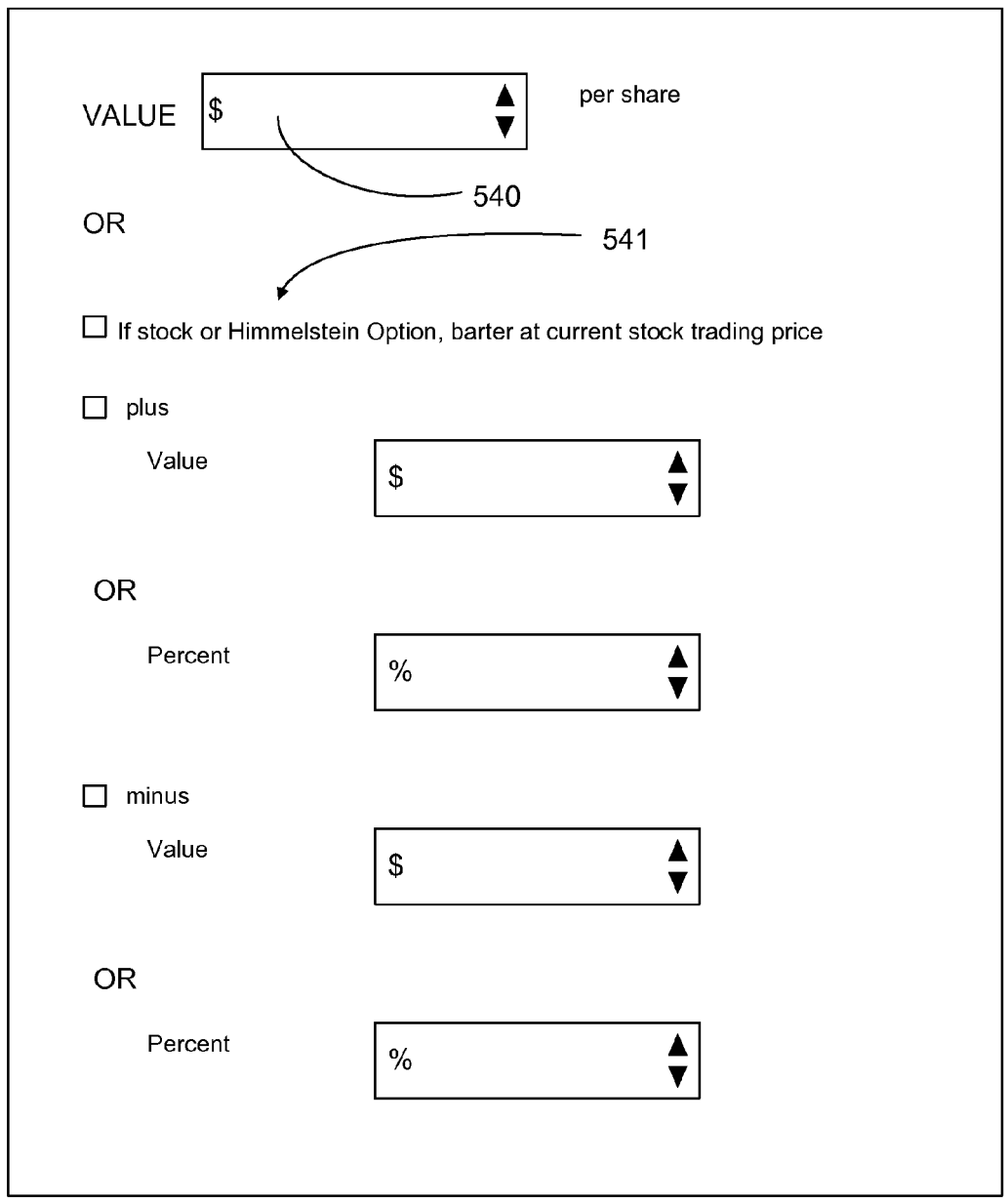

The barter value of the desired item defaults to the available stock trading price at section 540 of the display of FIG. 5E for stock, or Himmelstein Option. Further, if the system 100 had a barterer trading a stock or Himmelstein Option for cash or web barter dollars, the system 100 may prompt in 540, the stock trading price of the stock or Himmelstein Option being traded away. The barterer can accept the displayed value at step 434 or select a new value at step 436 of FIG. 4C. In the display of FIG. 5E, the desired stock value for stock or Himmelstein Option can be selected similar to that of selecting the stock value to be traded. The barterer can select a fixed value using box 540 or a value plus or minus the stock trading price (similar to step 511, as shown in FIG. 5B) or a fluctuating stock value range in section 541 in a manner as described in connection with 510-519 of FIG. 5B. The stock value can range around a fluctuating trading price specified as either a value amount or a percentage of the fluctuating trading price. Thereafter, as indicated in the flowchart of FIG. 4C at step 438, the total desired barter amount and percentage or dollar amount to the stock trading price is displayed as illustrated in sample display 542 of FIG. 5F. At step 440 of FIG. 4C, the barterer can change the barter value of the desired item which steps can be implemented by clicking the "change" icon of display section 542 of FIG. 5F.

Figure 5F:
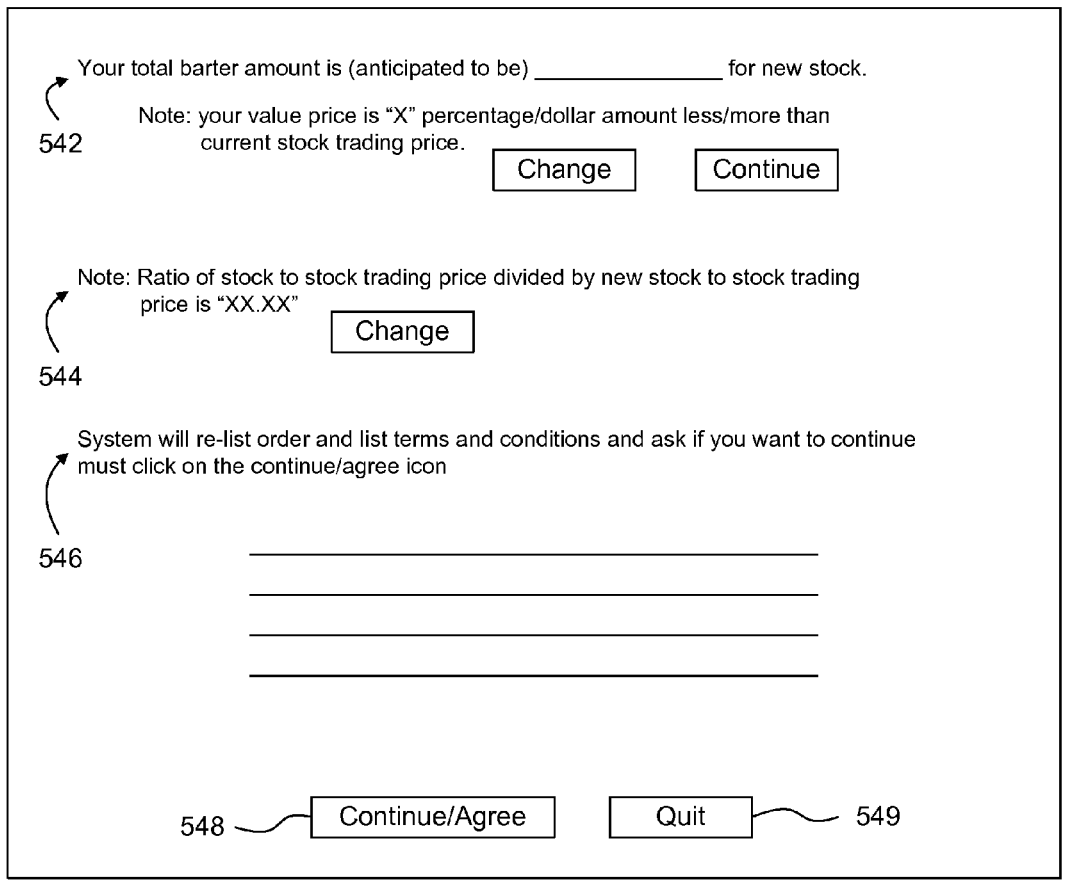

At step 442 of FIG. 4C, the present invention assists the barterer in determining whether the barter order is financially advantageous to the barterer. Several ratio formulas, termed Himmelstein Value Ratios, are provided to assist the barterer. In the embodiment of FIG. 5F at section 544, the barter ordering module selects the specific formula and the Himmelstein Value Ratio is displayed. The barterer may then change the barter order per step 444 by selecting a change icon in section 544 of the display FIG. 5F.

In an alternative embodiment, the barterer selects the desired formula after receiving help text describing the formulas. Regardless of the method used to select a particular formula, there are three preferred formulas:

| | | |
|---|---|---|
| Value Ratio | 1) | (x/y)/(a/b) |
| Value Ratio | 2) | (a/b)/(x/y) |
| Value Ratio | 3) | (b/a) − (y/x) | where:
a=value price for security/Himmelstein Option desired to trade away
b=current security trading price for security/Himmelstein Option desired to trade away
x=value price for security/Himmelstein Option desired to obtain
y=current security trading price for security/Himmelstein Option desired to obtain For example, using Himmelstein Value Ratio 2, a barterer owning Coke stock or Coke Himmelstein Option is willing to barter it away at a value of $65 per share, and Coke is currently trading at $67 on the stock market. If the barterer desires to barter for IBM stock, or IBM Himmelstein Option at value of $110 per share and the stock is currently trading at $115 per share on the stock market, the value ratio formula is: ((65/67)/(110/115))=1.014, which means that if the barterer trading Coke stock/Coke Himmelstein Option for IBM stock/IBM Himmelstein Option chose to complete the transaction, they will gain 1.4 percent. In essence, in this formula anything less than 1 is a stock/Himmelstein Option barter transaction that loses value and anything greater than 1 is a transaction that gains value. This formula is important to understand the relationship between the value of the stock/Himmelstein Option that is being traded away and the stock/Himmelstein Option that is being obtained. In lieu of displaying the value ratio, the system 100 may display the actual percentage of increase or decrease after interpreting the value ratio. Variations of the above formulas may also be used. Any Himmelstein Value Ratio formula may be modified by adding or subtracting a predetermined value or variable. For example, Formula (a/b)/(x/y) may be changed to have the value "−1" subtracted to it making the new Formula (a/b)/(x/y)−1. If Himmelstein value formula (a/b)/(x/y)−1 is greater than 0.00 then to what extent greater is the percentage of profit, which in the above COKE/IBM example is 1.4%. Any Himmelstein Value Ratio formula may be modified by multiplying or dividing a predetermined value or variable. For example, formula (a/b)/(x/y) may be changed to have the variable "y/x" multiplied to it making the new formula (a/b)*(y/x) or (y/x)*(a/b). If Himmelstein value formula (a/b*y/x) is greater than 1.00 then to what extent greater is the percentage of profit, which in the above COKE/IBM example is 1.4%. Any Himmelstein Value Ratio formula may be modified by having both a predetermined value or variable added or subtracted while at the same time multiplying or dividing by another predetermined value or variable. For example, formula (b/a)−(y/x)

may be changed to have the value of "1" added to it and have the variable "−1" multiplied to it making the new Formula ((−b/a)+(y/x))−1 or ((y/x)−(b/a))−1. If Himmelstein value formula ((y/x)−(b/a))−1 is greater than −1.00 then to what extent greater is the percentage of profit, which in the above COKE/IBM example is 1.4%.

For securities such as CD's, bonds, annuities and government bonds that provide an interest rate/current yield until a due/maturity date, the system may calculate the actual income from that present day forward to be earned, factoring in the type of interest and adding same to all applicable variables (i.e. b or y) in the above stated formulas. For the securities stated above, the barter order module may require the settlement date to be the same date as the due/maturity date. In other words, the variables in the above formulas would be defined as:

a=value price for security/Himmelstein Option desired to trade away.

b=current security trading price for security/Himmelstein Option desired to trade away, plus future interest income from that present day forward to be earned, but not paid, before the earliest settlement date of the securities being bartered.

x=value price for security/Himmelstein Option desired to obtain.

y=current security trading price for security/Himmelstein Option desired to obtain, plus future interest income from that present day forward to be earned, but not paid, before the earliest settlement date of the securities being bartered.

For barter items or securities such as CD's that do not have a current trading market, the system 100 can also calculate the accrued, not paid, interest from issuance up to the present day. In other words, the variables b and y in the above formulas in such instances are modified as follows:

b=system calculated security trading price for security/Himmelstein Option desired to trade away includes the following:
 original purchase price or face value of barter item or security plus,
 accrued unpaid interest income from issuance up to the present day plus,
 future interest income from that present day forward to be earned, but not paid, before the earliest settlement date of the securities being bartered.

y=system calculated security trading price for security/Himmelstein Option desired to obtain includes the following:
 original purchase price or face value of barter item or security plus,
 accrued unpaid interest income, from issuance up to the present day plus,
 future interest income from that present day forward to be earned, but not paid, before the earliest settlement date of the securities being bartered.

Optionally, for securities such as CD's that do not have a current trading value, the system 100 may have the applicable variables (i.e. b or y) include the original purchase price or face value plus accrued interest income, excluding future interest income so that the system provides a "current day" value. The barterer may select the desired formula, including the definitions of b and/or y for each security in a barter transaction after receiving help text describing how each variable may optionally be defined in the formulas.

If the securities being bartered have different due/maturity dates, the system 100 may use the present day to the earliest settlement date as the period of time for calculating the income to be earned, calculating each securities' actual interest rate/current yield, factoring the type of interest, and adding same to the respective variables (i.e. b or y). To ascertain a more accurate value ratio, when one security has interest income, such as CD's, and another security does not, such as stock, the system may include or exclude interest income from the value ratio formulas depending on the formula chosen by barterer/system. The system 100 may disclose and or incorporate the actual formula(s) used to ascertain the value ratio into a finalized transaction agreement.

Where no conventional market value is available, the system 100 may be configured to examine posted barter orders or develop methods or new formulas to determine a current trading price.

Figure 4D:
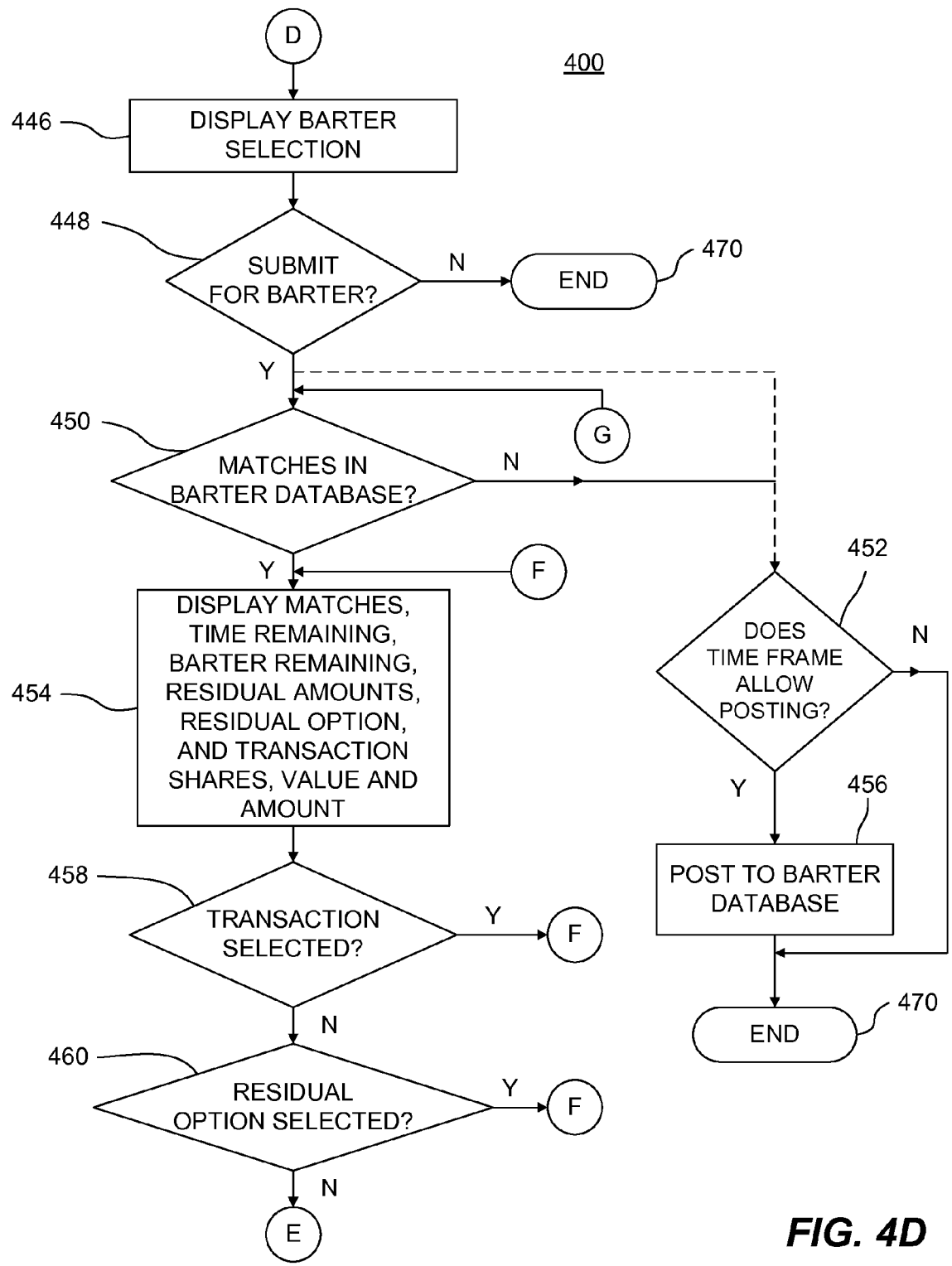

Referring to FIG. 4D at step 446, the barterer can review the barter order prior to submission of the order to the barter matching engine. As illustrated in the embodiment of FIG. 5F the barter order module lists at section 546 the terms and conditions before the barterer submits the order by clicking an appropriate icon 548. Alternatively, the barterer may decide to terminate the barter order creation by clicking a "QUIT" icon 549.

Once the order is submitted by the barterer at step 448 of FIG. 4D, the matching engine searches the website database for a barter order or in an embodiment where the engine matches multi-order barters, multiple barter orders to satisfy the submitted order. If no match is found at step 450, the barter matching engine determines whether the order should be posted to the database 452 based on the timing selected at step 424 of FIG. 4B. If the order should be posted, the barter order database module 116 posts the order to the database.

Figure 6:
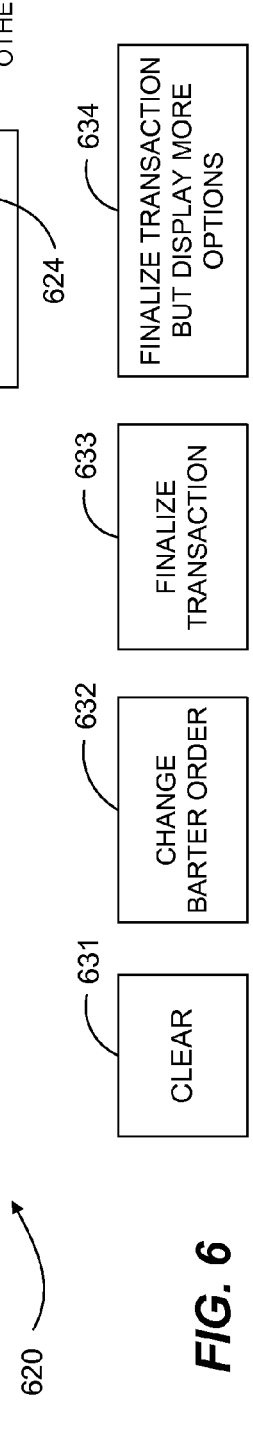
FIG. 6 is an example of a barter transaction screen in accordance with the teachings of the present invention.

After the barterer clicks on the "continue/agree" icon 548, (and depending on the timing chosen), the system 100 in accordance with FIG. 4D posts the barter as an available transaction 452, 456 and/or finds and displays "matching" posted barter orders 450, 454 via the screen display illustrated in FIG. 6. The "matching" in the preferred embodiment includes matching the barterer's desired item and barter items with the barter and desired items of single or multiple combinations of posted barter orders where any matched Himmelstein options have overlapping settlement dates.

Where posted barter orders are displayed, preferably the barter orders are listed by the lowest share price of the stock or Himmelstein option that the barterer wishes to acquire such as in display section 610 of FIG. 6. If any one of the available barter orders requires the price to fluctuate with the stock market, the display is preferably continually updated so that the prices reflect market value as close to real time as possible. The screen also displays the order number, symbol, share price, ratio to stock trading price, value ratio, number of shares, barter amount, barter price fluctuate with stock trading price, special conditions, timing, and dividend reinvestment criteria.

If the individual decides that they are willing to barter away some or all of their selected portfolio stock/Himmelstein option for one or more barter orders listed, they select to do so 458, of FIG. 4D (or as long as they have more barter amount available) by simply clicking on each order, (i.e. choosing first preference then second preference, and so on). Each time an order is chosen, the system 100 permits/requires the individual to revise their original quantity, and value price in the stock/Himmelstein option for which they desire to trade away in the barter, thereby requiring the individual to accept the prices and the amount of stock/Himmelstein option received in return from the barter order that they had selected. When a posted order is chosen, the system 100 enters the corresponding information in a table on the screen to notify the individual of the transaction number, number of "shares trading away" with item price, number of "shares receiving" with item price and barter amount with totals at bottom of the table as reflected in screen table 620 of FIG. 6. For cash and web barter dollars, the fields which are not applicable remain blank. Optimally, the system may display in 620, the after date and before date for Himmelstein Options being acquired or bartered.

Each time a transaction is chosen, the system 100 reduces the value for "amount of barter left" in a display box 622. If an individual has less than an available barter transaction, (with no special conditions nor timing limitations) when the individual selects the order number, the system 100 shows the number of shares for which the barter is permitted. Upon selecting each order, the system 100 shows the residual amount in a display box 624 and presents three choices 460: 1) hold stock/Himmelstein option in escrow; 2) donate the stock/Himmelstein option; and 3) purchase other stock/Himmelstein option. If any of these choices are chosen, the system 100 displays additional screens to complete the above tasks. Optionally, the system 100 may allow the barterer to convert the residual amount into web dollars, which are added to the barterer's portfolio after the transaction is completed.

Additionally, when a barter order is chosen, the system 100 "locks" the barter order, including the price, to the individual for a predetermined duration. A display of the time remaining to complete the transaction appears in a "time remaining" display box 626. Should the time expire, the system 100 provides two options: 1) finalize transaction; 2) or lose transaction in "X" seconds, with seconds decrementing on screen. The system 100 may, if desired, inform the individual that someone else is looking at the same barter order and may inform other users that there are pending barter orders which may come available.

Figure 4E:
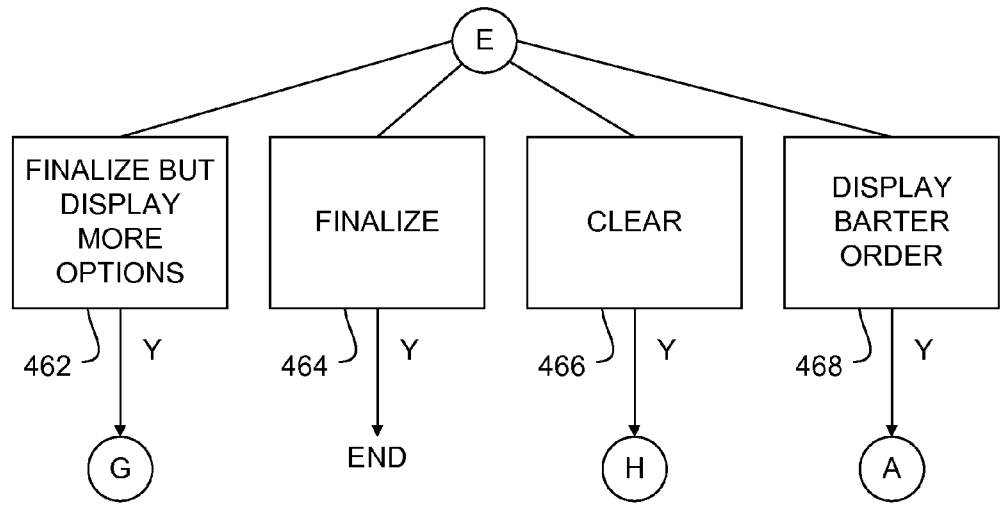

Upon the individual reviewing available barter orders and deciding what they want to do, (i.e. accept one or more orders or none), they proceed by choosing one of the following four icons 631-634: 1) clear; 2) change barter order; 3) finalize transaction; and 4) finalize transaction but display more barter options. Each option leads to the display of additional screens to complete the selected task as indicated in FIG. 4E.

In addition to the main bartering screens, the system 100 may include pop-up screens to show "history" of past barter transactions and to show performance on how a security is performing, and the current value ratio formula provided from past transaction(s). If an individual bartered away Himmelstein Option(s) that have not gone to settlement, the system provides a screen selection showing the security or securities, the range of settlement dates allowed and preferably includes all of the criteria or information in the actual barter transaction.

The system 100 exhibits other special conditions such as if the value of a security falls, the system 100 may require barterers to barter some or all of a security back; an election to require that the value ratio must stay within a specified range for a specified time or trigger an action by the system 100 such as a penalty, or forcing the individuals switch some or all security back, etc.; and the entry of multiple securities or symbols, and corresponding value prices, and permit the system 100 to automatically take the best value ratio as long as value ratio is over a specific number (i.e. such as 1.00) set by the barterer and the system 100 automatically completes the transaction if posted barter orders exist meeting that criteria.

The system 100 may be programmed to automatically purchase security within a predetermined value range when a barter order is posted or market values change, complete a barter transaction for the barter order and sell the acquired security while charging an appropriate fee. The system 100 may act as a negotiator between barterers, sending each an e-mail or otherwise notifying them when the search engine discovers potential matches among barter orders. The system 100 may permit access by individual barterers to the identity of barterers who have posted "matching" barter orders to allow them to negotiate directly between themselves through e-mail or otherwise. The system 100 may require e-mail sent through it to purge "identity" (i.e. ensure anonymity). The system 100 may create an e-mail subsystem allowing individuals interesting in bartering to enter limited pertinent information into the blanks of the agreement being presented to one another only identifying the individuals by the order number that was created by the system 100 when it originally posted the barter order. This is referred to as an "offer to purchase." The system 100 may lock the individual's security being offered for a specified time allowing the individual receiving the offer time to accept, modify, or reject the offer. In other words, the individual making the offer cannot back out unless the person receiving it fails to respond within the time frame, modifies it or rejects it.

The system 100 can also be configured for telephone access so that all functions that one may do online may be done over the telephone. Additionally, pre-approved individuals can be permitted to barter for securities (which the website holds in escrow) prior to bartering their own securities.

In the generalized version of the barter system, various types of barters may be implemented as schematically illustrated in FIGS. 7A through 7E.

Figure 7A:
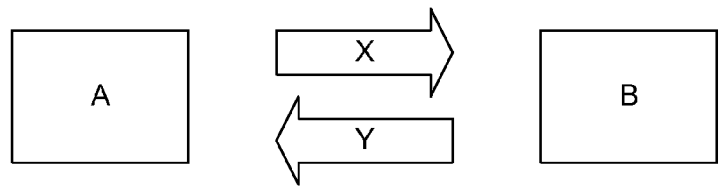
FIGS. 7A-7E are schematic illustrations of several different types of barter transactions which may be implemented according to the teachings of the present invention.

Referring to FIG. 7A, a two party exchange or direct barter is illustrated. For example, Individual "A" barters directly with Individual "B" effecting an exchange of securities, X and Y respectively. Example, Individual "A" issues or posts a Himmelstein Option to barter 100 shares of AOL worth $1,000 (Stock "X") for 200 shares of IBM worth $1,000 (Stock "Y") after Jan. 1, 2000 and before Feb. 1, 2005. Individual "B" accepts the Himmelstein Option effectuating an agreement to immediately barter 200 shares of IBM for the rights to acquire 100 shares of AOL in the future. A receives the 200 shares of IBM from B and irrevocably commits A's 100 shares of AOL to be transferred to B or B's designee at any time settlement is demanded between Jan. 1, 2000 and Feb. 1, 2005.

In the event the barter transaction is not an exact match in value, the system 100 may balance the barter transaction by allowing one barterer or the other to pay cash, provide web barter dollars, offer a different security, such as a Himmelstein Option on a different security, or allow the barterer to acquire more of the particular security that they are bartering.

Figure 7B:
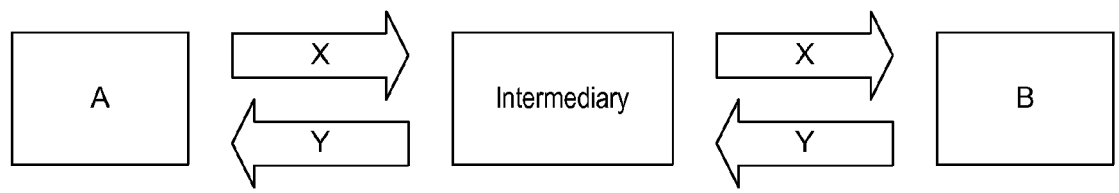

Referring to FIG. 7B, a two party exchange with an intermediary is illustrated. For example, Individual "A" barters with Individual "B" to trade away security X and acquire security Y through an intermediary. If a match is located but the values are not equal, the intermediary may retain the excess security and supplement the barterer bartering away the greater value security with cash, provide web barter dollars, a different security, such as a Himmelstein Option on a different security, or acquire more of the desired security (by first acquiring such).

The intermediary either obtains additional cash, a security, such as a Himmelstein Option, or more of the desired security, such as a Himmelstein Option from the other barterer and/or from a third party (upon which the intermediary reciprocates a security, such as a Himmelstein Option, cash, or web barter dollars). For example, using the same values above, Individual "A" issues or posts a Himmelstein Option to barter 100 shares of AOL for 200 shares of IBM. Individual "B" has 100 shares of IBM that he would like to barter for the rights to acquire 50 shares of AOL in the future. The intermediary keeps the Himmelstein Option for 50 shares of AOL and acquires the additional 100 shares of IBM and completes the exchange with individual A.

Figure 7C:
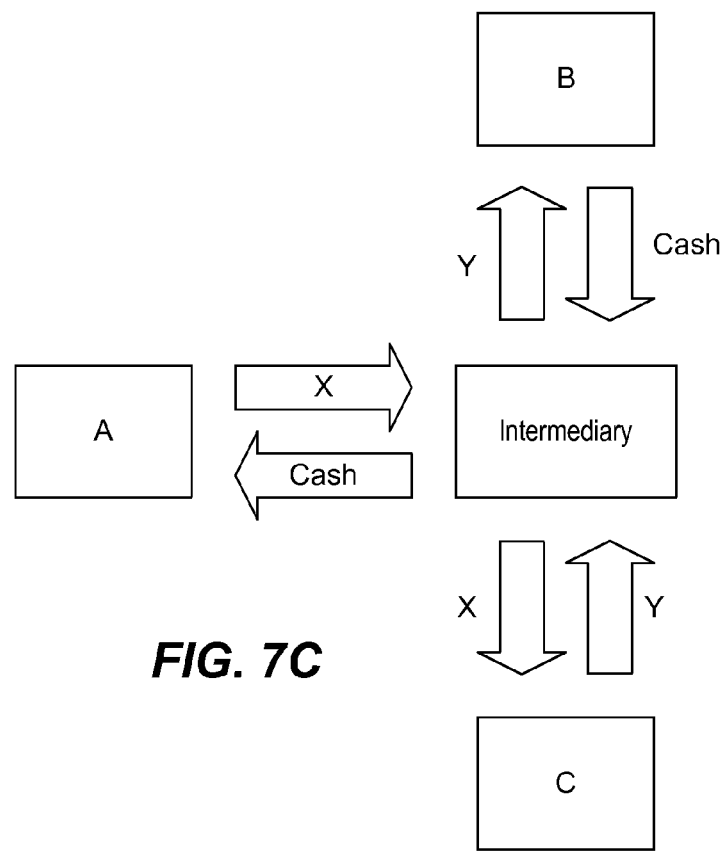

FIG. 7C illustrates a three party transaction with an intermediary. Individual "C" barters away security Y to receive security X. The intermediary, which may be the barter website, identifies Individuals "A" and "B" to complete the transaction. Individual A sells or barters security X for cash and Individual B buys or barters security Y for cash. The cash amounts may or may not be equal, but Individuals A, B and C may incur a service charge from the intermediary/website for the service provided. In lieu of cash, web dollar credits are preferred where the website acts as intermediary. In another embodiment, the system 100 may allow the barterers to barter away their securities or financial interest at a different time than when they receive a security or financial interest. This is a "Deferred Exchange."

Figure 7D:
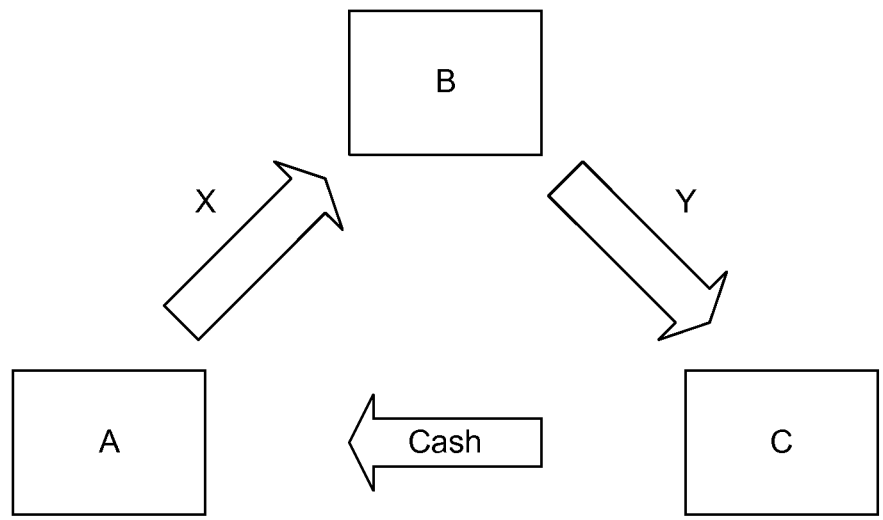

FIG. 7D illustrates a three party transaction without an intermediary. In this example, barterer "A" receives cash for security or financial interest X. Barterer "B" receives security or financial interest X in exchange for security or financial interest Y. Barterer "C" receives security or financial interest Y for the cash which is received by barterer A.

Figure 7E:
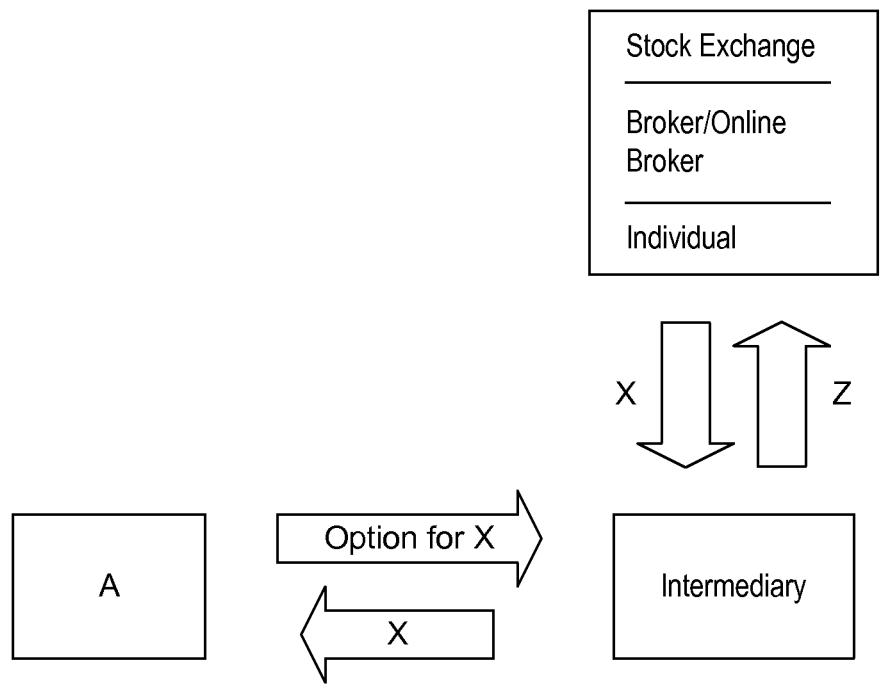

FIG. 7E illustrates a two party exchange with an intermediary. Barterer "A" wants to exercise a Himmelstein Option (i.e. have settlement and take title) to own the security in the Himmelstein Option. In this illustration, the system 100 may require in the Agreement that to exercise the Himmelstein Option, the barterer must do so through the system 100. Barterer A trades the Himmelstein Option on financial interest X for the actual interest X to the intermediary. The intermediary acquires the interest X from source B in exchange for consideration Z. The intermediary then maintains Himmelstein Option for X in its own portfolio for future bartering. Z may be web dollars or some other security or interest acquired by the website in a similar manner. Alternatively, if the value of Z is more than the Himmelstein Option for X, the system 100 allows Barter "A" to exercise the Himmelstein Option (i.e. have the settlement on security X).

Where the system 100 or a designated entity acts as an intermediary, a barterer can create a barter order that does not require a security at the same time it barters away its own security. For example, an individual may allow their security to be bartered for an interest of equal value, which the barterer can identify at a later time. The understanding being that the barterer can defer the completion of the transaction by the website or a designated entity acting as intermediary. If another barterer accepted the barter order terms, the funds for the transaction are immediately placed in an escrow account. For example, if the current tax law permitted, the system 100 would allow "X" number of days to choose a particular security and "X" number of additional days to actually acquire the new security. Therefore, the website or a designated entity may hold the securities in escrow as a third party. The website or a designated entity may, upon being directed by the barterer who has funds in escrow, acquire a specific security to complete the barter. In this embodiment, the system 100 may continually update the barterer with respect to the security such as stocks (re: stocks that the individual informed the system that they were interested in) with respect to the current "closest" matches for a specific stock or range of stocks that exist in the database system, based on the value ratio formula (s) that were previously defined herein. This can be done by either e-mail, phone, or when the barterer accesses the website. While online, the system 100 may continually update the closest matches, thereby permitting an individual to either ignore, choose one, or choose multiple ones. If the individual chooses a match or several matches, with excess remaining funds, these excess funds are held in escrow.

The system 100 may be configured to only barter Himmelstein Options or the future rights. Reiterating, a Himmelstein Option is an agreement given by the individual that owns the barter item or security, an irrevocable right to another party that after a specific date and before a specified date, this party has the right to "go to settlement" and acquire the barter item or security. Further, the Himmelstein Option allows the party in possession or any party currently in possession to barter said Himmelstein Option, i.e. transfer said rights for settlement. Barter order parameters then include an "after date" upon which a Himmelstein Option may be exercised and an "expiration date" that the Himmelstein Option expires. The expiration date may be an indefinite date. For example, barterers may do this to diversify their portfolios where they do not have the right to sell a security immediately, (such as via a preexisting agreement with an employer company). If the security is unregistered, the system can, after the holding period, directly process the stock with a designated transfer agent in order for it to be allowed to be transferred, i.e. go to settlement. In this instance, only Himmelstein Options are able to be immediately bartered since the barterer cannot transfer the security until after a specific date.

The Himmelstein Option value and security value may be different, and usually would be different if the Himmelstein Option expiration date is a specified date and not open or "indefinite". Both dates and values are preferably displayed for matching barter orders in a manner similar to the display of FIG. 6.

Acting as an intermediary, the system 100 can hold a barter item or security in a trust account if, or until, someone exercises a Himmelstein Option to acquire it. A barterer posting a Himmelstein Option barter order chooses the after and expiration date which date(s) must be within the terms of their Himmelstein Option if they are not the actual owner of the security. The system 100 may prompt the expiration date as "indefinite", with the barterer who is creating the Himmelstein Option away having the ability to modify the Himmelstein Option barter order with a specific date. The value of the "Himmelstein Option" is worth less if there is an expiration date, at which time the Himmelstein Option no longer exists. If the barter item or security subject to the Himmelstein Option is held in trust by the system 100, the system returns the item or security upon expiration date to the barterer who had offered the Himmelstein Option or the party who settled the Himmelstein Option and obtained "title." The purpose of the system 100 holding the security "in escrow", or in trust, is to ensure that a barterer acquiring a Himmelstein Option has a complete assurance that their right of ownership is "guaranteed" should they exercise it at a future date. The system 100 has the ability, (if it were a security such as stock or a mutual fund), to include or exclude the dividends, long term gains and losses and short term gains and losses. If the dividends, long term gains and losses, and short term gains and losses were included, at the end of each tax year, the 1099-DIV and gains and losses issued may be transferred to the system 100 as the "nominee" which may in turn, make the "nominee" the individual who had obtained the Himmelstein Option or the rights of ownership to the security.

Himmelstein Options having an "after date" and an "expiration date" when settlement can occur has a number of benefits for individual barterers. A barterer bartering away securities can ensure that a sale occurs after the barterer has owned the security more than one year so that any income is taxed at capital gains rate instead of ordinary income rate. If a barter works for a company that requires them not to sell the security for a specific time period, but the barterer wants to diversify their portfolio, the system 100 allows them to do so.

The system 100 has other advantages. For example, incorporating the security stock into a Himmelstein Option that is bartered removes uncertainty (i.e. future risk). This is beneficial in many instances. For example, successful, educated investors desiring to decrease their stock portfolio can recognize this benefit and utilize the Himmelstein Option to reduce their stock portfolio in a controlled manner.

Since the system 100 allows securities, such as CD's to be incorporated into a Himmelstein Option, if one wanted to become liquid prior to maturity, one can barter away a Himmelstein Option on the CD in lieu of incurring a penalty for early redemption. The net value of the Himmelstein Option issued is logically set by the barterer to be less than the penalty.

The system 100 is preferably configured to internally track all individual rights when acting as an intermediary or escrow. If a barterer wants to "cash out", the system may permit them to barter their securities including a Himmelstein Option away for cash, or alternatively require them to exercise their Himmelstein Option and then sell their securities that they acquired.

For tax purposes, the system 100 can require a barterer to transfer with the security their estate exemption (or a portion thereof) up to the allowed estate exemption amount (which is currently $625,000) as a gift. In this case, the barterer is not entitled to this at death. When that individual receives a security in return, the individuals from whom the security came would also have given an estate exemption. Also, the system 100 can be configured to utilize the gift tax exemption. In essence, allowing a barterer to gift up to the maximum non-taxable amount, which is currently $10,000.00, to each and every individual that they barter with at which time they receive the same amount back in the security such as cash as "a gift". This requires all gift transactions to be less than or equal to $10,000.

If Section 1031 of the Internal Revenue Code of 1986 is amended to include securities as defined earlier, the present system can be configured to effectuate a tax-deferred exchange should one or both bartering parties desire such. Further, the system 100 can be adapted, modified or changed to utilize or capitalize on any existing or future tax laws.

Per the S.E.C., barter transactions or transfer of rights are not registered. Thus, this system permits bartering in a discrete and/or anonymous manner, (i.e., not informing the public). However, the system 100 is preferably configured to compile historical barter information regarding barter transactions of each barter. Additionally, the system 100 may be modified to meet S.E.C. regulations, if required. Terms and Conditions in a Himmelstein Option can include contingencies for settlement. For example, a Himmelstein Option may be bartered with a contingency that for settlement it must meet SEC approval.

The present system permits any type of securities or financial interests to be bartered, including but not limited to CD's, stocks, bonds, notes, evidences of indebtedness or interest, interests in a partnership, certificate of trust or beneficial interest, etc. The system 100 can interface with or be incorporated as part of online companies in such a fashion that it is transparent to the clients of the online trading company. When a client from an online trading company desires to purchase a particular security, the online trading company may choose to acquire, if available, from another individual who has entered a transaction to barter their security away. The online trading company can act as the intermediary and barter for the security, in essence making the online trading company the system 100 barterer with the ability to acquire new stock and/or any security, and then sell it to their online client. By doing this, the online company can keep the entire spread between the "ask and bid" with no commissions, and undercuts traditional stock exchanges in price and speed by eliminating intermediaries such as floor brokers or specialists from the trading process.

The system 100 can be configured to handle "exchange funds" often known as "swap funds" or (Private Placement Memorandum) P.P.M. wherein an individual puts in their financial interests or security (such as stock shares) into the fund for exchange units of the entire fund. This allows the individual to diversify their financial interests or securities such as stock holdings without having to pay capital gains taxes. In such a case, the system 100 maintains "system" funds and barterers exchange various financial interests for units of the "system" fund. The system 100 can also be configured to further open and close new funds when deemed necessary by the system or by pre-set parameters.

The system 100 can allow barter orders to require only some security up front at the time of the Himmelstein Option Agreement being consummated. This portion of the security or commodity may or may not be refundable. The balance of the Agreement would only be paid if the Himmelstein Option is finalized, or ownership of the security is transferred.

For example, a posted transaction can state that the Himmelstein Option must occur after Jan. 5, 2000 and before Jan. 6, 2000 and the barterer is bartering AOL stock for cash or web barter dollars for $5.00 per share paid immediately which is non-refundable and $95.00 per share at settlement. Individuals accepting this Himmelstein Option must pay the $5.00 per share, which is non-refundable. On Jan. 6, 2000 if the AOL stock is less than $95.00 per share, the individual will choose not to exercise their rights in the Agreement, thereby allowing the Agreement to expire. This is to be defined as selling long, in the "virtual stock market", (i.e., system 100).

In an alternative embodiment, the system 100 may allow a barterer to issue a Himmelstein Option on a security that the barterer does not own, nor have a Himmelstein Option (i.e. rights to own) on. If, or when, the Himmelstein Option is chosen (for example, by person "A") the barterer is required to acquire the security or the Himmelstein Option that was being traded away, on or before the date after the barter transaction may occur, to then hand it over to person "A". This is to be defined as selling short or trading futures in the "virtual stock market" (i.e. system 100).

The virtual market (i.e. system 100) can handle what is referred to in the financial industry as a margin account wherein the system 100 allows the barterer to borrow web barter dollars, cash or issue Himmelstein Options against the value of their portfolio including Himmelstein Options in their possession.

When someone issues a Himmelstein Option, the barter transaction can also allow the person issuing the Himmelstein Option to enter a different before and after date for the Himmelstein Option for the new security desired. Therefore, in this embodiment, the system 100 may require the person posting the transaction for the Himmelstein Option for the security desired to give a specific date before, and a specific date after, or a range of dates that would be acceptable. This range of dates may be disclosed to potential barterers; or in the alternative, can be undisclosed (making a potential barterer be required to choose specific dates, before and after)

without knowing the range of dates that the individual posting the Himmelstein Option used.

With respect to the securities that provide dividends, interest etc., the system 100 can further do the following. The system 100 may keep the dividends, interest etc. as part of the transaction, and may put in a common "pool" all dividends, interest etc. realized. A formula is used to proportion the amount between any, and all, clients holding Himmelstein Options for the specific class of items.

The system 100 can require barterers to enter Himmelstein Options or barter orders in round lots. For example, if the security was stock, the system 100 can require increments of 100 shares.

The system 100 can have the ability to break down posted order(s) into specific dollar and or quantity amount(s) allotment and re-post. For example, if the system 100 chose to break down into a specific dollar amount, the system 100 can choose one thousand dollar amount(s) or block(s). If someone posted 10 shares of IBM stock at $110.00 for each share, the system 100 can re-post to be 2 barter orders: one order to be 9 shares of IBM stock with 10 web barter dollars; and one order with 1 share of IBM stock as the residual amount. In another example, if the system 100 chose to break down into a specific quantity amount in the security "stock", the system 100 may decide to break down posted orders to allotments of 100 shares and post the remaining portion (if any) that isn't dividable by 100. For example, if the posted order was 1220 shares, the system 100 can re-post to be 13 barter orders: (12) barter orders with 100 shares and (1) barter order with 20 shares. Further, if the system 100 wanted all residual amount (s) to be a specific figure, the system 100 can require the balance of the security plus web barter dollars to always be a specific value. The purpose is to simplify the barter values to be essentially equal to a common value or multiple common values in the system 100 to facilitate more barter transactions.

As a "virtual stock market", the system may allow all securities to be in decimal format or dividable by 100, 1000 etc. This means that even a Himmelstein Option (no matter the security stated in the Himmelstein Option) can be in decimal format or dividable by 100, 1000 etc. Therefore 1.00=1 total unit of the particular security. For instance if the security is stock, 1.00 would equal one share of stock for a particular company.

Therefore, any fractional or decimal amount created from a barter transaction can be worth for example, as little as 0.001 of a web barter dollar or 0.001 of a U.S. dollar. Specifically, if Individual "A" posted a barter order to barter away 100 shares of AOL stock at $85.00 per share while desiring IBM shares at $180 per share, the system may, (if an available match existed or if it was a direct barter with the website) complete the barter order and provide 47.22 IBM shares at $180.00 per share. In this case, decimal amount of 0.22 is worth $39.60, if $180 is the current stock trading price per share. Alternatively, the system/barterer may allow, depending on the parameters set, barter 99.53 shares of AOL stock for 47 shares of IBM stock.

The system can state in all barter agreements (i.e. terms and conditions) that all parties using the system may accumulate "fractional" or "decimal" amounts (i.e. all values less than (1.00) total unit of a particular security) from different parties and upon the sum equaling 1.00, allow the sum to become 1 unit of a security, such as 1 share of stock. It should be noted that for Himmelstein Options, the system would be required to ensure the latest before dates and latest after dates overlap, and the system would restate the before date and after date to be the latest before date and earliest after date of all the fractional or decimal amounts.

Preferably, the system maintains a history knowing which fractional or decimal amount came from which security, such as stock, and can, when beneficial to the system and/or the barterer, re-separate a unit of a particular security and rematch it back together with a portion of the original security that had been part of the actually split. If for a Himmelstein Option, this may change the range of settlement dates.

Optimally, the system may allow barterers to barter fractional or decimal amounts to other barterers and/or only with the system.

The system 100 may set the standard for minimum transaction and maximum transaction based upon various concerns, including but not limited to, profitability and or irregularities, illegal trade practices and illegal trade patterns.

The methodology of the "standard" Himmelstein Option is to allow two or more parties to agree at a future date to barter, exchange or sell items or securities based on current agreed values, regardless of the trading values of the securities at the time of settlement. In an alternative embodiment, two or more parties may agree to exchange or barter at a future date based on values on that future date. In this embodiment, the settlement date or dates for each security may yet be a different date.

The system may unilaterally determine, or give each individual barterer, the ability to select a closing price for securities as trading days get longer with extended after-hours trading. For example, if a security was stock, the system may permit an individual to choose the traditional 4:00 P.M. eastern/standard time closing price of the NYSE and the NASDAQ market. On the other hand, the system or individual may choose the value based on after-hours trading. For example with the security, stock, or Himmelstein Option for stock, the system uses the closing price as the current stock trading price as noted on 538, FIG. 5D and 506, FIG. 5A.

The system 100 can operate 24 hours a day or during standard market hours and/or during predefined after hours trading or a combination thereof. The system 100 can further allow specific securities to be traded/bartered during specific time frames or allow a barterer to choose the hours during which the barterer wants their barter order posted (i.e. available for barter). Furthermore, the barterer or the system may allow the after hours trading market to operate totally independent from the standard market hours session. It may be a selectable parameter by either the barterer or system to determine whether a barter order posted during standard hours will participate in the after trading sessions and vice versa. Also, the barterer or system can determine if un-executed barter posted orders placed in either the standard or after hours session carries over to the other session or gets canceled.

The system can ensure that barterers remain anonymous from one another and may utilize trustees, assignors or intermediaries to accomplish such.

The system can also allow any barter order to be canceled under specific terms. Further, if the order was not "locked" by a barterer or already processed, the system can permit an individual who created the barter order to cancel or modify same.

The system can also utilize the latest security features and encryption methods available.

The system may permit an individual to post a barter order with a range of quantities acceptable to the individual. For example, if the individual posted IBM stock with a range of 5-10 shares, this means that the system can accept a barter order for any quantity between 5-10 shares. This increases the likelihood of the barter transaction occurring. As will be recognized by those skilled in the art, the fee structure charged by the system may be modified to handle this embodiment.

The system 100 can also conduct or perform auctions wherein the system 100 can further require: 1) a bidder to bid with a specific security; 2) a bidder to bid with a specific list of securities pre-approved; 3) require various conditions on a bidder such as requiring security to be held by the system/designated agent; 4) pre-approve an individual to bid and 5) Minimum bid requirements may exist. The system 100 may use the embodiment that allows "offers" and allows communications between potential barterers using the system's e-mail subsystem.

An agreement for a Himmelstein Option can state various additional conditions such as requiring that the barterer in possession of or in ownership of a Himmelstein Option must first offer or sell same to the system 100 and/or owner of the security prior to going to settlement. The system may allow a barterer creating Himmelstein Options the ability to draft specific conditions to essentially create a custom contract to meet the barterer's needs.

If the system 100 utilizes an intermediary or designated agent, the system 100 has the ability to fully communicate in such fashion to ensure that all securities are transferred back and forth in a proper controlled and secure fashion.

The system can authorize and permit an individual to access the ebarterrealestate.com system and utilize an intermediary, or directly barter for real estate.

Figure 8:
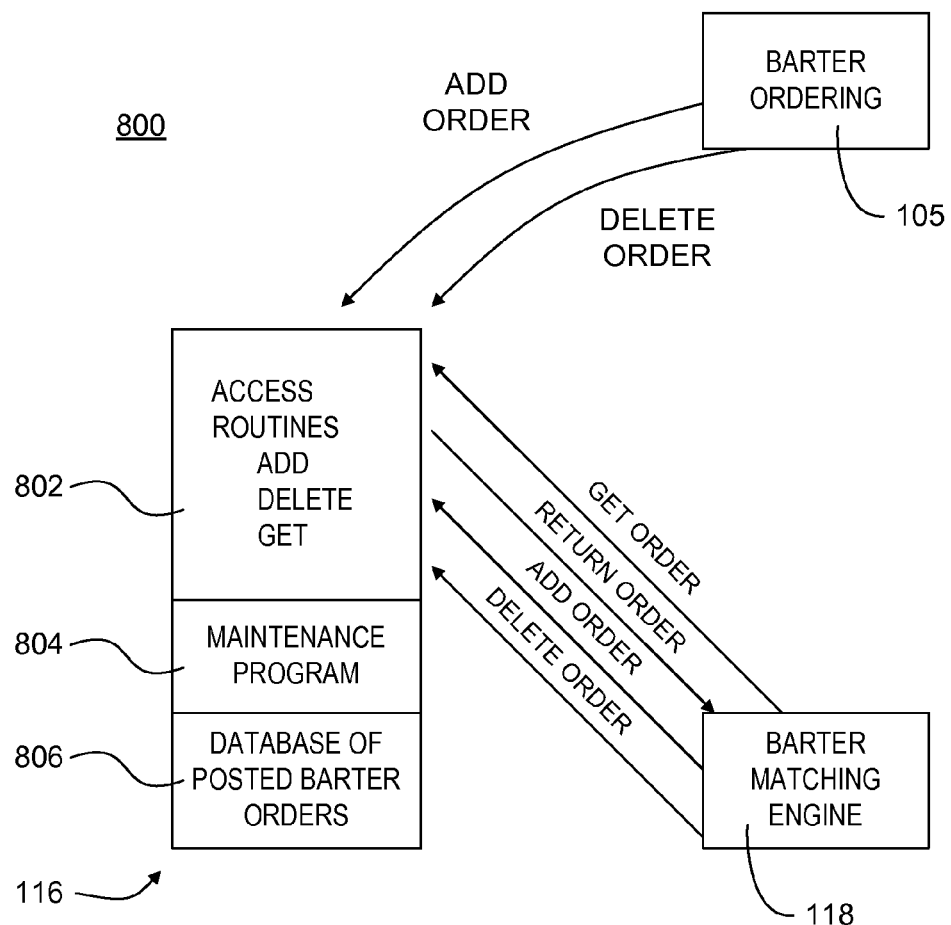
FIG. 8 is a schematic diagram of the components of a barter posting module in accordance with the teachings of the present invention.

Referring now to FIG. 8, the posted barter order database module 116 stores posted barter orders 806, provides access routines 802 and performs maintenance of the database 804. Among the access routines 802 are add order record, delete order record and get order record.

The add order routine generates a database record that comprises the barter order in addition to a unique transaction number, the time and date stamp of the order and the account number. There are numerous delete routines to remove posted barter orders based on different criteria. Some of the criteria are account number, transaction number, time and date, and barter item. Similarly, the get routine can return records based on the same criteria.

The maintenance program 804 executes periodically, or optionally at the request of and access routine 802, to remove and modify posted barter orders. For example, orders may be modified if a stock split occurs and the barter order designates this stock or a Himmelstein Option for the stock. Orders can be removed for a number of reasons such as the barter order expires, the barter account closes or the barter item is no longer available. For example, a barter order can be removed if stock trading is halted and the barter order designates this stock.

Barter orders are modified by the maintenance program 804 under a number of circumstances. A stock symbol designated in an order may have changed or the account number of the barter order is changed. Optionally, maintenance program 804 generates indexes and tables to facilitate quick access to the database records.

Optionally, if the system included a separate database of each individual's portfolio for all securities, the system can perform similar access routines and maintenance routines as described above.

With reference to FIGS. 11 and 15, these figures represent alternate graphical user interfaces to those shown in FIGS. 5A-E, by which users may place barter orders. FIG. 12 illustrates a response screen to a barter order which is an alternate graphical user interface to FIG. 6, while FIGS. 13 and 14 illustrate help instructions for that response screen.

One recognizes that many modifications may be made to FIG. 12, either in the column headings or in the way that the information in the rows is expressed. For example, additional column headings can include "buy-side shares", "trade price for the buy side/trade-for side" and/or "trade price for the sell side/trade-away side". Also in FIG. 12 on the line where "you save" $75.00, the savings can be expressed as $0.075 per sell side/trade-away side share, or $0.15 per buy side/trade-for side share. The "you save" amount can be either positive or negative. The figure can display another column "equivalent purchase share price" wherein for this line the entry is $100.10, showing that the user can save $0.15 per share relative to the buy side/trade-for ask price. In other words, for IBM, $100.10=the $100.25 ask price−$0.15 savings per share. Likewise, an "equivalent sale share price" can be shown as $54.20; i.e., for HD, $54.20=the $54.125 bid price+ $0.075 savings per share. The savings per share on the sell side is one half the savings per share on the buy side because twice as many shares are being sold as being bought.

Figure 33:
FIG. 33 is a copy of an alternate graphical user interface for a computer screen by which a user, directly through the illustrated graphical user interface and/or the linked graphical user interfaces described in the Figures below, can interface the barter order system of the present invention.

With reference now to FIGS. 33-54, other alternative graphical user interfaces are shown to those described above. More specifically, FIG. 33 shows a control center GUI through which users can enter and process barter orders and populate the order book, or database of posted barter orders, with marketmakers further able to enter and process rules for automatically and/or manually processing barter orders. The information in the help screen of FIG. 34 provides an overview of placing and processing barter orders.

Figure 35:
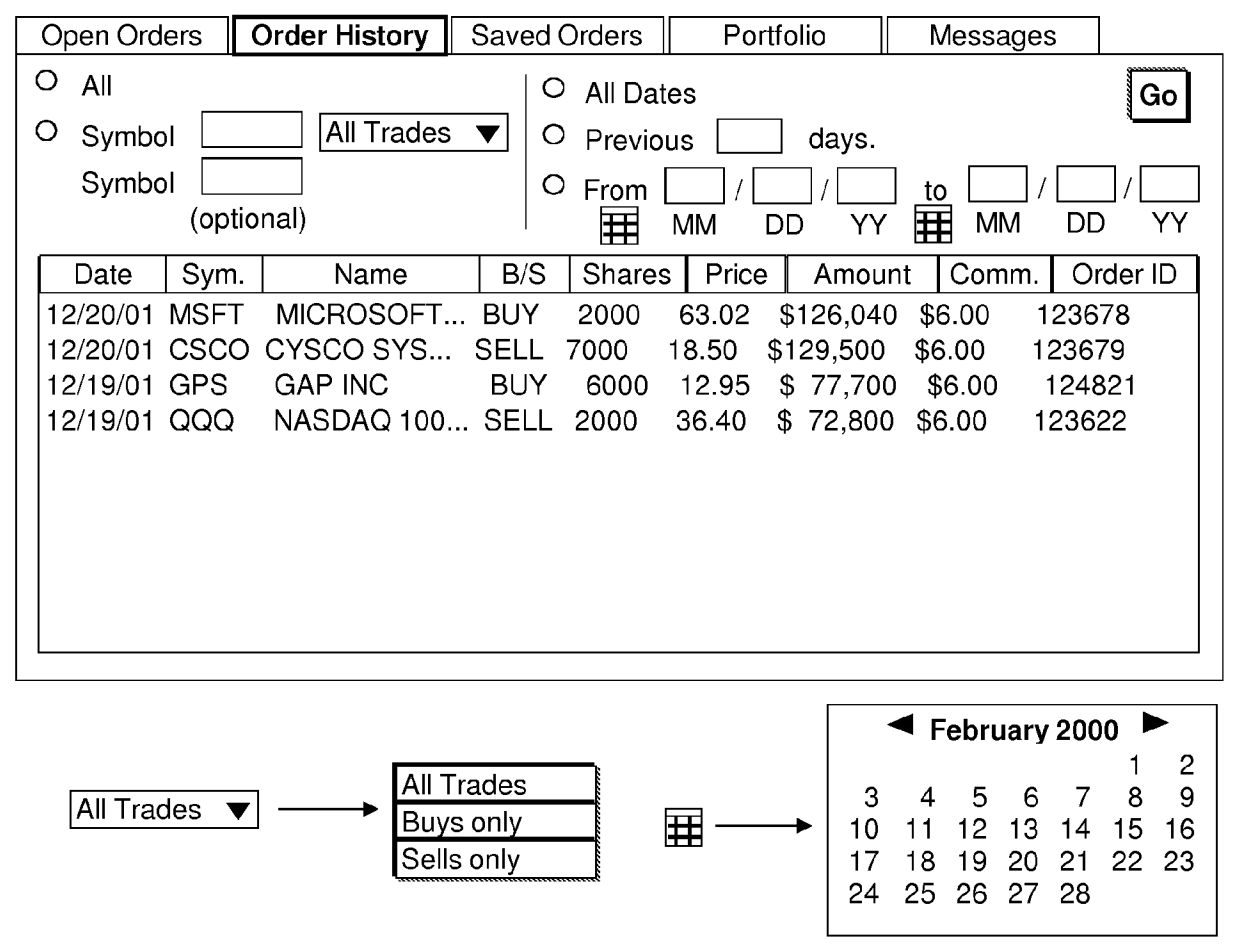

The GUI of FIG. 35 illustrates the contents of the Order History tab in the Control Center of FIG. 33, while the GUI shown in FIG. 36 shows the contents of the Saved Orders tab of the Control Center.

FIG. 37 shows a GUI accessible by clicking the "trade" option from the Saved Order screen of FIG. 36 which provides a trader with the option to place "Trade From Order Book," market order and limit order barter orders. The related instructions in the help screen of FIG. 38 describe the various processes of entering and processing a barter order.

The GUI of FIG. 39, selectable by clicking the Trade From Order Book button of the order entry screen of FIG. 37, along with related help instructions in the help screen of FIGS. 42 and 43, provides an interface for viewing and analyzing barter orders available in the limit order book stored in database 116. The Level II Quotes screen of FIG. 40 and the Internal and External Offers screen of FIG. 41, with the associated help instructions shown in FIGS. 42 and 43, provide user information for interpreting the level II quotes and internal and external offer information.

In an alternative embodiment of the invention, the system 100 may require a barterer to enter only (1) the symbols for the assets that he wants to barter, and (2) either (a) the ratio of the shares of one asset to the shares of the other asset, or (b) the ratio of the currency value of one asset to the currency value of the other asset. The barterer does not have to enter (1) which symbol corresponds to the buy side and which corresponds to the sell side, or (2) the exact quantities of each asset to be bought and sold.

In the instance where exact quantities of shares or currency values are entered but the asset symbols are not specified as buy side and sell side, marketmaker responses generated by the Marketmaker Toolkit are presented on two sides: one for when the barterer wants to purchase the first-entered asset and one for when the barterer wants to sell the first-entered asset.

In the case were the ratio of share quantities or currency values (rather than exact quantities of shares or currency values) are entered, marketmaker responses generated by the Marketmaker Toolkit are presented on a per-share or per-currency unit basis. There are many variations on how such responses may be generated; for example, (1) price per 100 shares of the buy side asset, and (2) price per US $1,000 of the sell side asset. Other variations will occur to those skilled in the art. Alternatively, system 100 may require that all entered orders have equal buy side and sell side currency amounts (subject to a non-zero tolerance so that trades may be executed in integer shares, integer currency units, or multiples of these, such as 100-share units). Accordingly, in these embodiments a barterer would enter only the symbol for the assets to be bartered, without indicated shares, currency values, or a ratio thereof. In these embodiments, marketmaker responses generated by the Marketmaker Toolkit are presented on two sides and on a per-share or per-currency unit basis. In a variation of these embodiments, the exact quantity of either the buy side or sell side, but not both, may be entered by the barterer. With reference to FIGS. 39, 40 and 41, the savings amount shown in the Limit Order Book's individual offers (and, by extension, the Quick Fill offer) represents the monetary difference realized by a user between trading on offers that include system 100's internal offers ("System Offers"), and trading on offers that are exclusively national market offers/external offers ("Benchmark Offers"). These savings amounts may be computed by a variety of methodologies, depending on what offers are included in System Offers and what the Benchmark Offers are assumed to be. The System Offers may or may not include offers from the national markets. Further, the Benchmark Offers may be based on reasonable hypothetical assumptions. One assumption is that the only national quantities available to trade are those shown directly in the Level II quote system. A second assumption is that the total size of the incoming barter order is available to be traded at the National Best Bid and Offer (NBBO) prices. This assumption would lead to a smaller (or more negative) Savings amount than would the first assumption. A third assumption is that a fixed number of shares is available to trade at every 0.01 price increment for each security in the barter order. Price increments other than 0.01 could also be used. A fourth assumption is to assign a (different) quantity of shares available to trade to each marketmaker, each exchange, and each ECN, shown on the Level II quote system. These and other assumptions may be appropriately used in calculating user savings.

In the lower portion of the Limit Order Book (LOB) shown in FIG. 39, the System Offers are ranked from most attractive (top line) to least attractive (bottom line) according to "MSFT Ask" price (in general, this price is the ask price of the buy-side security). This ranking is based on the assumption that a trader can sell the sell-side security on its NBBO bid, and purchase the buy-side security at the variable ask price shown in the System Offer. The higher this ask price, the more the trader must pay and the less attractive the offer becomes.

Other methodologies can be used to rank offers. For example, an assumption can be made that the buy-side security is always purchased at its then-current NBBO ask price, while the sell-side security is sold at a variable bid price. In this case the lower the variable bid price, the more a trader pays (or the less he receives) and the less attractive the internal or external offer. Other methodologies can be used to specify either the buy-side price or the sell-side price at the time an offer is displayed. Examples include (1) the midpoint of a security's NBBO bid and NBBO offer, (2) a fixed dollar price, such as today's opening trade price, or such as $50, and (3) a price that depends on the size of the incoming order, such as the NBBO ask price plus 0.01 per 100 shares being purchased. Other methodologies may also be appropriate.

Help information shown in FIG. 44 provides user assistance for trading on individual barter orders in the barter order book of FIG. 39. One option for trading is to execute a Quick Fill, available through the Quick Fill button shown in FIG. 39 as explained in the help screen illustrated in FIG. 45 and resulting in the Instant Confirmation screen shown in FIG. 46. FIG. 47 illustrates a help screen containing information for interpreting the contents of the Instant Confirmation screen of FIG. 46.

The user help screens shown in FIGS. 48, 49 and 50 provide user assistance for trading individual orders from the order book of FIG. 39. Note the tables of FIG. 49 are illustrated in FIG. 50.

Figure 51:
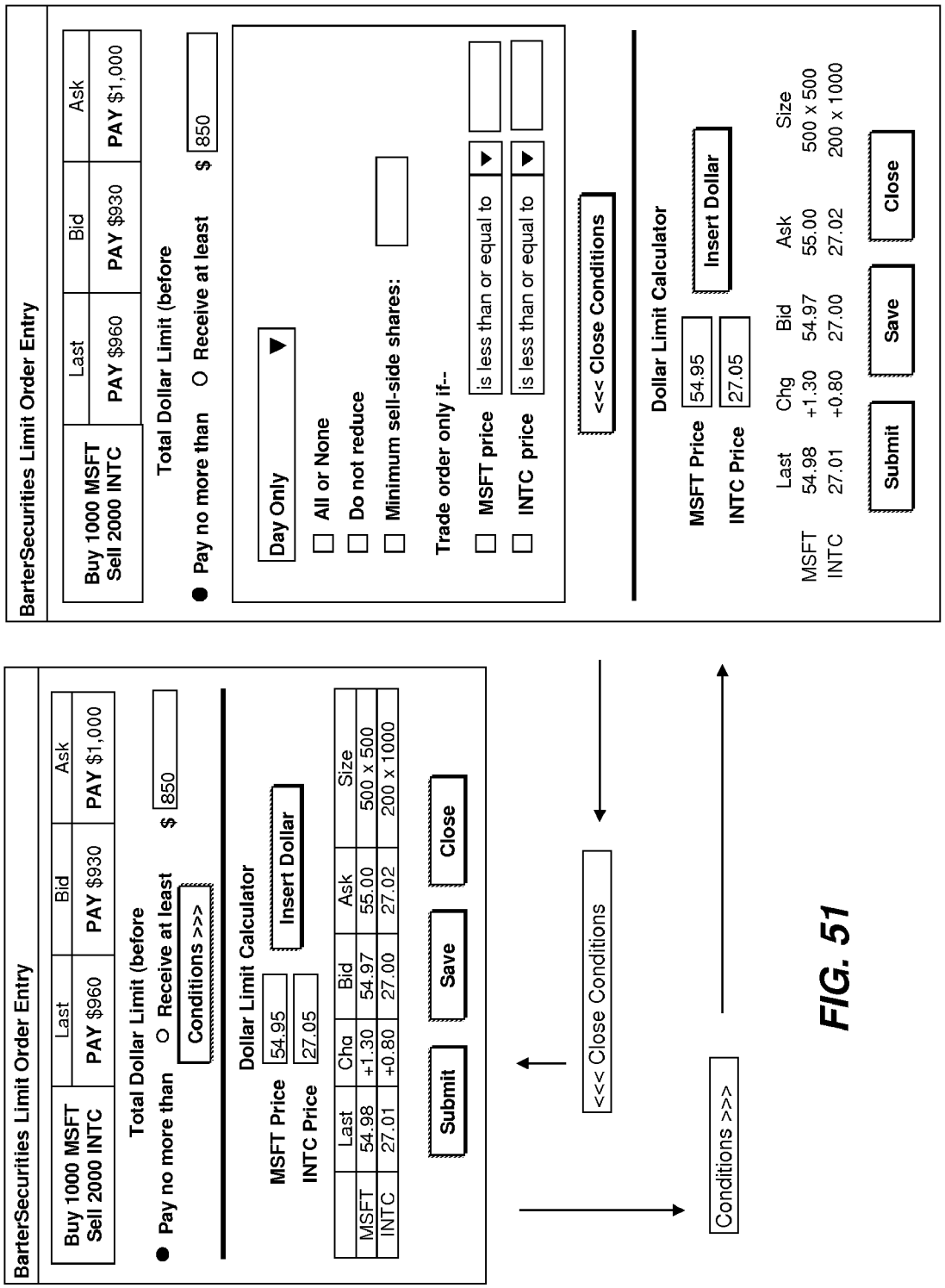
FIG. 51 is a copy of a graphical user interfaces for a computer screen, accessible through the graphical user interface FIG. 37, by which a user can enter limit orders.

With reference now to FIGS. 51, 52 and 53, the GUI shown in FIG. 51, accessible from the Limit Order button of the Order Entry GUI shown in FIG. 37, enables a user to enter a limit order for a barter order. The Market Order Entry GUI shown in FIG. 52, similarly accessible through the Market Order button of the Order Entry GUI (FIG. 37), enables a user to enter a market order for a barter order. The help screen illustrated in FIG. 53 provides user assistance relating to both limit and market orders.

Figure 10:
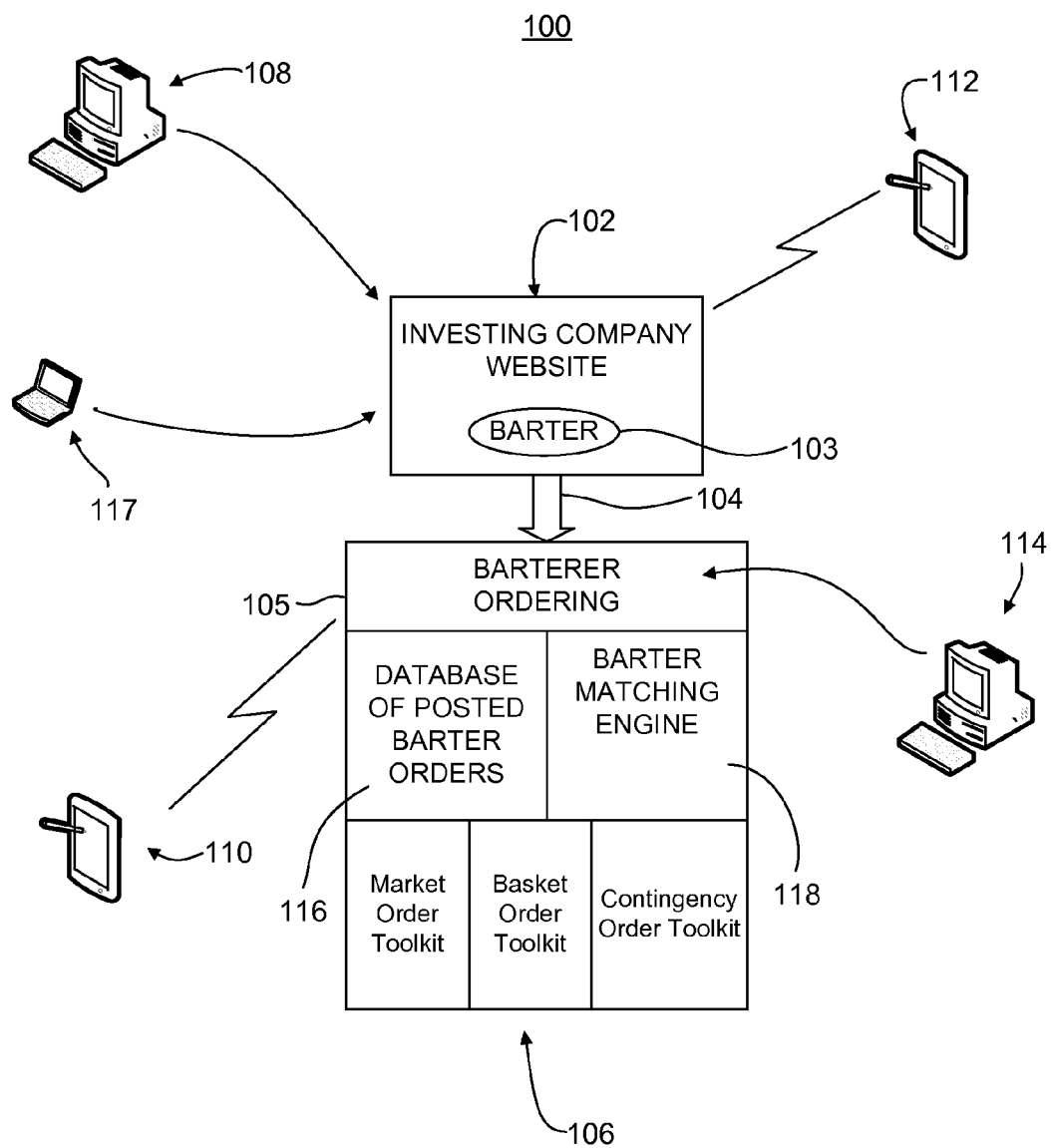
FIG. 10 is a block diagram showing the bartering system of FIG. 1 and further including market order, basket order and contingency order toolkits.
Figure 10A:
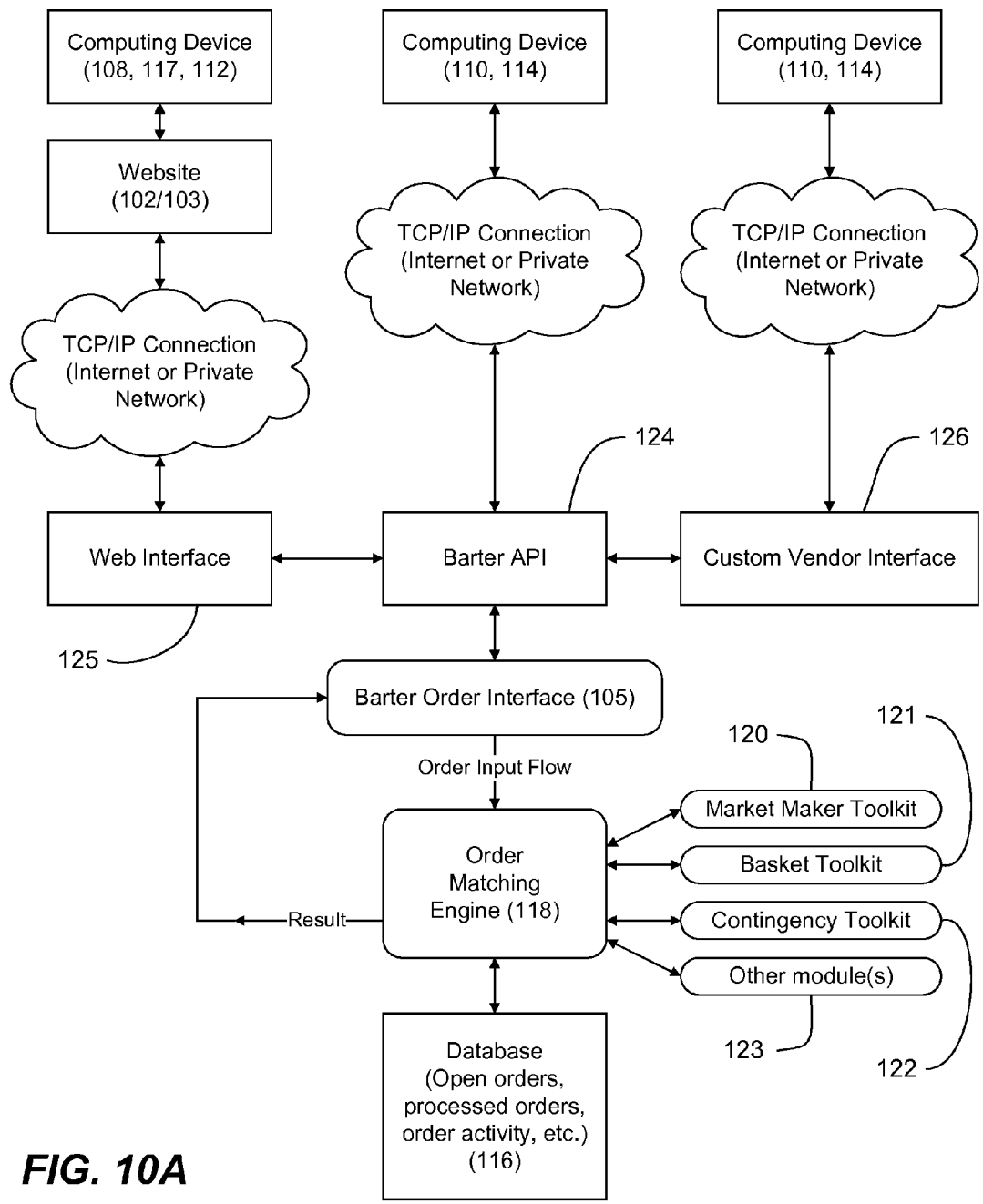
FIG. 10A is an alternate embodiment of the present invention.

Referring now to FIGS. 10 and 10A, alternative embodiments of the present invention are shown further including marketmaker 120, basket order 121 and contingency order 122 barter tool kit systems ("tool kits"). Like features to those described above are indicated by like reference numbers. Each toolkit utilizes a software program or programs that interface with the system 100.

System 100 of FIG. 10A is seen to further include capacity for additional processing modules 123. The system of FIG. 10A further includes an application programming interface 124 specific to barter order interface 105 operable through either a web interface 125 or a custom vendor interface 126. As described above, the various computing devices can interface the barter order system through a public or private network connection, optionally through a website web browser.

As will be described in further detail below, the use of the toolkits automates certain processes and functions which otherwise might require significant manual activity. As used herein, the term "automate" and variants including "automated," include the process or operation of notifying an operator that a manual intervention or response is required.

As used herein, a "marketmaker" is any person or system that responds to order flow by making bids and offers on which another person or entity can trade. Such a marketmaker is said to add liquidity to a market when he allows another to trade on his bid or offer. Also in the context of these specifications a "trader" is any person or system that desires to execute a particular order, including a market or limit order, and is looking for another party to make a bid or offer for such order. Such trader is said to remove liquidity from the market when he executes his intended order. Accordingly, any person or system that, in response to order flow, creates an offer that resides on the Limit Order Book (LOB) is deemed to be a marketmaker, and any person or system that attempts to trade against an offer residing on the LOB is a deemed to be a trader. Trader-initiated limit orders residing in the system may be executed by marketmaker offers automatically at any time, with or without appearing in the LOB. Consistent with this paragraph, a person institutionally designated as a marketmaker may desire to enter barter orders as a "trader" in the context of these specifications, while a person or entity who is not a broker-dealer may desire to provide offers through the herein-described Marketmaker Toolkit and act as a "marketmaker" in the context of these specifications. Users of system 100 will thus include both traders and marketmakers.

As will be appreciated from consideration of the description below, the toolkits as described herein are operative in many instances to respond to both barter orders and barter order requests for quotes. As used herein the term "barter order request" includes both a barter order and/or a barter order request for quote.

Marketmakers profit by capturing the bid/ask spread on trades, while minimizing the cost of position management or the cost of immediate hedging of these trades. The System 100 is designed to deliver a particularly attractive order in this regard. System 100 order flow carries all of the bid/ask spread profit potential but only a small fraction of the market risk and adverse market impact associated with traditional orders.

System 100 order flow delivers a traditional buy and a traditional sell order simultaneously. For example, a barter order might be to buy $100,000 of IBM and sell $90,000 of HON, each contingent on the other. By executing these legs at the same time, the marketmaker generates a profit that is proportional to the dollar sum of both legs, or $190,000, but generates market exposure that is proportional to the dollar difference between the two legs, or only $10,000.

Of course, the ultimate attractiveness of a barter order depends on many variables, including the dollar difference between the buy and sell legs, the industry closeness of the stocks, and the liquidity of the two names. System 100 allows marketmakers to use a tool kit, which not only provides the means to measure the attractiveness of any incoming barter order along these and other dimensions, but also to specify how aggressively or passively to respond to it, either on an absolute price and size basis, or in terms of last trade price and size, or in terms of the current NBBO (National Best Bid and Offer) prices and sizes.

A marketmaker tool kit is a system that allows marketmakers to characterize incoming orders by creating or defining their own rules that include (1) conditions that describe an incoming order, and (2) price/size tiers that form automatic quotes or executions to one or more traders' orders if the conditions are satisfied. These automatic quotes and executions bring greater liquidity to the System 100. For example, marketmakers can write a rule that allows them to manually or automatically offer to trade a barter order at a fixed price, or a market-based price, such as 10% of the NBBO spread under the current NBBO offer, in the current NBBO size, whenever the dollar sizes of the buy and sell legs are almost equal and the two securities bartered are in the same industry.

One embodiment of a marketmaker toolkit is embodied in the graphical user interfaces and help screens illustrated in FIGS. 16 through 20. Another embodiment of a marketmaker toolkit is embodied in the graphical user interfaces and help screens illustrated in FIGS. 54-76. In the first embodiment, FIG. 16 shows a GUI interface by which a marketmaker can establish automatic bid/offer responses. FIG. 17 shows a GUI for working with symbols related to the automatic bid/offer responses, while FIGS. 18, 19 and 20 illustrate help screens containing user instructions for the marketmaker toolkit.

Figure 54:
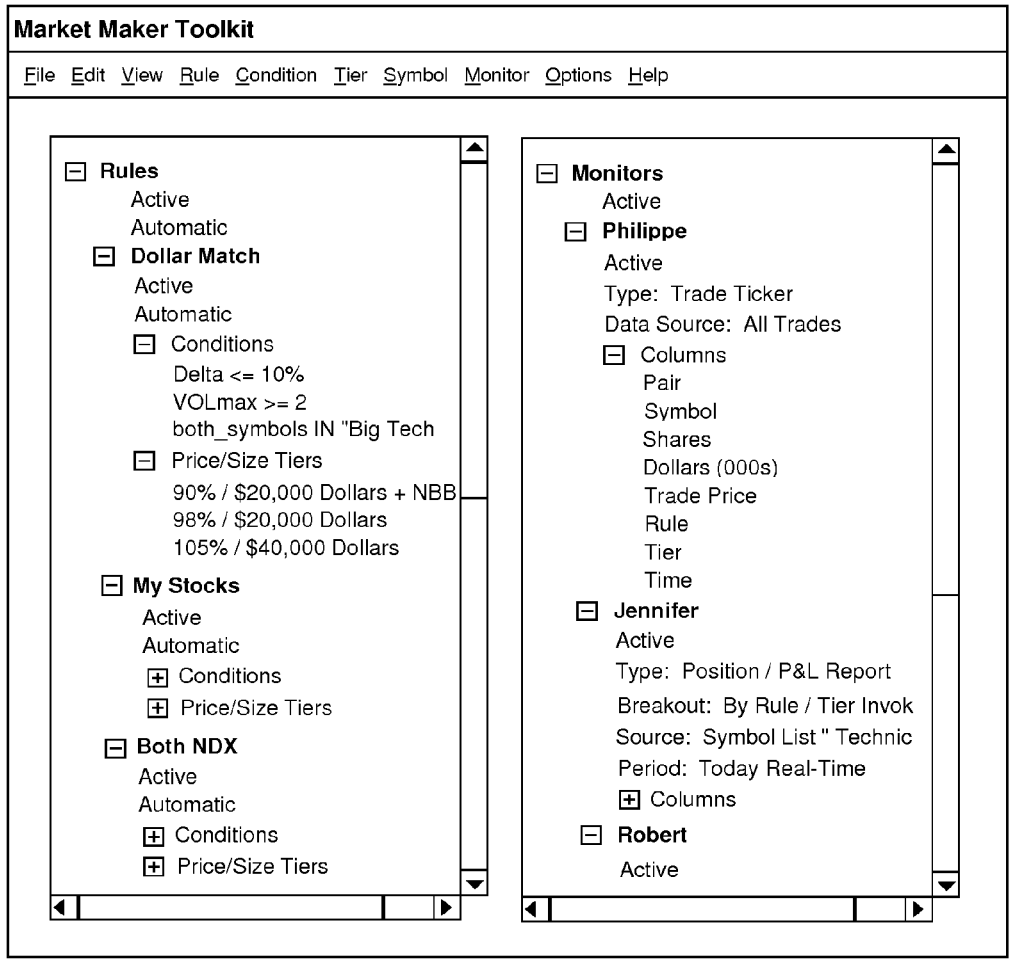
FIG. 54 is a copy of a graphical user interface for a computer screen, accessible through the dropdown tool menu "Rules" option in the graphical user interface of FIG. 33, by which a user can access a marketmaker toolkit.
Figure 58:
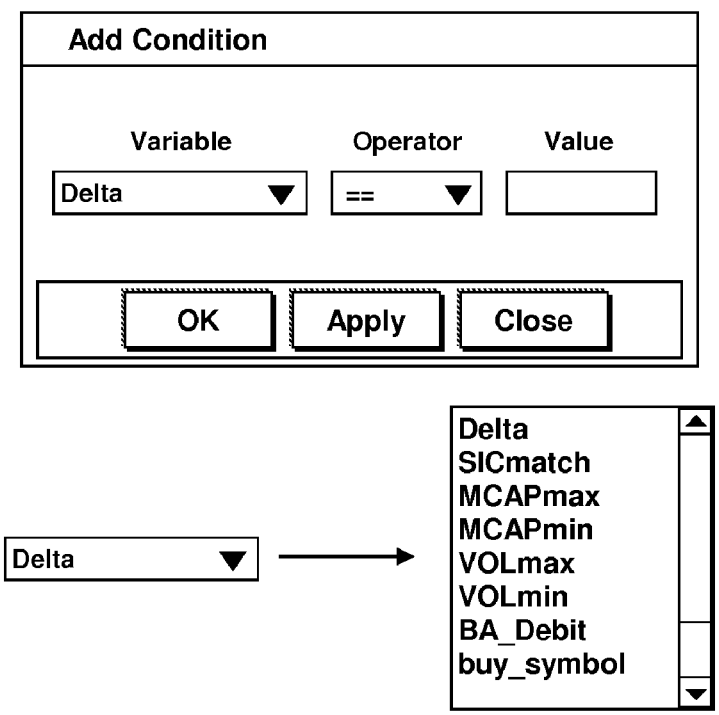
FIG. 58 is a copy of a graphical user interface for a computer screen, accessible through the graphical user interface of FIG. 54, by which a user can establish a trading condition.

With reference to the second embodiment, FIG. 54 illustrates a GUI interface for marketmakers to establish both automated and manual bid/offer responses, with associated help instructions shown in FIG. 55. FIGS. 56 and 57 show a GUI interface and help instructions, respectively, for establishing rules, while FIG. 58 shows a GUI interface for establishing conditions in accordance with the help screens shown in FIGS. 59-61.

FIG. 62 shows a GUI through which a marketmaker can establish and edit pricing tiers in accordance with the help information provided in the illustrated help screen of FIG. 63.

FIG. 64 shows a GUI interface for creating a customized ticker of securities information useful to a marketmaker in accordance with the instructions shown in the help screen of FIG. 66. One exemplary ticker is illustrated in FIG. 65.

Figure 69:

FIG. 67 shows a GUI interface for creating a customized position/profit & loss report useful to a marketmaker in accordance with the instructions shown in the help screen of FIG. 70. Two exemplary position/profit & loss reports are shown in FIGS. 68 and 69, respectively.

Figure 72:
FIG. 72 is a copy of a graphical user interface for a computer screen, accessible through the graphical user interface of FIG. 71, by which a user can edit manual offer default criteria.
Figure 71:
FIG. 71 is a copy of a graphical user interface for a computer screen, accessible through the graphical user interface of FIG. 54, by which a marketmaker can create a manual offer.
Figure 74:
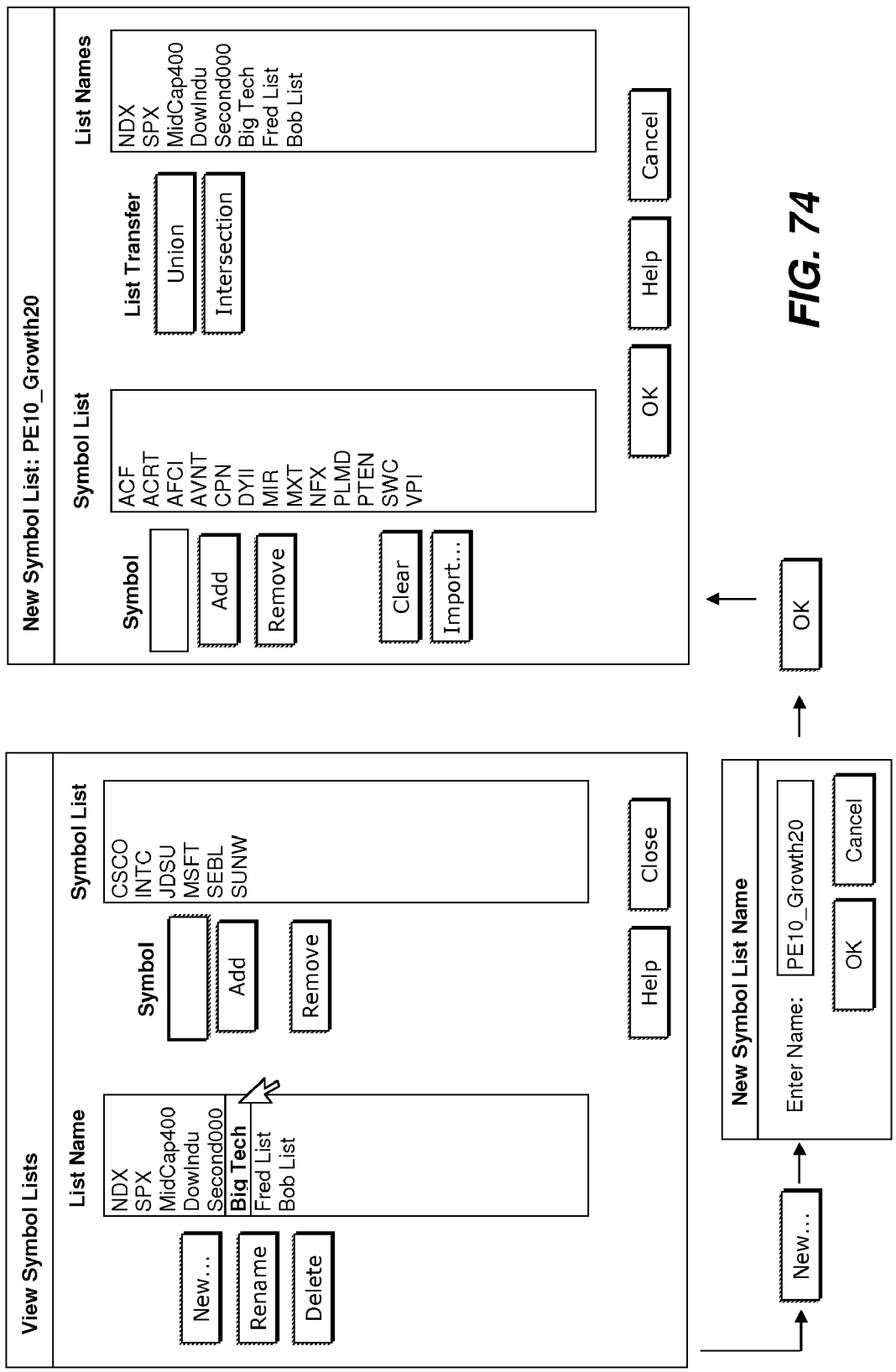
FIG. 74 is a copy of a graphical user interface for a computer screen, accessible through the graphical user interface of FIG. 54, by which a user can view symbols used in creating rules and by which a user can create new symbols used in creating rules.

FIGS. 71 and 72 show GUIs for establishing manual offers, wherein barter orders that meet the established conditions are provided to the marketmaker for generating a manual response. Associated help instructions are illustrated in the help screen shown in FIG. 73.

The barter matching engine 118 incorporates or interfaces with the various rules, conditions and pricing tiers a marketmaker establishes using the marketmaker tool kit shown and described above, to selectively match a barterer's barter order (that is either posted or requesting a quote only) to rules that are pre-defined by a marketmaker, in order to determine which marketmakers are providing automatic quotes or executions. A rule is a list of one or more conditions that may comprise a parameter (variable), an equality or inequality sign (operator), and a constant value (constraint). A parameter is a market-related, portfolio-related, or other type of variable that characterizes an order. For example, the average daily volume of the security being traded away is a parameter. A constant value may be a numerical value or string value (e.g., a security symbol) that places a constraint on a parameter. One condition, for example, can be "Average Daily Dollar Volume of the Stock being Traded Away">=$2 million. Here, the parameter is "Average Daily Dollar Volume of the Stock being Traded Away", the inequality is "greater than or equal to", and the constant value (constraint) is $2 million.

Optionally, the tool kit can be set up so as to pre-designate a parameter and an equality or inequality sign, so that a marketmaker may enter only a constant value to create a condition. Likewise, the tool kit can be set up so as to pre-designate any number of the elements of a condition, so that a marketmaker may enter only the remaining element(s) to create the condition.

Alternatively, the tool kit can provide the means for marketmakers to be alerted by system 100 to specific barter orders to which they desire to provide manual responses. See again FIGS. 71-73 for GUIs and help instructions used to establish manual responses. For example, a marketmaker may use the tool kit to be alerted if an order to barter for at least 10,000 shares of IBM is entered into the system, so that the marketmaker can evaluate the particular barter order and, if desired, can provide a manual quote for said order. Likewise, a marketmaker can use the tool kit to be alerted if a trader is trading away IBM but not if a trader is trading for IBM. Alternatively, a marketmaker can use the tool kit to be alerted if a trader is trading for IBM but not if a trader is trading away IBM. As another example, marketmakers can cause the system 100 to alert them if a barter order comprises two securities that fall within a list of securities that the marketmaker has pre-designated.

Marketmakers can use the marketmaker tool kit to specify exactly how many of the conditions that comprise a rule must be satisfied before an automatic price quote or trade execution is delivered to the system 100. For example, a marketmaker can use the tool kit to specify that an alert is to be sent if exactly two of the following three conditions are satisfied: (1) a trader is trading away IBM, (2) a trader is bartering two stocks that both trade an average daily dollar volume of at least $2 million, or (3) the dollar amount that is being traded for equals the dollar amount that is being traded away.

The marketmaker tool kit is designed to allow marketmakers either to use parameters already designed for them, or to create customized parameters. Examples of pre-designed parameters are number of shares or lot size, share price, trade volume, risk characteristics, and inclusion within a specified security list. An example of a risk characteristic of a barter order is "Delta", which measures the amount of market exposure of the order. The Delta is the absolute value of the difference between the currency amounts of the two legs of the barter order, divided by the maximum currency amount. If the trader is trading away a currency amount of US$100,000 and trading for an amount of US$75,000, then the Delta is 25%=|100000−75000|/max(100000, 75000). It would be recognized by one skilled in the art that many variations may be made in the structure and mode of operation of the tool kit without departing from the spirit and scope of the invention as disclosed in the teachings herein.

A rule can include both multiple price and size tiers used to generate automatic or manual offers on the Limit Order Book. An example of this is shown in FIG. 62, whereby the offer price may be expressed in terms of (1) the then-current NBBO price spreads for the two component securities, and (2) a pre-specified increment. In the example, the offer size may be expressed in terms of (1) the then-current NBBO sizes of the two component securities, and (2) a pre-specified value, based either on numbers of dollars or numbers of shares.

Other methodologies for determining offer price and offer size are also possible. These values may depend on a portion of (or all of) the Level II quotes for the two relevant securities. For example, offer size can be expressed as (1) the sum of the first three offer sizes shown on the Level II quote system, or (2) the size of the first offer from a pre-selected marketmaker, exchange, ECN, or ATS, etc., or (3) the sum of the sizes of all Level II quotes whose price is within 0.02 of the current NBBO offer, or (4) a pre-selected currency amount rounded to a multiple of 100 shares. Variations of these examples are also possible. Furthermore, offer price can be expressed as (1) the average of the first three offer prices shown on the Level II quote system, or (2) the price of the first offer from a pre-selected marketmaker, exchange, ECN, or ATS, etc., or (3) the price of the first Level II quote whose size is at least 1000 shares. It will now be apparent to those skilled in the art that many different variations of these determinants are also possible.

In the matching process, the rules in the marketmaker tool kit functionally operate as a filter to provide barter orders to the appropriate marketmakers. This allows the marketmakers either to post one or more potential trade prices in response to a trader's limit order or quote request, or to execute a single posted limit order or a combination of posted limit orders (i.e., "phantom" or "implied" limit orders, discussed below).

The contra side of traders' barter orders may be marketmakers. However, some system 100 order flow can be matched against other orders that are internal to the system. As explained previously, many internal orders may need to be combined to make one execution. For example, an order to sell IBM and buy HON, an order to sell HON and buy CSCO, and an order to sell CSCO and buy IBM, can form a three-way internal match. Likewise, a limit order to sell IBM and buy HON, and a limit order to sell HON and buy CSCO may create an "implied" limit order to sell IBM and buy CSCO, to which a marketmaker may respond, exactly as if the "implied" order were an actual entered barter order.

System 100 may provide traditional order liquidity to an Exchange, ECN or ATS. One illustrative example includes the following two barter orders:

Buy 1000 MSFT/Sell 2000 INTC/Pay $0.
Sell 1000 MSFT/Buy 1000 INTC/Receive $30,000.

If these barter orders reside on system 100, the system can post two traditional orders to an Exchange, ECN or ATS:

Buy 1000 INTC @ $30.00,
Buy 500 MSFT @ $60.00.

System 100 posts the former order so that, if a third party trades against it, it can execute both of the barter orders. That is, a three-way match is formed by these orders:

Buy 1000 INTC/Pay $30,000 [first Exchange, ECN or ATS order]
Buy 1000 MSFT/Sell 2000 INTC/Pay $0. [first barter order]
Sell 1000 MSFT/Buy 1000 INTC/Receive $30,000. [second barter order]

System 100 posts the latter order because if a third party trades against it, then it can execute one barter order in full and one in part. That is, a three-way match is formed by these orders:

Buy 500 MSFT/Pay $30,000 [second Exchange, ECN or ATS order]
Buy 500 MSFT/Sell 1000 INTC/Pay $0. [½ of first barter order]
Sell 1000 MSFT/Buy 1000 INTC/Receive $30,000. [second barter order]

It can readily be determined that the number of one-sided limit orders generated by the above methodology can increase as fast as geometrically with the number of pending barter orders, as long as the orders deal with similar symbols.

The Limit Order Book (LOB) may show offers that are (1) exclusively internal to system 100, (2) exclusively external to the system; i.e., residing on exchanges, the NASDAQ market, ECNs, ATSs, etc., or (3) a combination of internal and external. Whenever a trader chooses to trade against an external offer, he runs the risk that such offer may change before his order reaches the external market and, hence, that he misses the intended trade. Accordingly, the system 100 may allow a trader to pre-select how such a situation will be resolved. The trader may choose between using market orders and using limit orders when his offer cannot be executed against the then-current external offers.

If a trader chooses to use market orders when the intended external offers are not available, his barter order will be split and will be delivered to the external market as two single-security market orders. Consequently, he will be guaranteed a fill of his entire order, although not necessarily at the price of the intended offer. If a trader chooses to use limit orders when the intended external offers are not available, his barter order will be split and will be delivered to the external market as two single-security limit orders. Consequently, the trader will be guaranteed that if a trade takes place it will be at the intended price, although the trader will not necessarily trade the full amount of his intended trade (and in fact, the trader may not trade at all) and the ratio of the quantities of the two securities traded may not equal the ratio specified in the barter order that was placed originally.

One advantage of the present invention is that, in contrast to trading on external offers, whenever a trader trades against an internal offer, he is guaranteed to receive the intended price. Furthermore, although he is not guaranteed to trade the full size of his intended trade, he can be guaranteed to trade in quantities that are in the same ratio as that specified in his original barter order.

In an alternative embodiment, marketmakers, institutional traders and retail traders may use a basket generator tool kit ("basket tool kit") to define a basket of securities that can be sent directly to the market, or bartered against either an individual security or another basket. Graphical user interface and associated help screens illustrating a toolkit for creating basket orders as described below are shown in FIGS. 26-32. More specifically, FIGS. 26 and 27 show GUIs for defining baskets of trade items in accordance with the instructions in the help screen shown in FIG. 28. FIG. 29 shows a GUI for defining symbols in accordance with the help screen shown in FIG. 30, while FIG. 31 shows a GUI for establishing fundamental and technical filters in accordance with the user help screen shown in FIG. 32.

A basket of securities ("basket") is defined to be at least two different securities, grouped in any combination of descriptions or sizes. The basket tool kit may allow traders to define a basket in terms of its market characteristics or risk characteristics, including fundamental, technical, and macroeconomic factors. Traders may also use the basket tool kit to select securities from existing portfolios. The individual securities' symbols may or may not be explicitly included, explicitly excluded, or a combination of both. In a simple form, the basket tool kit may be used to create a basket of all utility stocks (with no symbols specified) with market capitalization greater than $1 billion. It may be used to create a basket of all technology stocks with beta to the NASDAQ Composite Index greater than one. In more complex cases, a trader can use the basket tool kit to create a basket equal to all of the bank stocks in the trader's existing portfolio, plus enough 10-year T-bills to bring the total interest rate exposure of the basket to a specified level. Or, a trader can use the basket tool kit to create a basket of $200,000 of each healthcare stock whose 10-day moving average exceeds its 50-day moving average. Or, the trader can use the basket tool kit to create a portfolio with specified weightings of specific industrial sectors.

It will be recognized by one skilled in the art that many variations may be made in the structure and mode of operation of the basket tool kit for defining baskets of securities without departing from the spirit and scope of the invention as disclosed in the teachings herein.

One also skilled in the art realizes that basket trading can be accomplished without the use of a basket tool kit. In one embodiment, the order entry screen can provide the trader a button to click, which indicates that a basket trade is being entered. The order entry screen may request traders to enter the number of securities to be included in the basket; or, in the alternative, may allow multiple entries of securities until such time that a null entry is made.

When entering a basket, traders can include the respective number of shares or currency amounts of each security, plus either a limit price for each security, or an overall limit price for the basket. The traders may specify the ratio among the securities; or, in the alternative, the system calculates the ratio among the securities. This allows traders the ability to barter a basket as if it were a single security (i.e., trade away one security or a basket for one security or a basket). As the subsequent example demonstrates, a basket can be automatically executed based on the derived or implied ("implied") bids or offers for the different securities within the basket. This allows the trader not to have to monitor the price movements of the different securities continuously.

For example, a trader creates a basket, which has two securities: MSFT and HD noting 500 shares of each and an overall limit price for the basket of $87,500. If traders wanted to sell the basket, they can enter this as a sell order. If traders wanted to barter this basket away, they can enter this as a barter order and state this as the "trade away" item. Upon the order's being entered, the system automatically generates two implied orders based on the overall limit price of the basket and current market prices for the two individual securities. For example, if a trader enters an order to sell the basket, and if MSFT has a bid price of $100.40 and an ask price of $100.55 and HD has a bid price of $74.30 and an ask price of $74.60, then the system generates two implied offers. For MSFT, an implied offer to sell 500 at $100.70 is generated. The MSFT offer price is calculated as [(Overall sell limit for the basket)−(HD shares)*(HD bid price)/(MSFT shares)]. Numerically, this formula produces: ($87,500−500*$74.30)/500, or $100.70. Therefore, if this implied MSFT order can be executed then the total basket can be executed because the remaining part of this basket order can be simply executed against the market bid for HD of $74.30. Similarly, an implied offer to sell 500 HD at $74.60 is created in response to the current market bid for MSFT of 100.40. That is, the HD offer price is ($87,500−500*$100.40)/500. These implied orders are monitored and recalculated continuously as market prices change. For example, if the current market bid for MSFT changes to $100.60, the implied offer for HD changes to $74.40. When someone enters a bid that matches one of the implied offers, all remaining securities in the basket are automatically filled at the current market offers. At execution, all remaining implied orders are deleted from the system.

In another alternative embodiment, traders may use a contingent order delivery tool kit ("contingency tool kit") as a means to control the timing of the delivery of an order (buy, sell, or barter order) and the definition of its limit, based on current and historical market data for any security, not just the primary order security. Traders may also use a contingency tool kit as a means to control the timing of the delivery of a barter order request for quote. Exemplary graphical user interfaces and help screens associated with a contingency order toolkit are shown in FIGS. 21 through 25. More specifically, FIG. 21 shows a GUI for defining an order contingency in accordance with the help screen instructions illustrated in FIGS. 22 and 23. FIG. 24 shows a GUI for sending a contingent order to system 100 in accordance with the instructions shown in the help screen illustrated in FIG. 25.

The primary order (i.e., excluding the contingency) can be a market order, a traditional limit order with a pre-set limit, or a new type of limit order where the limit is market-dependent and may change in real time.

Basic examples of the new type of limit order are:

Buy xxx shares of IBM at the then-current offer (i.e., when the contingency is satisfied).

Buy xxx shares of IBM at the 10-day moving average.

Buy xxx shares of IBM at today's low.

A case where the limit of a non-contingent order depends on other than IBM data is: Buy . . . IBM at yesterday's closing price plus (Beta of IBM vs. SPY)*(today's % price change in SPY).

The contingencies can look like anything (IBM is the primary order symbol):

Submit order if QQQ is at it's daily low after 3:45 pm.

Submit order if CSCO and SUNW are each up at least 2%.

Submit order if SPY rises above its 20-day moving average.

Submit order if QQQ/SPY>=0.25.

Submit order if IBM falls to its first Fibonacci retracement level. (or other types of technical indicators.)

The contingency tool kit can also be based on fundamental data, like earnings announcements.

It will be recognized by one skilled in the art that many variations may be made in the structure and mode of operation of the contingency tool kit (for defining the timing and limit based on current and historical market data for any security, not just the primary order security) without departing from the spirit and scope of the invention as disclosed in the teachings herein.

It is the intention of the inventors that the basket tool kit and the contingency tool kit may be used jointly or severally with both traditional (single-security buy and sell) orders and barter orders. It is further the intention of the inventors that the marketmaker tool kit may be used with traditional (single-security buy and sell) orders, basket order, and a user bartering a basket for another basket ("barter basket order"). Although the tool kit was described in detail for use with a barter order, it also can apply to the above types of orders. Changes apparent to those skilled in the art can be made to the tool kit to adapt to each of these types of orders. For example, marketmakers can have the ability to encode procedures for responding to traditional (single-security buy and sell) orders (with either a bid or an offer, as appropriate) based on various characteristics. The characteristics of an incoming order that can be assessed by the described system include:

action (buy or sell), price, and quantity of the order,
the current NBBO "picture" of the incoming security; that is, last trade, bid price, ask price, bid size, ask size, daily price change, and last tick (i.e., uptick or downtick),
current information about Level II quotes for the incoming security (e.g., SLKC bidding for 1000 shares five cents below the NBBO bid),
historical price information (e.g., 30-day percentage price move, current 20-day moving average),
historical technical indicators (e.g., current level of Fibonacci retracement lines),
current and historical fundamental information (e.g., price/earnings ratio, five year earnings growth rate),
marketmakers' current inventory information (e.g., currently short 2000 MSFT, currently long $2 million of securities in NASDAQ 100 index),
marketmakers' historical trade information (e.g., bought 5000 MSFT today, sold 10,000 INTC in last 5 minutes, bought $500,000 of securities in NASDAQ 100 index today), and
price, technical, and fundamental information about the general market (e.g., Dow industrials down 50 points today).

Marketmakers are able to set up price/size tiers for automatic responses and are further able to set up Marketmaker Toolkit Monitors (Trade Tickers, and Position and P&L Reports) as they do for two-sided orders. Responses can be placed automatically, that is without directly viewing the incoming order, or manually.

In another example, should a marketmaker be using the tool kit for a barter basket order, the marketmaker may have the tool kit describe a basket order in terms of industry composition and certain risk characteristics with or without revealing industry symbols and/or individual symbol amounts.

It will be understood that while the illustration of the marketmaker, basket and contingency order toolkits has been described above with respect to the creation and execution of barter orders for stocks, the invention is not limited to barter orders but contemplates all manner of other trades. Further, the invention is applicable to all classes of items and securities described in FIG. 9, including but not limited to, (1) currencies, (2) fixed income securities such as bonds, convertible bonds, and preferred stocks, (3) spot and forward energy, metal, grain, and soft commodities, and (4) futures on equities, bonds, currencies, and commodities, and indexes of these assets. The only requirement for using the marketmaker toolkit is that the assets that comprise a barter order must have publicly available, real-time disseminated market information associated with them.

If the disseminated market information on an asset includes a bid, an offer, a bid size, and an offer size, then the marketmaker toolkit can be used just as for equities, except with different asset lists and different Condition Variables used to describe the asset. For example, one of the conditions used to describe a bond is "Time to Maturity", which is not an equity Condition Variable.

If the disseminated market information on an asset includes a bid and offer, but not bid size and offer size, then the marketmaker toolkit price/size tiers may not be based on current size information. However, the price/size tiers can be based on the marketmaker's desired trade size. For example, instead of a price/size tier being expressed as "90% of the NBBO spread/$20,000 plus NBBO offer size", it can be expressed as "90% of the NBBO spread/$50,000".

If the disseminated market information on an asset does not include a bid and offer, then the marketmaker toolkit price/size tiers may not be based on this information. However, the price/size tiers can be based on the price at which the asset last traded. For example, instead of a price/size tier being expressed as "90% of the NBBO spread/$50,000", it can be expressed as "Last Trade+0.01/$50,000".

Other modifications, configurations and adaptations will be apparent to those of ordinary skill in the art and are within the scope of the present invention.

What is claimed is:

1. A method of responding to order flow in a computerized securities trading system, the method comprising:
establishing for a market maker a rule for automatically generating a contra order in response to an order in a computerized securities trading system, the rule, with no symbols specified, comprising at least one condition, the at least one condition allowing matching based on at least one characteristic describing the order, the characteristic being selected from a group comprising at least one of trade volume and market capitalization;
receiving, by the computerized securities trading system, from a trader the order;
matching on the computerized securities trading system the order to the rule;
automatically generating, by the computerized securities trading system, the contra order in response to the order, if the rule is satisfied, the automatically generating comprising posting the contra order to an order book; and
providing the contra order from the order book for acceptance.

2. The method of claim 1 wherein the order further comprises an effective time range.

3. The method of claim 1 wherein:
the order comprises first and second securities; and
the group further comprises at least one of: identity of one of the first and second securities, delta between buy and sell prices of the first and second securities, relationship of SIC codes of the first and second securities, average daily trading volume of at least one of the first and second securities, and debit value of the bid/ask spread of the first and second securities.

4. The method of claim 3 wherein each of the at least one condition further comprises a mathematical operator and a value.

5. The method of claim 1 wherein the rule further comprises at least one pricing tier comprising an offer price and an offer size for which the rule is satisfied.

6. The method of claim 1 wherein the automatically generating comprises prompting an operator to provide a manual response.

7. A system for responding to a financial order, the system comprising:
  a processor; and
  a memory operatively connected to the processor; the processor operative with control instructions stored in the memory to perform:
    establishing for a market maker a rule for automatically generating a contra order in response to an order, the rule, with no symbols specified, comprising at least one condition, the at least one condition allowing matching based on at least one characteristic describing the order, the characteristic being selected from a group comprising at least one of trade volume and market capitalization;
    receiving from a trader the order;
    matching the order to the rule;
    automatically generating the contra order, comprising posting the contra order to an order book, in response to the order, if the rule is satisfied; and
    providing the contra order from the order book for acceptance.

8. The system of claim 7 wherein the order further comprises an effective time range.

9. The system of claim 7 wherein:
  the order comprises first and second securities; and
  the group further comprises at least one of: identity of one of the first and second securities, delta between buy and sell prices of the first and second securities, relationship of SIC codes of the first and second securities, average daily trading volume of at least one of the first and second securities, and debit value of the bid/ask spread of the first and second securities.

10. The system of claim 9 wherein each of the at least one condition further comprises a mathematical operator and a value.

11. The system of claim 7 wherein the rule further comprises at least one pricing tier comprising an offer price and an offer size for which the rule is satisfied.

12. The system of claim 7 wherein the automatically generating comprises prompting an operator to provide a manual response.

13. A method of responding to order flow in a computerized securities trading system, the method comprising:
  establishing for a market maker a rule, with no symbols specified, operating as a filter for automatically generating a contra order in response to an order in a computerized securities trading system, the rule comprising at least one characteristic describing the order, the characteristic being selected from a group comprising at least one of trade volume and market capitalization;
  receiving, by the computerized securities trading system, from a trader the order;
  automatically generating, by the computerized securities trading system, the contra order in response to the order, the contra order comprising an offer price and an offer size, if the rule is satisfied, the automatically generating comprising posting the contra order to an order book; and
  providing the contra order from the order book for acceptance.

14. A system for responding to order flow, the system comprising:
  means for establishing for a market maker a rule, with no symbols specified, operating as a filter for automatically generating a contra order in response to an order, the rule comprising at least one characteristic describing the order, the characteristic being selected from a group comprising at least one of trade volume and market capitalization;
  means for receiving from a trader the order;
  means for automatically generating the contra order in response to the order, the contra order comprising an offer price and an offer size, if the rule is satisfied, the means for automatically generating comprising means for posting the contra order to an order book; and
  means for providing the contra order from the order book.

15. A method of establishing a rule to respond to an order in a computerized securities trading system, the method comprising:
  storing on a computerized securities trading system a plurality of variables and operators;
  providing, by the computerized securities trading system, to a market maker a graphical user interface accessing the plurality of variables and operators to define a rule, with no symbols specified, for automatically generating a contra order in response to an order;
  receiving, by the computerized securities trading system, through the graphical user interface from the market maker a selection of at least one of the plurality of variables and operators to define the rule, the rule comprising at least one condition for automatically generating the contra order, the at least one condition allowing matching based on at least one characteristic describing the order, the characteristic being selected from a group comprising at least one of trade volume and market capitalization, without revealing a security symbol in the order to the market maker; and
  automatically generating the contra order, by the computerized securities trading system, if the rule is satisfied, the automatically generating comprising posting the contra order to an order book.

16. The method of claim 15 wherein the order further comprises an effective time range.

17. The method of claim 15 wherein the receiving comprises selecting at least one constraint to create the at least one condition.

18. The method of claim 15 wherein:
  the order comprises first and second securities; and
  the group further comprises at least one of: identity of one of the first and second securities, delta between buy and sell prices of the first and second securities, relationship between SIC codes of the first and second securities, average daily trading volume of at least one of the first and second securities, and debit value of the bid/ask spread of the first and second securities.

19. The method of claim 15 wherein the rule further comprises at least one pricing tier comprising an offer price and an offer size for which the rule is satisfied.

20. A system for establishing a rule to respond to order flow, comprising:
  a processor; and
  a memory operatively connected to the processor and storing an order;
  the memory storing a plurality of variables and operators, the memory further storing instructions operable with the processor to cause the processor to perform:

providing to a market maker a graphical user interface accessing the plurality of variables and operators to define a rule, with no symbols specified, for automatically generating a contra order in response to an order;

receiving through the graphical user interface a selection from the market maker of at least one of the plurality of variables and operators to define the rule, the rule comprising at least one condition, the at least one condition for automatically generating the contra order based on at least one characteristic describing the order, the characteristic being selected from a group comprising at least one of trade volume and market capitalization; and automatically generating the contra order, comprising posting the contra order to an order book, if the rule is satisfied.

21. The system of claim 20 wherein the order further comprises a time range and a date range.

22. The system of claim 20 wherein the receiving comprises selecting at least one constraint to create the at least one condition.

23. The system of claim 22 wherein:

the order comprises first and second securities; and the group further comprises at least one of: identity of one of the first and second securities, delta between buy and sell prices of the first and second securities and any other securities, relationship of SIC codes of the first and second securities, average daily trading volume of at least one of the first and second securities, and debit value of the bid/ask spread of the first and second securities.

24. The system of claim 20 wherein the rule further comprises at least one pricing tier comprising an offer price and an offer size for which the rule is satisfied.

25. A method of establishing a rule to respond to an order in a computerized securities trading system, the method comprising:

storing, by a computerized securities trading system, a plurality of variables and operators;

providing, by the computerized securities trading system, to a market maker a graphical user interface accessing the plurality of variables and operators to define a rule for automatically generating a contra order in response to an order;

receiving, by the computerized securities trading system, through the graphical user interface from the market maker a selection of at least one of the plurality of variables and operators to define the rule, the rule describing the order, the rule comprising a characteristic being selected from a group comprising at least one of trade volume and market capitalization, the rule allowing matching based on a security in the order being in a security list specified by the market maker; and automatically generating the contra order, by the computerized securities trading system, if the rule is satisfied, the automatically generating comprising sending the contra order to an order book.

26. A system for establishing a rule to respond to an order, the system comprising:

means for storing a plurality of variables and operators;

means for providing to a market maker a graphical user interface accessing the plurality of variables and operators to establish a rule for automatically generating a contra order in response to an order;

means for receiving through the graphical user interface from the market maker a selection of at least one of the plurality of variables and operators to create the rule, the rule describing the order, the rule comprising a characteristic being selected from a group comprising at least one of trade volume and market capitalization, the rule allowing matching based on a security in the order being in a security list specified by the market maker; and means for automatically generating the contra order, if the rule is satisfied, the means for automatically generating comprising means for sending the contra order to an order book.

27. The method of claim 1 or 13 wherein the contra order comprises a first security and a second security.

28. The method of claim 1 or 13 wherein the contra order is at least part of an implied order.

29. The system of claim 7 or 14 wherein the contra order comprises a first security and a second security.

30. The system of claim 7 or 14 wherein the contra order is at least part of an implied order.

31. The method of claim 1 or 13 wherein the automatically generating the contra order comprises responding to an implied order.

32. The method of claim 15 or 25 wherein the automatically generating the contra order comprises generating an implied order.

33. A method of responding to order flow in a computerized securities trading system, the method comprising:

establishing for a market maker a rule for automatically generating a contra order in response to an order in a computerized securities trading system, the rule comprising at least one condition comprising at least one characteristic describing the order, the characteristic being selected from a group comprising at least one of trade volume and market capitalization, the at least one condition allowing matching based on a security in the order being in a security list specified by the market maker;

receiving from a trader the order;

matching on the computerized securities trading system the order to the rule comprising the at least one condition;

automatically generating the contra order in response to the order, if the rule is satisfied, the automatically generating comprising sending the contra order to an order book; and providing the contra order from the order book for acceptance.

34. The method of claim 1 wherein the establishing comprises utilizing a software program through an application program interface to establish the rule for automatically generating the contra order in response to the order.

35. The method of claim 33 wherein the establishing comprises utilizing a software program through an application program interface to establish the rule for automatically generating the contra order in response to the order.

* * * * *